(12) United States Patent
Yamamoto et al.

(10) Patent No.: US 8,136,412 B2
(45) Date of Patent: *Mar. 20, 2012

(54) ELECTROMAGNETIC FLOWMETER

(75) Inventors: Tomoshige Yamamoto, Tokyo (JP); Daisuke Akita, Tokyo (JP); Yoshio Yamazaki, Tokyo (JP); Kenji Yao, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/877,266

(22) Filed: Sep. 8, 2010

(65) Prior Publication Data

US 2011/0056307 A1 Mar. 10, 2011

(30) Foreign Application Priority Data

Sep. 9, 2009 (JP) ................................. 2009-207898

(51) Int. Cl.
*G01F 1/58* (2006.01)

(52) U.S. Cl. .................................................. 73/861.12

(58) Field of Classification Search ................ 73/861.12
See application file for complete search history.

(56) References Cited

U.S. PATENT DOCUMENTS

| 2007/0220993 | A1* | 9/2007 | Yamamoto | ................ | 73/861.16 |
| 2007/0234820 | A1* | 10/2007 | Yamamoto | ................ | 73/861.12 |
| 2008/0028867 | A1* | 2/2008 | Yamamoto | ................ | 73/861.12 |
| 2011/0056305 | A1* | 3/2011 | Yamamoto | ................ | 73/861.12 |

FOREIGN PATENT DOCUMENTS

| JP | 2005-300325 A | 10/2005 |
| JP | 2005-300326 A | 10/2005 |
| JP | 3774218 B2 | 5/2006 |

* cited by examiner

*Primary Examiner* — Jewel V Thompson
(74) *Attorney, Agent, or Firm* — Ditthavong Mori & Steiner, P.C.

(57) ABSTRACT

An electromagnetic flowmeter includes a measuring tube, electrodes, an exciting coil for applying, to a fluid, a time-changing magnetic field asymmetrical with respect to a plane PLN, a signal conversion unit which extracts a ∂A/∂t component, irrelevant to a fluid flow velocity, from a resultant electromotive force of an electromotive force based on the ∂A/∂t component and an electromotive force based on a v×B component originating from the flow velocity of the fluid, a flow rate output unit which removes a variation factor for a span as a coefficient applied to a magnitude V of a flow velocity of the v×B component in the resultant electromotive force, based on the extracted ∂A/∂t component, and calculates a flow rate of the fluid from a result obtained by removing the variation factor, and signal lines inclined with respect to a direction of the magnetic field in parallel with the plane PLN.

14 Claims, 33 Drawing Sheets

ELECTROMAGNETIC FLOWMETER

CROSS-REFERENCES TO RELATED APPLICATION

This application claims priority from Japanese Patent Application Serial No. 2009-207898 filed Sep. 9, 2009, the contents of which are incorporated herein by reference in its entirety.

TECHNICAL FIELD

The present invention relates to an electromagnetic flowmeter for measuring a flow rate of a fluid flowing through a measuring tube.

BACKGROUND

Physical Phenomenon and Mathematical Basic Knowledge

A background theory which is necessary to understand both of a conventional technique and the present invention will be described. First, a physical phenomenon necessary for the description of the conventional technique will be described. When an object moves in a magnetic field changing as the time passes, electromagnetic induction generates two types of electric fields, namely (a) electric field $E^{(i)} = \partial A/\partial t$, which is generated by a time-change of a magnetic field, and (b) electric field $E^{(v)} = v \times B$, which is generated as the object moves in the magnetic field. In this case, $v \times B$ represents the outer product of v and B, $\partial A/\partial t$ represents the partial differential of A with respect to time. In this case, v, B, and A respectively correspond to the following and are vectors having directions in three dimensions (x, y, and z) (v: flow velocity, B: magnetic flux density, and A: vector potential (whose relationship with the magnetic flux density is represented by B=rotA)). Note, however, that the three-dimensional vectors in this case differ in meaning from vectors on a complex plane. These two types of electric fields generate a potential distribution in the fluid, and electrodes can detect this potential.

Generally known mathematical basic knowledge will be described next. A cosine wave $P \cdot \cos(\omega \cdot t)$ and a sine wave $Q \cdot \sin(\omega \cdot t)$ which have the same frequency but different amplitudes are combined into the following cosine wave. In this case, P and Q are amplitudes, and ω is an angular frequency.

$$P \cdot \cos(\omega \cdot t) + Q \cdot \sin(\omega \cdot t) = (P^2 + Q^2)^{1/2} \cdot \cos(\omega \cdot t - \epsilon) \text{ where } \epsilon = \tan^{-1}(Q/P) \quad (1)$$

In order to analyze the combining operation in equation (1), it is convenient to perform mapping on a complex coordinate plane so as to plot an amplitude P of cosine wave $P \cdot \cos(\omega \cdot t)$ along a real axis and an amplitude Q of the sine wave $Q \cdot \sin(\omega \cdot t)$ along an imaginary axis. That is, on the complex coordinate plane, a distance $(P^2 + Q^2)^{1/2}$ from the origin gives the amplitude of the combined wave, and an angle $\epsilon = \tan^{-1}(Q/P)$ gives the phase difference between the combined wave and ω·t.

In addition, on the complex coordinate plane, the following relational expression holds.

$$L \cdot \exp(j \cdot \epsilon) = L \cdot \cos(\epsilon) + j \cdot L \cdot \sin(\epsilon) \quad (2)$$

Equation (2) is an expression associated with a complex vector, in which j is an imaginary unit, L gives the length of the complex vector, and ε gives the direction of the complex vector. In order to analyze the geometrical relationship on the complex coordinate plane, it is convenient to use conversion to a complex vector.

The following description uses mapping onto a complex coordinate plane like that described above and geometrical analysis using complex vectors to show how an inter-electrode electromotive force behaves and describe how the conventional technique uses this behavior.

Description about Conventional Technique

A complex vector arrangement of inter-electrode electromotive force generated with one coil set and an electrode pair in the electromagnetic flowmeter (see Japanese Patent No. 3774218 (Patent Document 1), Japanese Patent Application Publication No. 2005-300325 (Patent Document 2), and Japanese Patent Application Publication No. 2005-300326 (Patent Document 3) ) suggested by the inventor will be described next. FIG. 32 is a block diagram illustrating a configuration of the electromagnetic flowmeter disclosed in Patent Document 1 to Patent Document 3. This electromagnetic flowmeter includes a measuring tube 1 through which a fluid to be measured flows, a pair of electrodes 2a, 2b which are placed to face each other in the measuring tube 1 so as to be perpendicular to both a magnetic field to be applied to the fluid to be measured and an axis PAX of the measuring tube 1 and come into contact with the fluid to be measured, and detect the electromotive force generated by the magnetic flow and the flow of the fluid to be measured, an exciting coil 3 which applies, to the fluid to be measured, a time-changing magnetic field asymmetric on the front and rear sides of the measuring tube 1 which are bordered on a plane PLN, perpendicular to the direction of the axis PAX of the measuring tube, which includes the electrodes 2a, 2b, with the plane PLN serving as a boundary of the measuring tube 1, a power supply unit 4 supplying an exciting current to the exciting coil 3 to generate a magnetic field, a signal conversion unit 5 detecting an electromotive force between the electrodes 2a, 2b, and a flow rate output unit 6 calculating the flow rate of the fluid to be measured based on the inter-electrode electromotive force detected by the signal conversion unit 5, and signal lines 7a, 7b connecting between the signal conversion unit 5 and the electrodes 2a, 2b.

When the exciting coil 3 applies, to the fluid to be measured, a magnetic field asymmetric on the front and rear sides of the measuring tube 1 which are bordered on the plane PLN including the electrodes 2a, 2b with the plane PLN serving as the boundary of the measuring tube 1, the vector mapped on a complex plane based on the amplitudes of an measured inter-electrode electromotive force and a phase difference corresponds to the resultant vector Va+Vb of the vector Va of the ∂A/∂t component and the vector Vb of the v×B component.

$$Va = B \cdot r\omega \cdot \exp(j \cdot \theta\omega) \cdot \omega \quad (3)$$

$$Vb = B \cdot rv \cdot \exp(j \cdot \theta v) \cdot V \quad (4)$$

FIG. 33 shows the vectors Va and Vb. In FIG. 33, Re represents a real axis, and Im represents an imaginary axis. The vector Va of the ∂A/∂t component is the electromotive force generated by a change in magnetic field, and hence has a magnitude proportional to an exciting angular frequency ω. In this case, let B be the magnitude of a magnetic field, rω be a known proportional constant portion other than a magnitude of a magnetic field corresponding to the magnitude of the vector Va, and θω be the direction of the vector Va. In addition, the vector Vb of the v×B component is the electromotive force generated by the movement of the fluid to be measured in the measuring tube, and hence has a magnitude proportional to the magnitude V of the flow velocity. In this case, let rv be a known proportional constant portion other than a magnitude of a magnetic field corresponding the magnitude of the vector Vb, and θv be the direction of the vector.

Based on the complex vector arrangement as shown in FIG. 33 and equations (3) and (4), the electromagnetic flowmeter disclosed in Patent Document 1 to Patent Document 3 extracts a parameter (asymmetric excitation parameter) free from the influence of a span shift, and outputs a flow rate based on the asymmetric excitation parameter, thus solving the problem of the span shift.

A span shift will be described with reference to FIG. 34. Assume that the magnitude V of the flow velocity measured by the electromagnetic flowmeter has changed in spite of the fact that the flow velocity of a fluid to be measured has not changed. In such a case, a span shift can be considered as a cause of this output variation. For example, assume that calibration is performed such that when the flow velocity of a fluid to be measured is 0 in an initial state, the output from the electromagnetic flowmeter becomes 0 (v), and when the flow velocity is 1 (m/sec), the output becomes 1 (v). In this case, an output from the electromagnetic flowmeter is a voltage representing the magnitude V of a flow velocity. According to this calibration, if the flow velocity of a fluid to be measured is 1 (m/sec), the output from the electromagnetic flowmeter should be 1 (v). When a given time t1 has elapsed, however, the output from the electromagnetic flowmeter may become 1.2 (v) in spite of the fact that the flow velocity of the fluid to be measured remains 1 (m/sec). A span shift can be considered as a cause of this output variation. A phenomenon called a span shift occurs when, for example, the value of an exciting current flowing in the exciting coil cannot be maintained constant due to a change of an ambient temperature of the electromagnetic flowmeter.

SUMMARY

In the electromagnetic flowmeter disclosed in Patent Document 1 to Patent Document 3, the phase difference $\phi$ between the exciting current and the resultant vector Va+Vb is adopted as an asymmetric excitation parameter that is not affected by a fluid, and the flow rate is calculated based on this asymmetric excitation parameter. The principle of shift correction of the electromagnetic flowmeter disclosed in Patent Document 1 to Patent Document 3 is shown in FIGS. 35A and 35B. When the relationship between the vector Va of the ∂A/∂t component and the vector Vb of the v×B component is as shown in FIG. 35A, and the amplitude of a magnetic field B shifts, the vector Va and the vector Vb change as shown in FIG. 35B, for example. In this case, when the flow rate of the fluid is constant, the phase difference $\phi$ between the resultant vector Va+Vb and the exciting current does not change. In other words, in a case where the flow rate is constant, the vector Vb changes to Vb' when the vector Va changes to Va', in which case the phase difference $\phi$ does not change. Therefore, by detecting the flow rate based on the phase difference $\phi$, the measurement error of the flow rate caused by the effect of the span shift can be automatically canceled.

As described above, in the electromagnetic flowmeter disclosed in Patent Document 1 to Patent Document 3, when a signal component includes only vectors Va and Vb, the flow rate is in proportional to $\tan(\pi/2-\phi)$, in which a phase difference from an exciting current of Va+Vb is denoted as $\phi$. In this case, the electromagnetic flowmeter is expected to be able to accurately measure the flow rate. However, in reality, measured values vary because of external noises. Assume that the vector Va is larger, as shown by Va1 in FIG. 36A, than the level of the magnitude of the vector Vb, and Va1 becomes Va1' due to a noise N. In this case, even though the phase difference $\phi=\phi1$ between the exciting current and the resultant vector Va+Vb becomes $\phi1'$, an error of the flow rate is small, because a ratio of variation of the flow rate caused by the noise, $\tan(\pi/2-\phi1')/\tan(\pi/2-\phi1)$, is small. On the other hand, in a case where the vector Va is smaller, as shown by Va2 in FIG. 36A, than the level of the magnitude of the vector Vb, and Va2 becomes Va2' due to the same noise N, the phase difference $\phi=\phi2$ between the exciting current and the resultant vector Va+Vb becomes $\phi2'$, and a ratio of variation of the flow rate caused by the noise, $\tan(\pi/2-\phi2')/\tan(\pi/2-\phi2)$, becomes larger, which increases an error of the flow rate. In a case where the vector Vb is larger, as shown by Va3 in FIG. 36B, than the level of the magnitude of the vector Vb, the phase difference $\phi=\phi3$ increases, and a value of $\tan(\pi/2-\phi3)$ in proportion to the flow rate decreases, which deteriorates the resolution of the flow rate.

Since the magnitude of the vector Vb serves as the basis of measurement of the flow rate, the deterioration of the resolution of the flow rate and the increase of the error of the flow rate described in FIGS. 36A and 36B can be solved by appropriately changing the magnitude of the vector Va without affecting the magnitude of this vector Vb. Examples of factors related to the magnitude of the vector Va include a magnetic field, an arrangement of electrode, and an excitation frequency, all of which are important parameters in terms of design and cannot be easily changed. For example, a size of a magnetic field and an arrangement of electrodes greatly affect the vector Vb, and are therefore not appropriate as a parameter for adjusting the level of the vector Va. By changing the excitation frequency, the level of the vector Va can be adjusted with a little effect exerted on the vector Vb. However, the excitation frequency is greatly related to a reduction of a noise in a signal, and is not a parameter that can be easily changed only for adjusting the level of the vector Va.

When highly accurate measurement of the flow rate is desired, a stability of measurement against external noises and a resolution of a measured value of the flow rate should be taken into consideration. In the electromagnetic flowmeter as disclosed in Patent Document 1 to Patent Document 3, however, the difference between the level of the vector Va and the level of the vector Vb cannot be adjusted well by changing ordinary design parameters, and there has been a possibility that when the difference between the level of the vector Va and the level of the vector Vb is large, an accurate span correction and a measurement of the flow rate cannot be performed.

The present invention has been made to solve the above problems, and an object of the present invention is to use an asymmetric excitation electromagnetic flowmeter to perform highly accurate measurement of the flow rate by setting the ∂A/∂t component obtained from a signal line.

An electromagnetic flowmeter of the present invention includes: a measuring tube through which a fluid to be measured flows; an electrode which is arranged in the measuring tube so as to detect an electromotive force generated by a magnetic field applied to the fluid and a flow of the fluid; an exciting unit which applies, to the fluid, a time-changing magnetic field asymmetrical to a first plane including the electrode, the first plane being perpendicular to an axial direction of the measuring tube; and a signal line, one end of the signal line being connected to the electrode, the signal line being inclined with respect to a direction of the magnetic field in parallel with the first plane, the signal line being arranged so as to generate the electromotive force according to the time-change of the magnetic field. In a structural example of the electromagnetic flowmeter according to the present invention, the signal line has a portion extending in the same direction as an axial direction of the measuring tube.

In a structural example (first embodiment) of the electromagnetic flowmeter according to the present invention, the exciting unit includes an exciting coil arranged at a position away from the first plane by an offset distance and a power supply for supplying an exciting current to the exciting coil. In a structural example (second embodiment) of the electromagnetic flowmeter according to the present invention, the electrode includes a pair of electrodes arranged on an axis perpendicular to the axis of the measuring tube so as to face each other with the axis of the measuring tube therebetween, and the signal line includes two signal lines respectively connected the electrodes, and the two signal lines are arranged in directions opposite to each other with respect to the first plane. A structural example (third embodiment) of the electromagnetic flowmeter according to the present invention further includes an outer core for covering an outside of the exciting coil, wherein the signal lines are inclined, on an inner side of the outer core, with respect to the direction of the magnetic field in parallel with the first plane, and the signal lines are arranged so as to generate the electromotive force according to the time-change of the magnetic field.

In a structural example (fourth embodiment) of the electromagnetic flowmeter according to the present invention, the exciting unit includes a first exciting coil arranged at a position away from the first plane by a first offset distance, a second exciting coil arranged at a position away from the first plane by a second offset distance so as to face the first exciting coil with the first plane therebetween, and a power supply for supplying an exciting current to the first exciting coil and the second exciting coil. In a structural example (first, third, fourth embodiments) of the electromagnetic flowmeter according to the present invention, the electrode includes a pair of electrodes arranged on an axis perpendicular to the axis of the measuring tube so as to face each other with the axis of the measuring tube therebetween, and the signal line includes two signal lines respectively connected the electrodes, and at least one of the two signal lines is inclined with respect to the direction of the magnetic field in parallel with the first plane, and is arranged so as to generate the electromotive force according to the time-change of the magnetic field. In a structural example (fifth embodiment) of the electromagnetic flowmeter according to the present invention, the electrode includes a pair of electrodes arranged on an axis perpendicular to the axis of the measuring tube so as to face each other with the axis of the measuring tube therebetween, and the signal line includes two signal lines respectively connected the electrodes, and the two signal lines are arranged in directions opposite to each other with respect to the first plane. A structural example (sixth embodiment) of the electromagnetic flowmeter according to the present invention further includes: a first outer core covering an outer side of the first exciting coil; and a second outer core covering an outer side of the second exciting coil, wherein the signal lines are arranged on inner sides of the first and second outer cores so that the signal lines are inclined with respect to the direction of the magnetic field in parallel with the first plane so as to generate the electromotive force according to the time-change of the magnetic field.

In a structural example (seventh embodiment) of the electromagnetic flowmeter according to the present invention, the exciting unit includes an exciting coil for applying the magnetic field to the fluid and a power supply for supplying an exciting current to the exciting coil, and the electrode includes a first electrode and a second electrode, the first electrode being arranged at a position away by a first offset distance from a second plane, including the exciting coil, perpendicular to the axial direction of the measuring tube, the second electrode being arranged at a position away by a second offset distance from the second plane, the second electrode being arranged to face the first electrode with the second plane arranged therebetween. In a structural example (eighth embodiment) of the electromagnetic flowmeter according to the present invention, the signal line includes a first signal line connected to the first electrode and a second signal line connected to the second electrode, and the first and second signal lines are arranged to face each other with the second plane arranged therebetween. A structural example (ninth embodiment) of the electromagnetic flowmeter according to the present invention further includes an outer core covering an outer side of the exciting coil; wherein the signal line is arranged on an inner side of the outer core so that the signal line is inclined with respect to the direction of the magnetic field in parallel with the first plane so as to generate the electromotive force according to the time-change of the magnetic field.

In a structural example (seventh to ninth embodiments) of the electromagnetic flowmeter according to the present invention, each of the first and second electrodes comprises a pair of electrodes facing each other, on an axis perpendicular to the axis of the measuring tube, with the axis of the measuring tube therebetween, and the signal lines include two first signal lines respectively connected to the pair of first electrodes and two second signal lines respectively connected to the pair of second electrodes, at least one of the two first signal lines is inclined with respect to the direction of the magnetic field in parallel with the first plane so as to generate an electromotive force according to a time-change of the magnetic field, at least one of the two second signal lines is inclined with respect to the direction of the magnetic field in parallel with the first plane so as to generate an electromotive force according to a time-change of the magnetic field. A structural example (tenth to sixteenth embodiments) of the electromagnetic flowmeter according to the present invention further includes: a signal conversion unit connected to the other end of the signal lines, wherein the signal conversion unit extracts a $\partial A/\partial t$ component, irrelevant to a flow velocity of the fluid detected in the electrode and the signal line, from a resultant electromotive force of an electromotive force based on the $\partial A/\partial t$ component originating from a time-change of the magnetic field and an electromotive force based on a v×B component originating from the flow velocity of the fluid; and a flow rate output unit which removes a variation factor for a span as a coefficient applied to a magnitude V of a flow velocity of the v×B component in the resultant electromotive force, based on the extracted $\partial A/\partial t$ component, and calculates a flow rate of the fluid from a result obtained by removing the variation factor.

According to the present invention, signal lines are arranged to be inclined with respect to a direction of a magnetic field in parallel with a first plane perpendicular to an axial direction of a measuring tube so that an electromotive force is generated according to a time-change of the magnetic field. Therefore, the electromotive force of a $\partial A/\partial t$ component obtained from the signal lines are set to a magnitude appropriate for an asymmetric excitation electromagnetic flowmeter. As a result, in the present invention, accurate span correction can be automatically performed, and highly accurate flow rate measurement can be executed.

BRIEF DESCRIPTION OF THE DRAWINGS

Other features and advantages of the present electromagnetic flowmeter will be apparent from the ensuing description, taken in conjunction with the accompanying drawings, in which.

DESCRIPTION

A physical phenomenon which is necessary for a description of the present invention will be additionally described. A signal detected by electrodes of an electromagnetic flowmeter needs to be transmitted via a signal line to a signal processing unit arranged at such a position that is less likely to be affected by a magnetic field. A ∂A/∂t component is generated not only in a fluid but also in electrodes and signal lines. Therefore, a potential of the signal transmitted to the signal processing unit is determined not only by an electric field (v×B) generated in a flow material by the flow material moving in a magnetic field but also by an electric field (∂A/∂t) generated in a space including signal lines and electrodes in addition to the fluid according to a time-change of the magnetic field.

Fundamental Technical Concept of the Invention

In the present invention, an attention is given to the following fact. When a signal processing unit obtains an interelectrode electromotive force detected by electrodes of an electromagnetic flowmeter, the signal processing unit detects a resultant vector Va+Vb of a vector Va of the ∂A/∂t component and a vector Vb of the v×B component. In this case, the vector Va is a resultant vector of a component generated in a fluid and a component generated in the electrodes and the signal lines, whereas the vector Vb is a vector generated in the fluid.

According to equations (3) and (4), it is understood the magnitude of the vector Va of the ∂A/∂t component can be adjusted by adjusting an exciting angular frequency ω without affecting the vector Vb of the v×B component. However, since the exciting angular frequency ω is determined based on responsiveness to an S/N ratio and a change of the flow rate, it is not practical to change the exciting angular frequency ω. Accordingly, the inventor thinks that it is important to be able to adjust the magnitude of the vector Va of the ∂A/∂t component without affecting the performance as the flowmeter and the vector Vb of the v×B component, and paid attention to the arrangement of the signal lines which serves as a parameter of the adjustment thereof.

Figure 1:
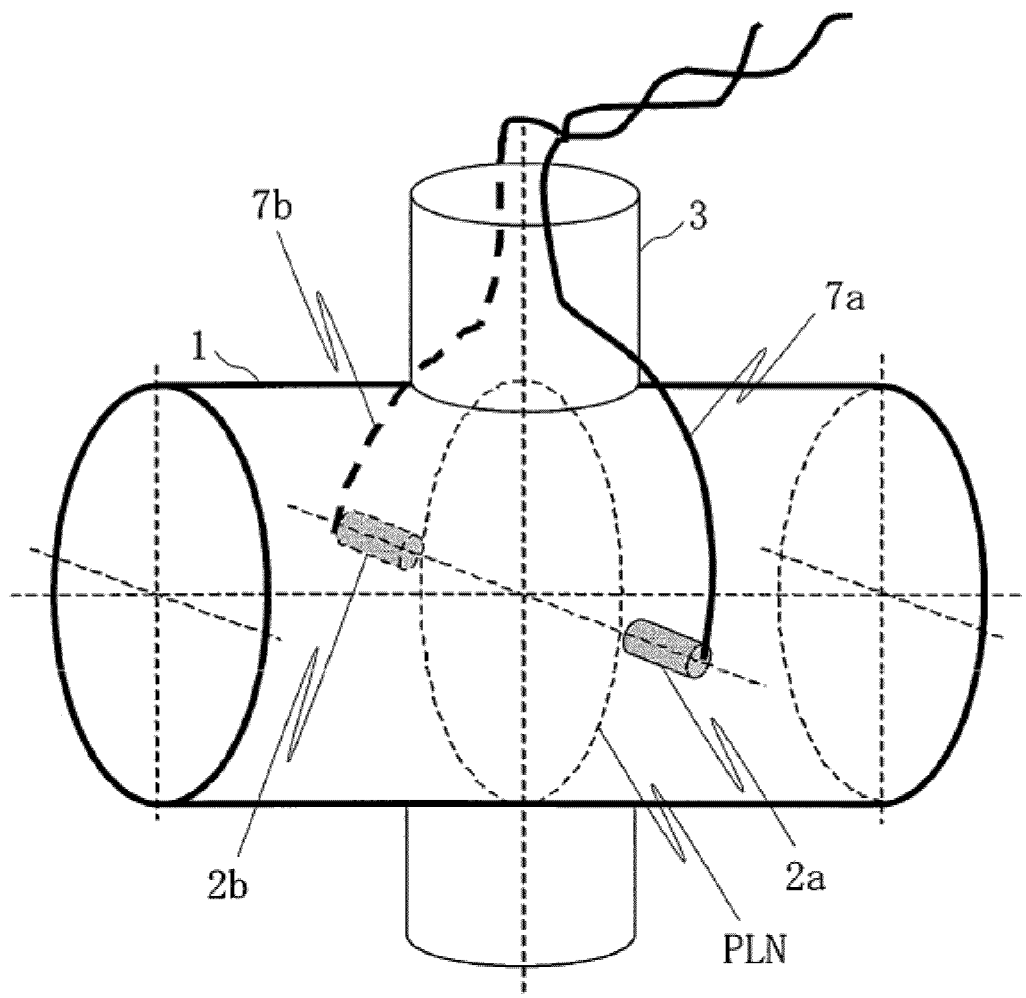
FIG. 1 is a view illustrating an arrangement of a signal line of a conventional generally-available electromagnetic flowmeter.
Figure 32:
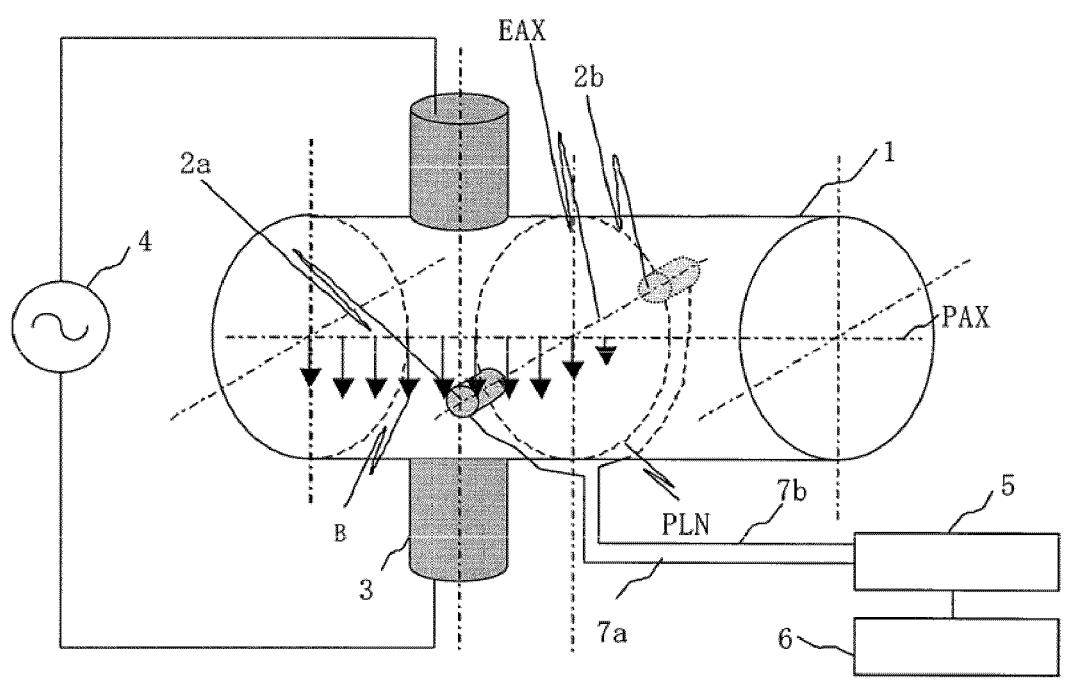
FIG. 32 is a block diagram illustrating a configuration of a conventional electromagnetic flowmeter.
Figure 33:
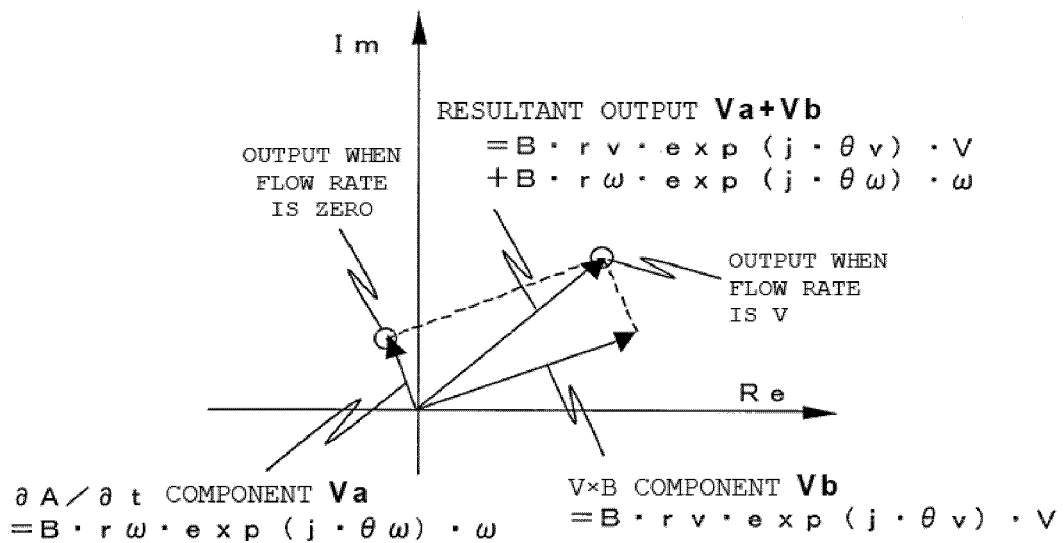
FIG. 33 is a view illustrating a basic principle of the conventional electromagnetic flowmeter.
Figure 34:
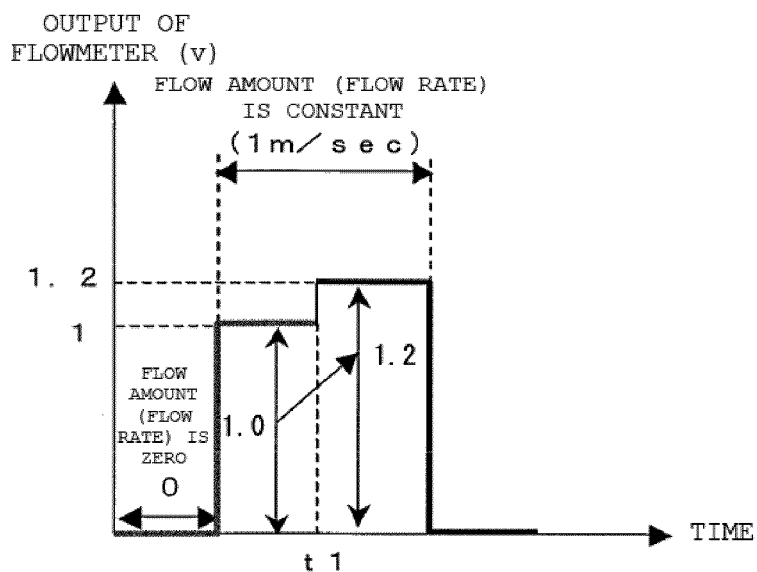
FIG. 34 is a view illustrating a span shift in an electromagnetic flowmeter.
Figure 35A:
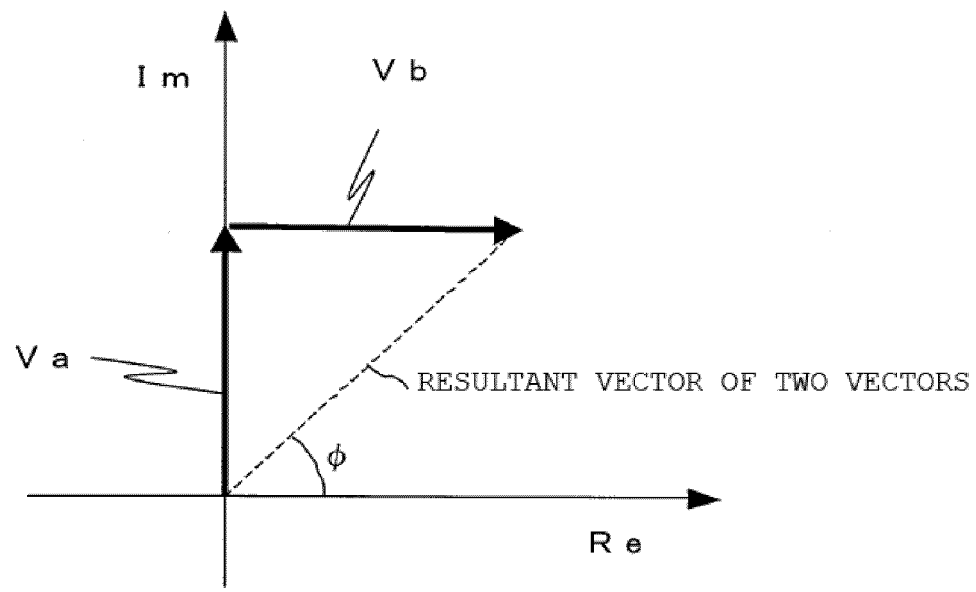
FIGS. 35A and 35B are views illustrating a principle of shift correction in the conventional electromagnetic flowmeter.
Figure 35B:
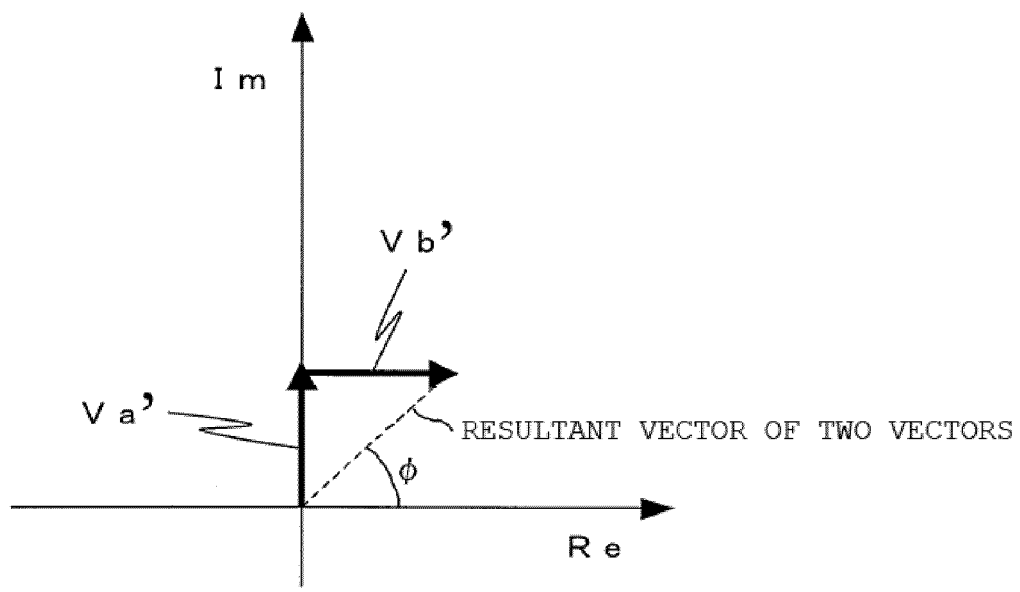
Figure 36A:
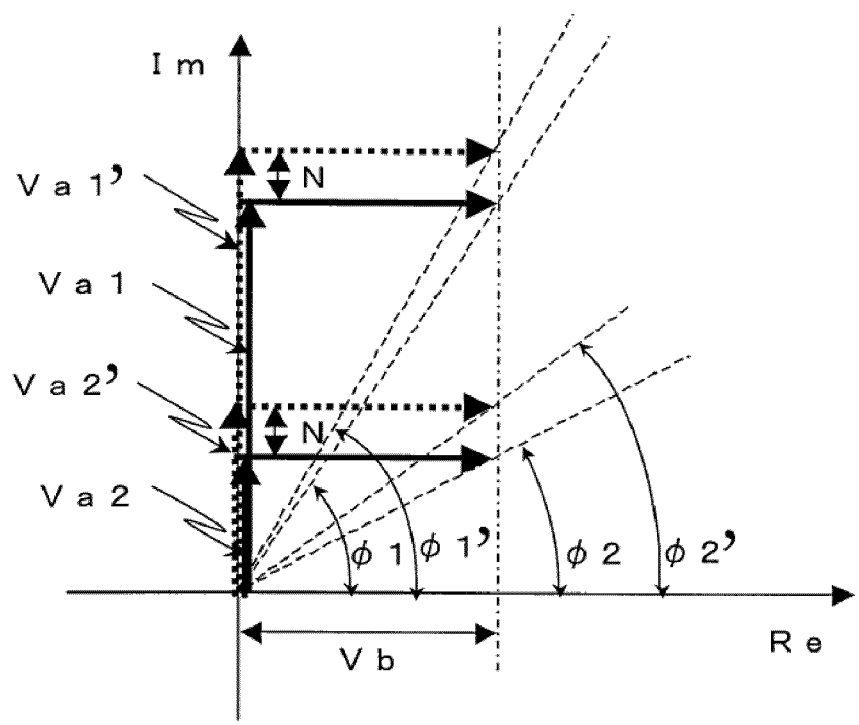
FIGS. 36A and 36B are views illustrating problems associated with the conventional electromagnetic flowmeter.
Figure 36B:
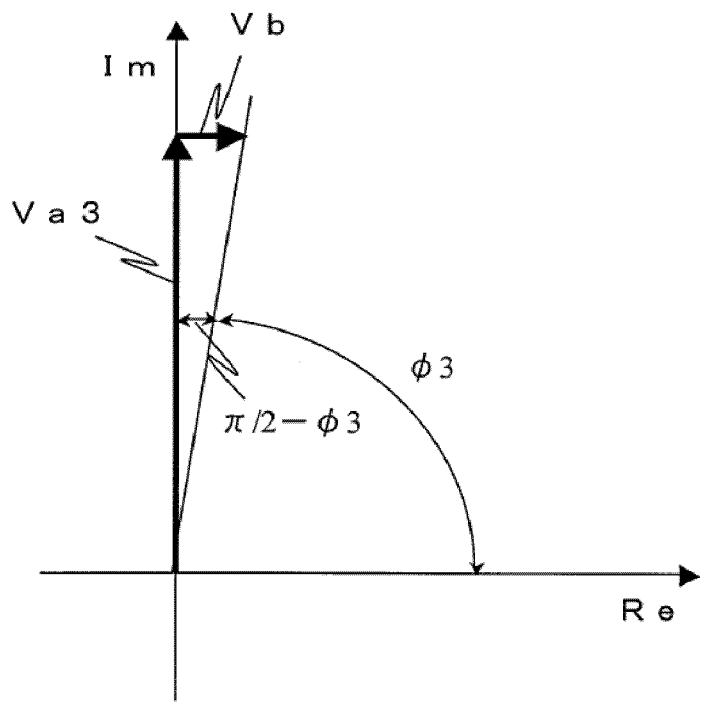

A detector used in a generally-available electromagnetic flowmeter has a structure so as to detect a least ∂A/∂t component. More specifically, the detector has such structure that a magnetic field is symmetrical with respect to a plane PLN including electrodes 2a, 2b and being perpendicular to a direction of an axis of a measuring tube, and signal lines 7a, 7b are arranged such that an area interlinking with a magnetic flux generated by an exciting coil 3 as shown in FIG. 1 becomes the smallest. With this structure, the ∂A/∂t component is prevented from occurring in the signal lines 7a, 7b. As shown in FIG. 32, in the asymmetric excitation electromagnetic flowmeter disclosed in Patent Document 1 to Patent Document 3, the signal lines 7a, 7b are also arranged in the same manner as the generally-available electromagnetic flowmeter.

In contrast, in the present invention, the signal lines are inclined with respect to a direction of a magnetic field in parallel with the plane PLN and arranged so that the ∂A/∂t component is generated according to a time-change of the magnetic field. Therefore, the magnitude of an initial value of the ∂A/∂t component can be adjusted.

Figure 2:
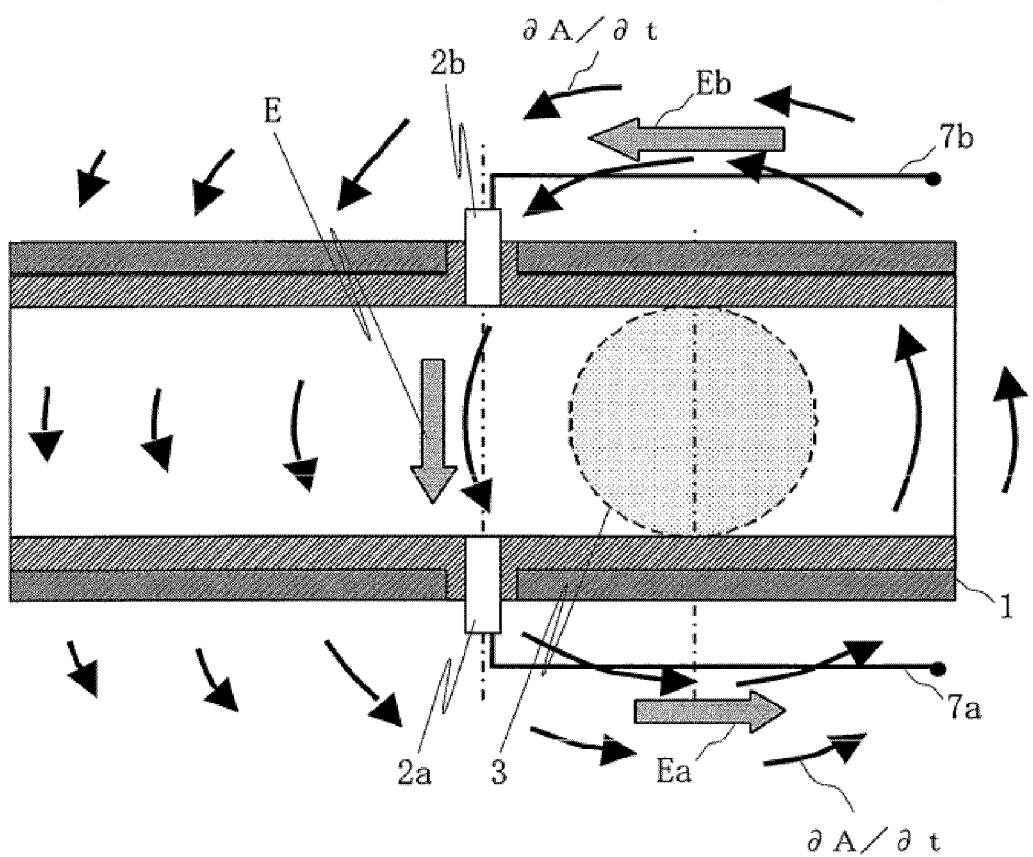
FIG. 2 is a top view illustrating a distribution of a ∂A/∂t component and an example of arrangement of signal lines in an electromagnetic flowmeter according to the present invention.
Figure 3:
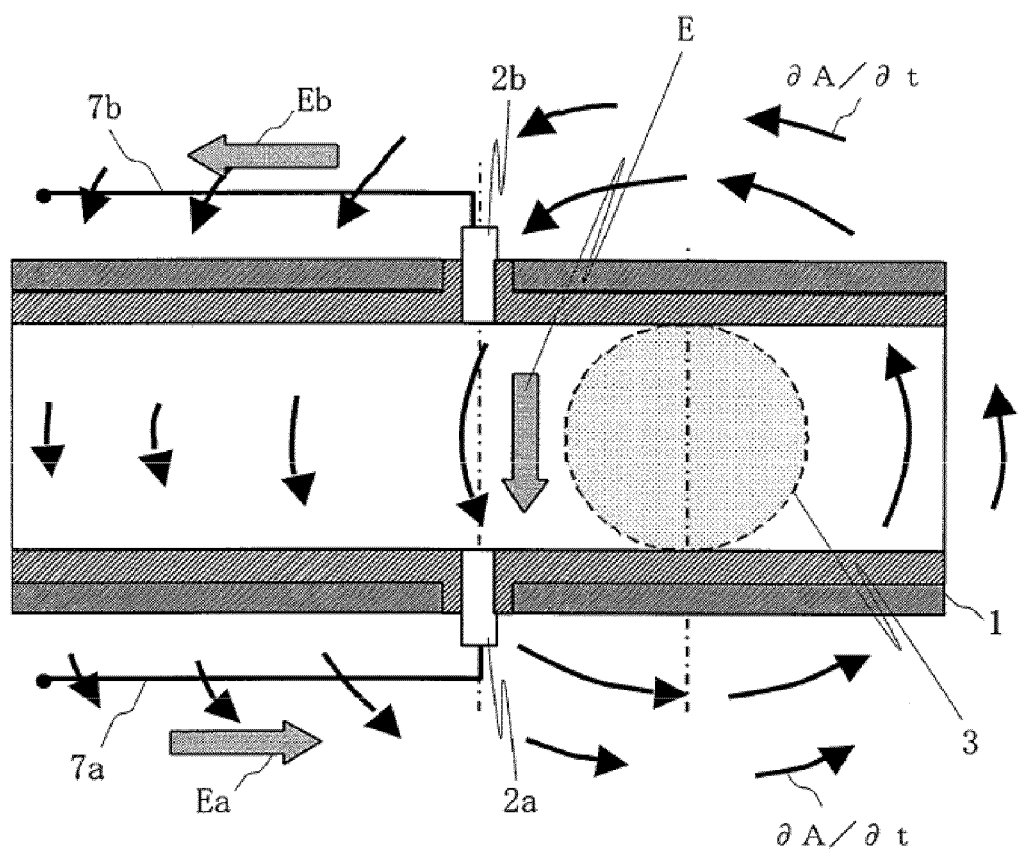
FIG. 3 is a top view illustrating a distribution of the ∂A/∂t component and another example of arrangement of signal lines in the electromagnetic flowmeter according to the present invention.
Figure 4:
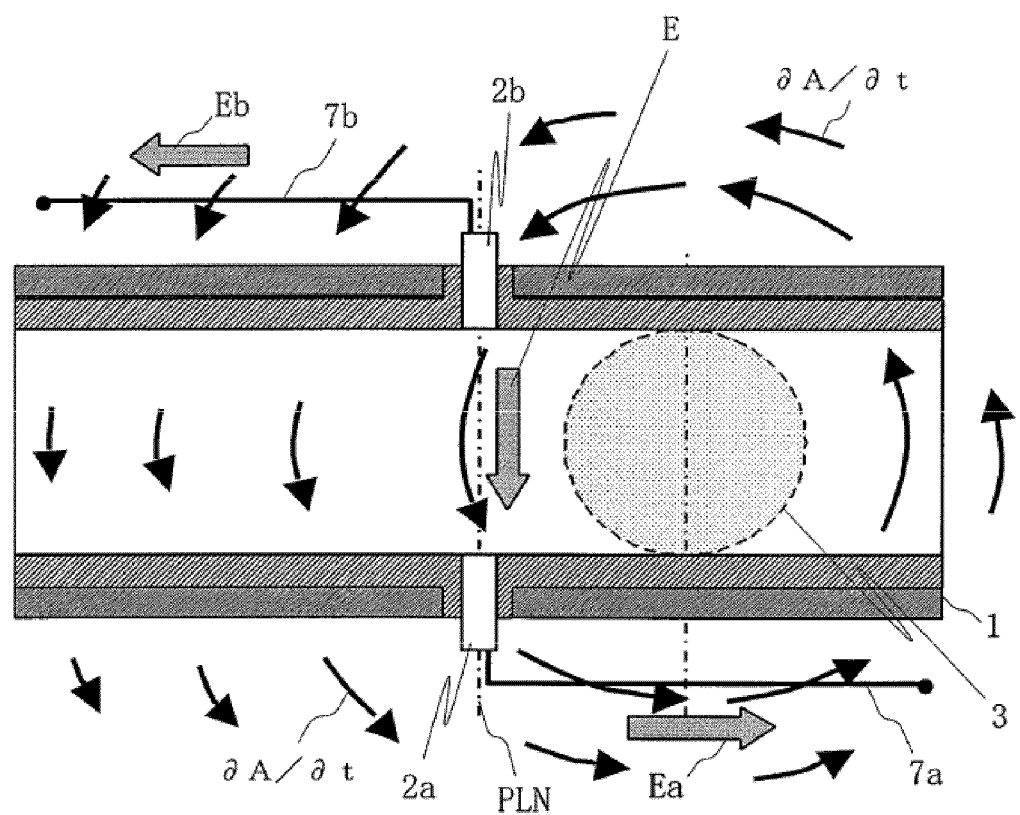
FIG. 4 is a top view illustrating a distribution of the ∂A/∂t component and another example of arrangement of signal lines in the electromagnetic flowmeter according to the present invention.

An arrangement of signal lines and an electromotive force generated in a fluid and the signal lines according to an electromagnetic flowmeter of the present invention will be described with reference to FIGS. 2 to 4. Now, a case where a flow velocity of a fluid to be detected is zero will be described. In other words, a case where only the ∂A/∂t component is generated but the v×B component is not generated will be described. FIG. 2 to FIG. 4 show top views of distributions of the ∂A/∂t component caused by changes of magnetic fields.

When the signal lines 7a, 7b are arranged as shown in FIG. 2 when the ∂A/∂t component is distributed in a space as described above, both of an inter-electrode electromotive force E which is generated in a fluid and is a ∂A/∂t component detected by the electrodes 2a, 2b and electromotive forces Ea, Eb which are ∂A/∂t components generated in the signal lines 7a, 7b are in the same direction (in the example of FIG. 2, a direction from an end portion of the signal line 7b to an end portion of the signal line 7a). Therefore, an inter-signal line electromotive force difference between the electromotive force detected at the end portion of the signal line 7a and the electromotive force detected at the end portion of the signal line 7b is generally larger than the inter-electrode electromotive force E.

In a case where the signal lines 7a, 7b are arranged as shown in FIG. 3, the inter-electrode electromotive force E, i.e., the ∂A/∂t component detected by the electrodes 2a, 2b, is in the direction opposite to the electromotive forces Ea, Eb, i.e., the ∂A/∂t component generated by the signal lines 7a, 7b. Therefore, the inter-signal line electromotive force difference between the electromotive force detected at the end portion of the signal line 7a and the electromotive force detected at the end portion of the signal line 7b is generally smaller than the inter-electrode electromotive force E.

In a case where the signal lines 7a, 7b are arranged to extend in directions opposite from each other from the plane PLN including the electrodes 2a, 2b as shown in FIG. 4, the electromotive force Ea generated in the signal line 7a is in the same direction as the inter-electrode electromotive force E, but the electromotive force Eb generated in the other signal line 7b is in the direction opposite to the inter-electrode electromotive force E. Therefore, the magnitude of the initial value of the ∂A/∂t component detected at each of the end portions of the signal lines 7a, 7b can be precisely adjusted.

As described above, even when the arrangement of the signal lines 7a, 7b is changed, the effect of the v×B component exerted on the vector Vb can be ignored. More specifically, the magnitude of the vector Va of the ∂A/∂t component can be adjusted without affecting the vector Vb of the v×B component. This adjustment is possible even when the lengths of the signal line 7a and the signal line 7b in the direction of the axis of the measuring tube are different. Further, this adjustment is possible even when the signal line 7a and the signal line 7b are arranged asymmetrically with respect to the plane PLN and the axis of the measuring tube.

First Embodiment

Figure 5:
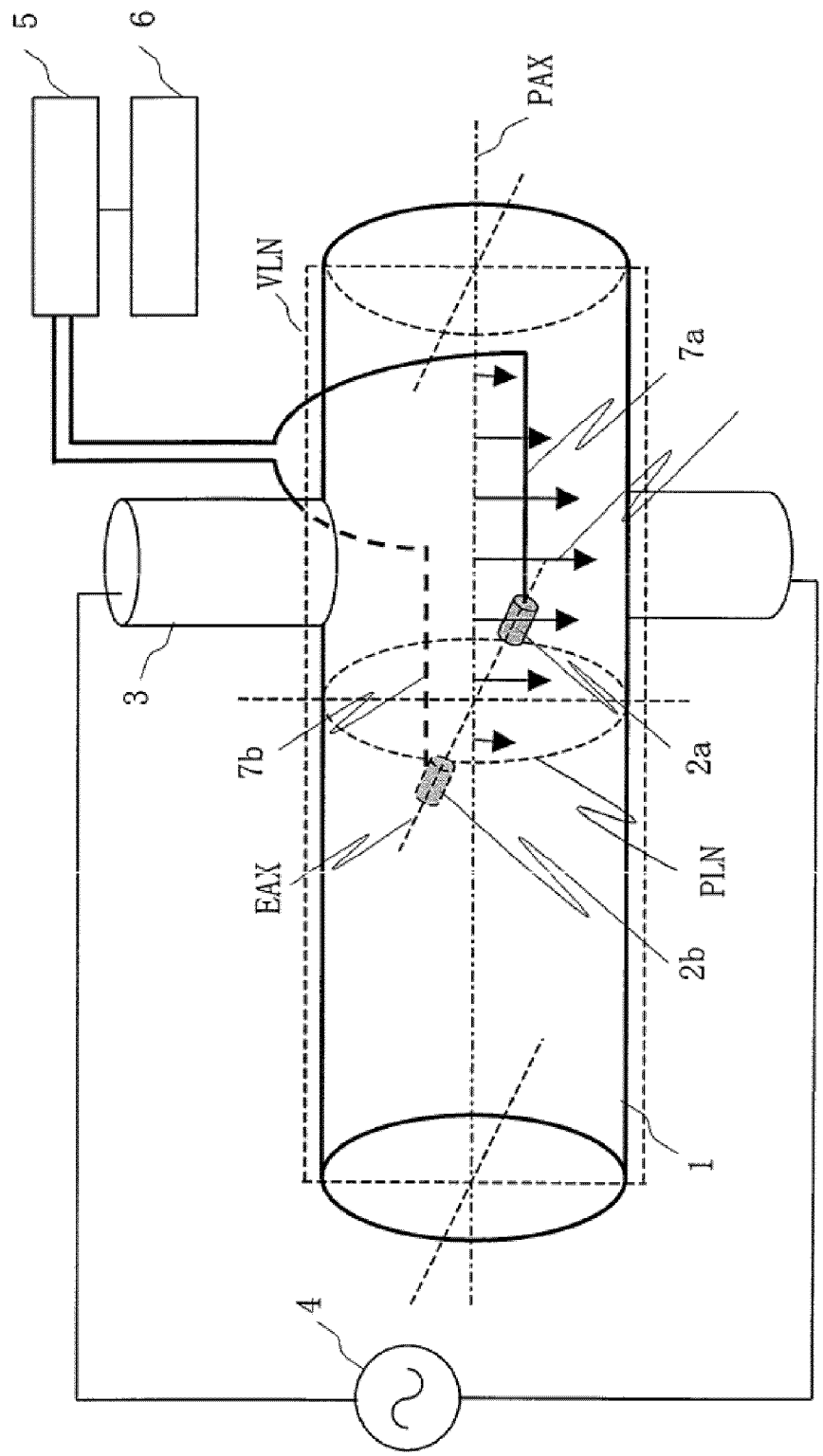
FIG. 5 is a block diagram illustrating a configuration of an electromagnetic flowmeter according to a first embodiment of the present invention.

The first embodiment of the present invention will be hereinafter described in detail with reference to the drawings. FIG. 5 is a block diagram illustrating a configuration of an electromagnetic flowmeter according to a first embodiment of the present invention. The electromagnetic flowmeter according to this embodiment includes a measuring tube 1 through which a fluid to be measured flows, a pair of electrodes 2a, 2b, an exciting coil 3, a power supply 4 for supplying an exciting current to the exciting coil 3 to generate the magnetic field B, a signal conversion unit 5, a flow rate output unit 6, and signal lines 7a, 7b. The pair of electrodes 2a, 2b are placed to face each other in the measuring tube 1 so as to be perpendicular to both a magnetic field B to be applied to the fluid to be measured and an axis PAX of the measuring tube 1 and come into contact with the fluid to be measured. The exciting coil 3 applies, to the fluid to be measured, the time-changing magnetic field B asymmetric on the front and rear sides of the measuring tube 1 which are bordered on a plane PLN, perpendicular to the axis PAX of the measuring tube 1, which includes the electrodes 2a, 2b, with the plane PLN serving as a boundary of the measuring tube 1. The signal conversion unit 5 is connected to the other ends of the later-described signal lines, and extracts the ∂A/∂t component from an electromotive force obtained from the signal lines. The flow rate output unit 6 removes a variation factor for a span which is a coefficient relating to a magnitude V of a flow velocity of the v×B component in the electromotive force based on the extracted ∂A/∂t component, and calculates the flow rate of the fluid to be measured from the result obtained by removing the variation factor. The signal lines 7a, 7b connect between the electrodes 2a, 2b and the signal conversion unit 5.

The electromagnetic flowmeter according to this embodiment includes the one exciting coil 3 and the pair of electrodes 2a, 2b. The signal lines 7a, 7b are inclined with respect to the direction of the magnetic field B in parallel with the plane PLN and are arranged so as to generate an electromotive force according to a time-change of the magnetic field B. The signal line 7a and the signal line 7b are arranged on the same side with respect to the plane PLN. The exciting coil 3 is arranged at a position away from an offset distance from the plane PLN in the direction of the axis of the measuring tube. Thus, in this embodiment, the magnetic field B asymmetric on the front and rear sides of the measuring tube 1 which are bordered on the plane PLN is applied to the fluid to be measured.

The lengths of the signal lines 7a, 7b may not be the same. Further, the signal lines 7a, 7b may not be arranged symmetrical with respect to the plane PLN including the axis PAX of the measuring tube and being perpendicular to an axis EAX of the electrodes connecting between the electrodes 2a, 2b. Various kinds of methods including Patent Document 1 to Patent Document 3 have been suggested as methods for extracting the ∂A/∂t component from the electromotive force detected by the signal conversion unit 5 and deriving the flow rate of the fluid to be measured using this ∂A/∂t component. However, any method for deriving the flow rate of the fluid to be measured can be applied to this embodiment. Examples of operations of the power supply 4, the signal conversion unit 5, and the flow rate output unit 6 will be described later.

Figure 6:
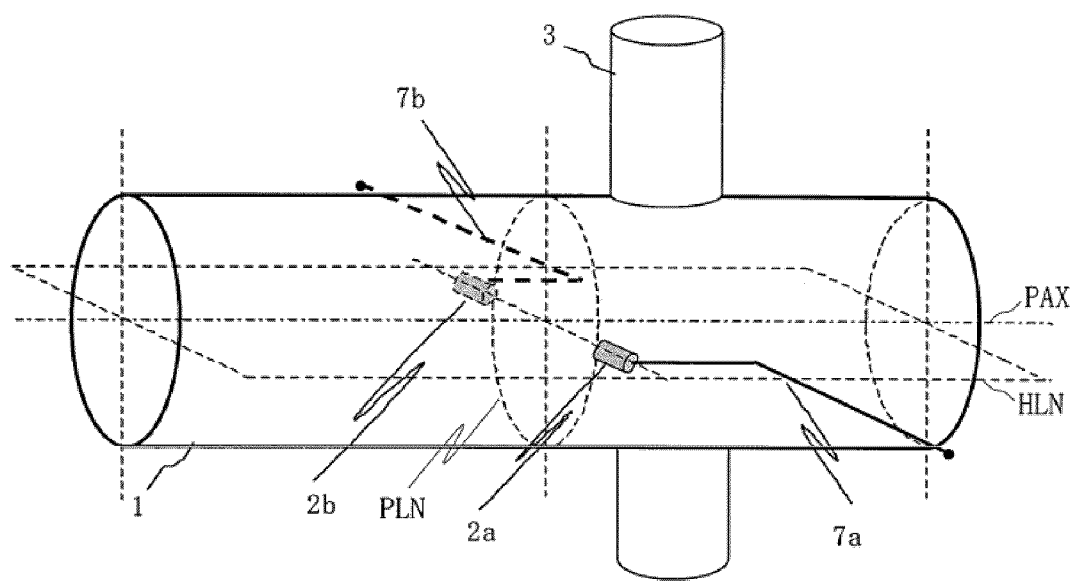
FIG. 6 is a view illustrating another example of arrangement of signal lines in the electromagnetic flowmeter according to the first embodiment of the present invention.
Figure 7:
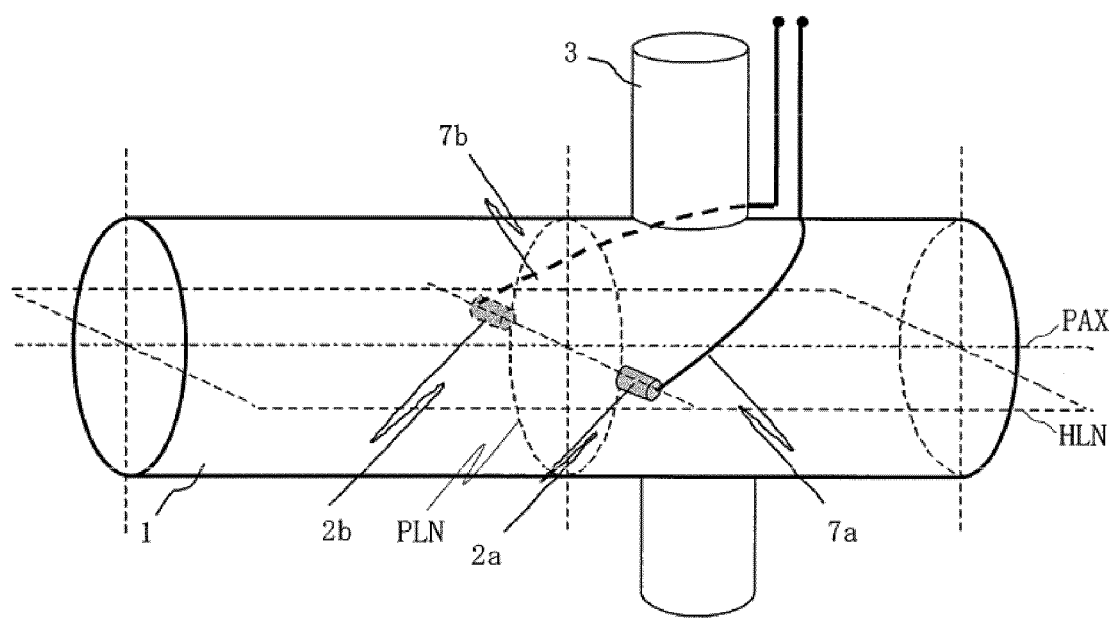
FIG. 7 is a view illustrating another example of arrangement of signal lines in the electromagnetic flowmeter according to the first embodiment of the present invention.
Figure 8:
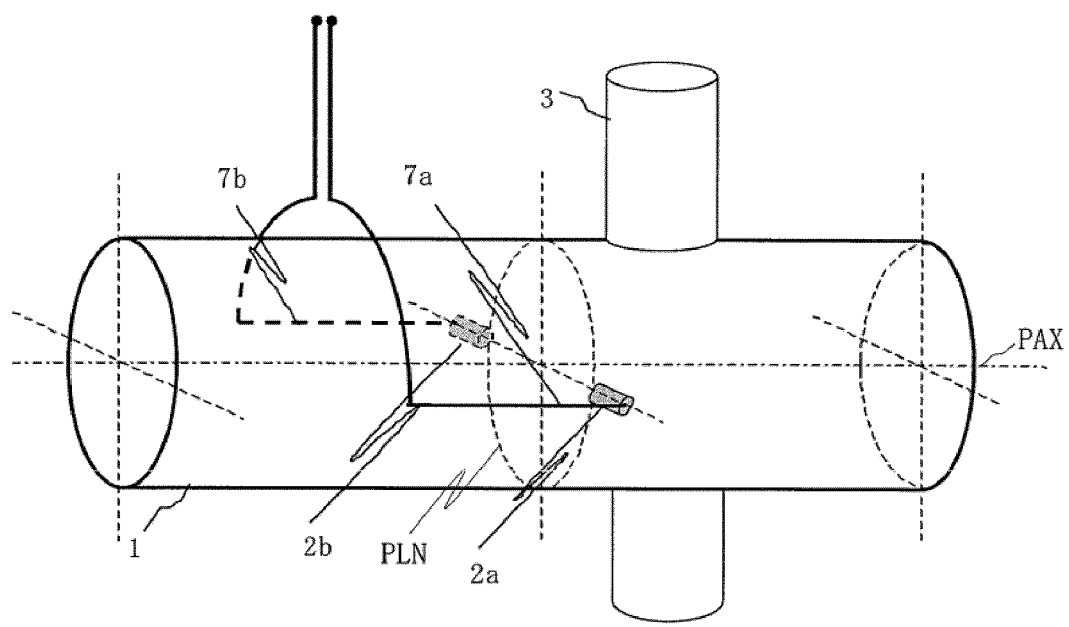
FIG. 8 is a view illustrating another example of arrangement of signal lines in the electromagnetic flowmeter according to the first embodiment of the present invention.

Another example of arrangement of signal lines 7a, 7b according to this embodiment is shown in FIGS. 6 to 8. The power supply 4, the signal conversion unit 5, and the flow rate output unit 6 are the same as those in FIG. 5. Therefore, in FIGS. 6 to 8, descriptions of the power supply 4, the signal conversion unit 5, and the flow rate output unit 6 will not be given. FIGS. 6 and 7 illustrate examples of arrangements of the signal lines 7a, 7b in the direction of the exciting coil 3 with respect to the electrodes 2a, 2b in the same manner as in FIG. 5. FIG. 8 illustrate an example of arrangement of the signal lines 7a, 7b in the direction opposite to the exciting coil 3 with respect to the electrodes 2a, 2b. In the example of FIG. 6, the signal lines 7a, 7b are arranged in parallel with the plane HLN including the axis PAX of the measuring tube and the axis EAX of the electrodes, and the lengths of the signal lines 7a, 7b are configured to be shorter than that in the case of FIG. 5. In the example of FIG. 7, the signal lines 7a, 7b are arranged with an angle not in parallel with the plane HLN.

The effect exerted by the magnetic field B generated by the exciting coil 3 on the signal lines 7a, 7b is determined based on variation of the magnetic flux interlinking with the signal lines 7a, 7b. When, as shown in the examples of FIGS. 5 to 7, the signal lines 7a, 7b are arranged in the direction of the exciting coil 3 with respect to the electrodes 2a, 2b, the variation of the magnetic flux interlinking with the signal lines 7a, 7b increases. In this case, the electromotive force of the ∂A/∂t component generated in the signal lines 7a, 7b are in the same direction as the electromotive force of the ∂A/∂t component generated in the fluid according to the time-change of the magnetic field B as described in FIG. 2. Therefore, the difference between the electromotive force of the ∂A/∂t component detected at an end portion of the signal line 7a on the side of the signal conversion unit and the electromotive force of the ∂A/∂t component detected at an end portion of the signal line 7b on the side of the signal conversion unit is larger than the electromotive force of the ∂A/∂t component generated in the fluid.

When, as shown in the example of FIG. 8, the signal lines 7a, 7b are arranged in the direction opposite to the exciting coil 3 with respect to the electrodes 2a, 2b, the electromotive force of the ∂A/∂t component generated in the signal lines 7a, 7b are in the opposite direction as the electromotive force of the ∂A/∂t component generated in the fluid according to the time-change of the magnetic field B as described in FIG. 3. Therefore, the difference between the electromotive force of the ∂A/∂t component detected at an end portion of the signal line 7a on the side of the signal conversion unit and the electromotive force of the ∂A/∂t component detected at an end portion of the signal line 7b on the side of the signal conversion unit is smaller than the electromotive force of the ∂A/∂t component generated in the fluid.

As described above, according to this embodiment, when the electromotive force (vector Va) of the ∂A/∂t component obtained from the signal lines 7a, 7b is small, the signal lines 7a, 7b are arranged in the direction of the exciting coil 3 with respect to the electrodes 2a, 2b, whereby the electromotive force of the ∂A/∂t component can be increased without changing important parameters such as the excitation frequency, the arrangement of the electrodes 2a, 2b, and the magnitude of the magnetic field B. On the other hand, according to this embodiment, when the electromotive force (vector Va) of the ∂A/∂t component obtained from the signal lines 7a, 7b is large, the signal lines 7a, 7b are arranged in the direction opposite to the exciting coil 3 with respect to the electrodes 2a, 2b, whereby the electromotive force of the ∂A/∂t component can be decreased without changing important parameters such as the excitation frequency, the arrangement of the electrodes 2a, 2b, and the magnitude of the magnetic field B.

Since the variation of the magnetic flux intersecting with the signal lines 7a, 7b is different according to the length and the angle of the signal lines 7a, 7b, the magnitude of the electromotive force of the ∂A/∂t component obtained from the signal lines 7a, 7b is different in each of the cases of FIGS. 5 to 7. That is, the electromotive force of the ∂A/∂t component can be adjusted by the arrangement of the signal lines 7a, 7b.

As described above, in this embodiment, the electromotive force of the ∂A/∂t component obtained from the signal lines 7a, 7b can be set to a magnitude appropriate for the asymmetric excitation electromagnetic flowmeter. As a result, in this embodiment, accurate span correction can be automatically performed, and highly accurate flow rate measurement can be executed. The magnitude appropriate for the ∂A/∂t component is determined based on a target precision, resolution, and range-ability, and based on a circuit configuration achieving the target precision, resolution, and range-ability.

Second Embodiment

Figure 9:
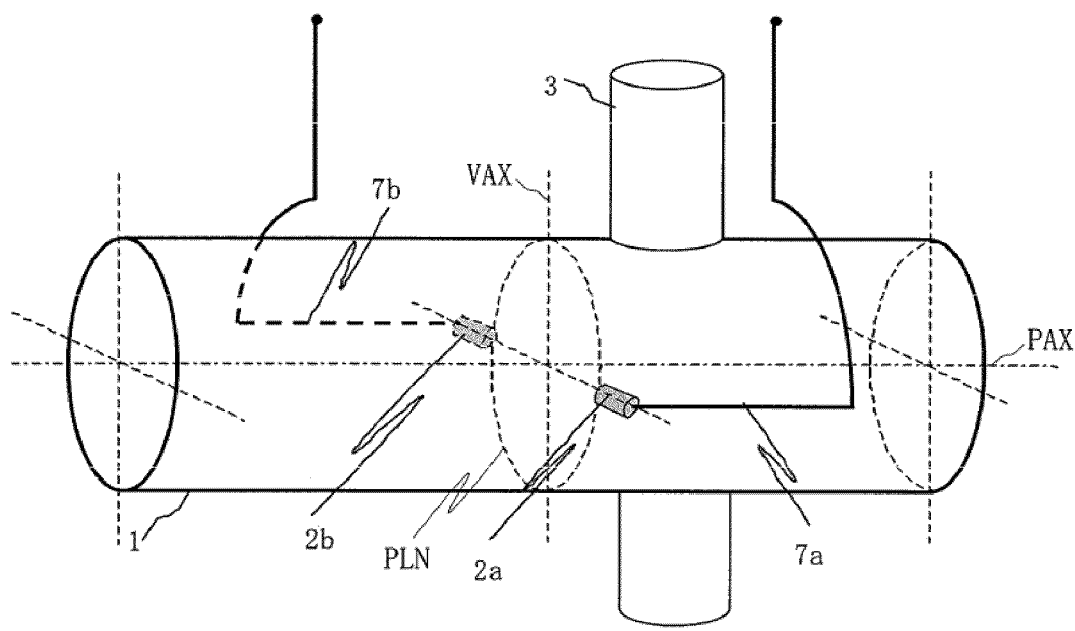
FIG. 9 is a block diagram illustrating a configuration of an electromagnetic flowmeter according to a second embodiment of the present invention.

Subsequently, a second embodiment of the present invention will be described. FIG. 9 is a block diagram illustrating a configuration of an electromagnetic flowmeter according to the second embodiment of the present invention. The electromagnetic flowmeter according to this embodiment includes one exciting coil and a pair of electrodes 2a, 2b. The signal line 7a and the signal line 7b are arranged on the opposite sides with respect to the plane PLN including the electrodes 2a, 2b. In the same manner as the first embodiment, the exciting coil 3 is arranged at a position away from the plane PLN by an offset distance in the direction of the axis of the measuring tube.

The lengths of the signal lines 7a, 7b may not be the same. Further, the signal lines 7a, 7b may not be arranged rotationally symmetrical with respect to an axis VAX intersecting with both of the axis PAX of the measuring tube and the axis EAX of the electrodes and passing an intersection of the axis PAX of the measuring tube and the axis EAX of the electrodes. The power supply 4, the signal conversion unit 5, and the flow rate output unit 6 are the same as those of the first embodiment. Therefore, in FIG. 9, descriptions of the power supply 4, the signal conversion unit 5, and the flow rate output unit 6 will not be given.

In this embodiment, as described in FIG. 4, the electromotive force of the ∂A/∂t component generated by the signal line 7a is in the same direction as the electromotive force of the ∂A/∂t component generated in the fluid according to a time-change of the magnetic field B, and is in the direction opposite to the electromotive force of the ∂A/∂t component generated in the fluid by the electromotive force of the ∂A/∂t component generated in the other signal line 7b. In this embodiment, the magnitude of the electromotive force (vector Va) of the ∂A/∂t component obtained from the signal lines 7a, 7b can be freely adjusted by the length and the arrangement position of the signal lines 7a, 7b. Therefore, compared with the first embodiment, the magnitude of the electromotive force of the ∂A/∂t component obtained from the signal lines 7a, 7b can be set more precisely.

Third Embodiment

Figure 10:
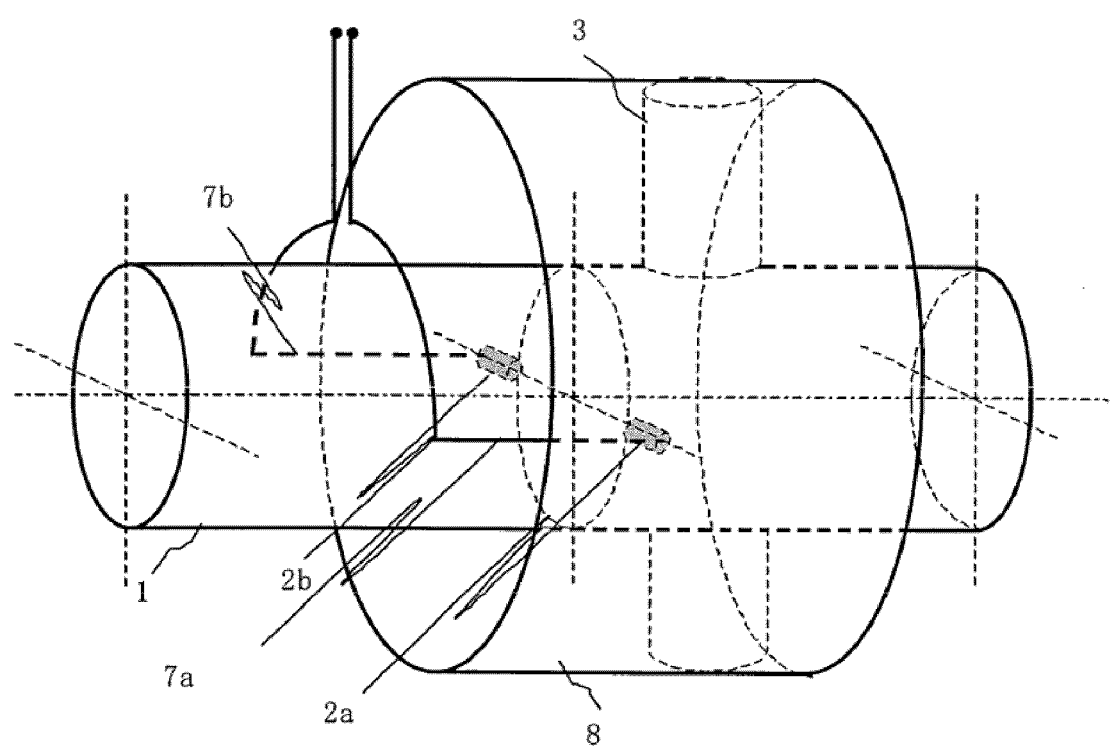
FIG. 10 is a block diagram illustrating a configuration of an electromagnetic flowmeter according to a third embodiment of the present invention.

Subsequently, a third embodiment of the present invention will be described. FIG. 10 is a block diagram illustrating a configuration of an electromagnetic flowmeter according to the third embodiment of the present invention. In a generally-available electromagnetic flowmeter, an electromagnetic flowmeter is often covered by a magnetic body called an outer core in order to efficiently return magnetism generated by an exciting coil back to the exciting coil. In this embodiment, the signal lines 7a, 7b of the first and second embodiments are arranged inside the outer core 8.

The power supply 4, the signal conversion unit 5, and the flow rate output unit 6 are the same as those of the first embodiment. Therefore, in FIG. 10, descriptions of the power supply 4, the signal conversion unit 5, and the flow rate output unit 6 will not be given. When there is an outer core 8 as in this embodiment, a magnetic field is concentrated on the inner side of the outer core 8. Therefore, by arranging the signal lines 7a, 7b on the inner side of the outer core 8, the configurable range of the electromotive force (vector Va) of the ∂A/∂t component obtained from the signal lines 7a, 7b can be expanded compared with the first and second embodiments.

Fourth Embodiment

Figure 11:
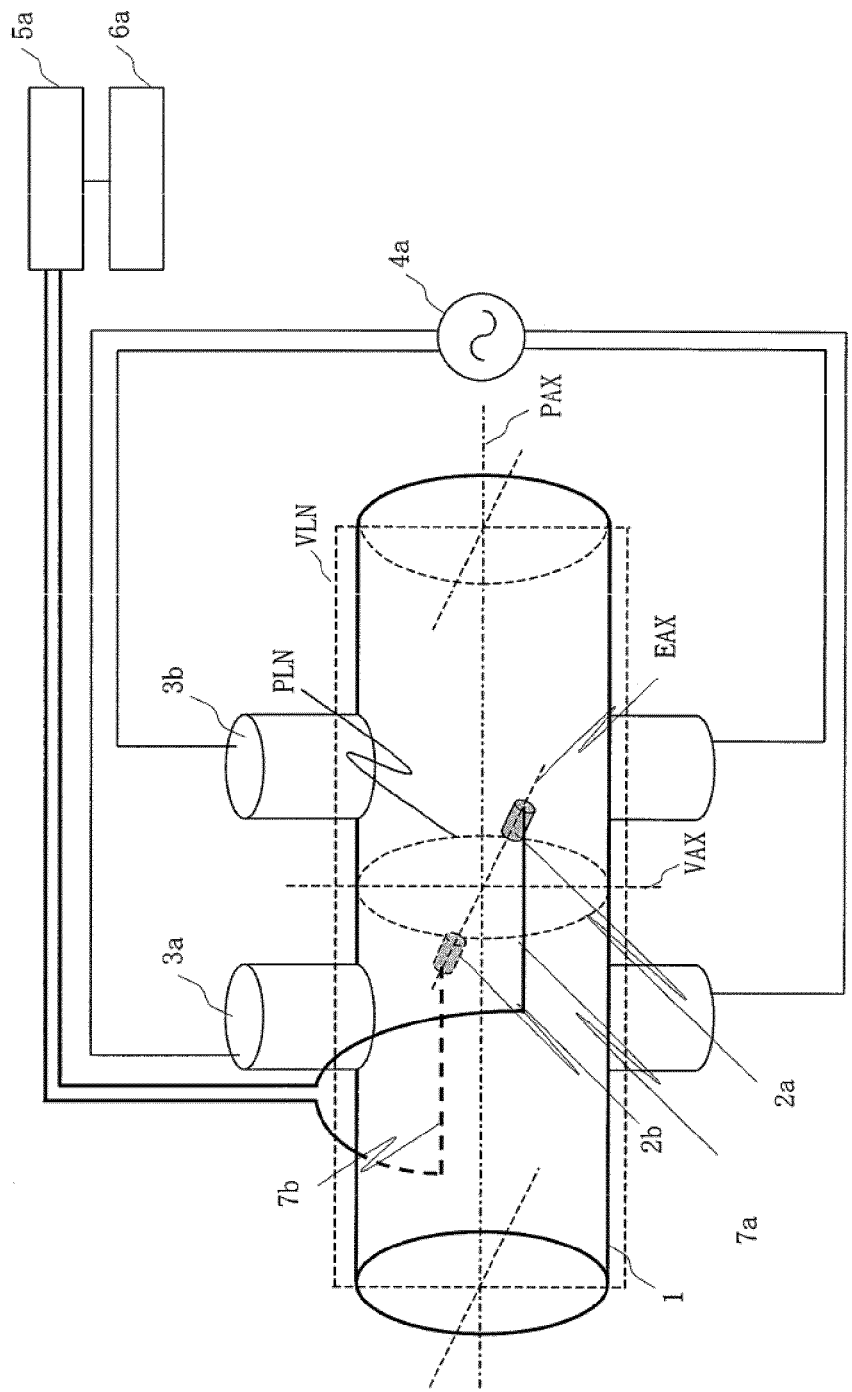
FIG. 11 is a block diagram illustrating a configuration of an electromagnetic flowmeter according to a fourth embodiment of the present invention.

Subsequently, a fourth embodiment of the present invention will be described. FIG. 11 is a block diagram illustrating a configuration of an electromagnetic flowmeter according to the fourth embodiment of the present invention. The electromagnetic flowmeter according to this embodiment includes a measuring tube 1, electrodes 2a, 2b, first and second exciting coils 3a, 3b, a power supply 4 for supplying exciting currents to the first and second exciting coil 3a, 3b to generate a magnetic field B, a signal conversion unit 5a, a flow rate output unit 6a, and signal lines 7a, 7b. The first and second exciting coil 3a, 3b apply, to a fluid to be measured, the time-changing magnetic field asymmetric on the front and rear sides of the measuring tube 1 which are bordered on a plane PLN being perpendicular to an axis PAX of the measuring tube 1 and including the electrodes 2a, 2b, with the plane PLN serving as a boundary of the measuring tube 1. The signal conversion unit 5a is connected to the other ends of the later-described signal lines, and extracts the ∂A/∂t component from an electromotive force obtained from the signal lines. The flow rate output unit 6a removes a variation factor for a span which is a coefficient relating to a magnitude V of a flow velocity of the v×B component in the electromotive force based on the extracted ∂A/∂t component, and calculates the flow rate of the fluid to be measured from the result obtained by removing the variation factor. The signal lines 7a, 7b connect between the electrodes 2a, 2b and the signal conversion unit 5a.

The electromagnetic flowmeter according to this embodiment includes two exciting coils 3a, 3b and a pair of electrodes 2a, 2b. The first exciting coil 3a is arranged at a location away by an offset distance d1 from the plane PLN to a downstream side, for example. The second exciting coil 3b is arranged at a location away by an offset distance d2 from the plane PLN to an upstream side, for example, such that the second exciting coil 3b faces the first exciting coil 3a with the plane PLN therebetween.

The lengths of the signal lines 7a, 7b may not be the same. Further, the signal lines 7a, 7b may be not be arranged symmetrical with respect to the plane VLN including axis PAX of the measuring tube and being perpendicular to the axis EAX of the electrodes connecting between the electrodes 2a, 2b. Examples of operations of the power supply 4a, the signal conversion unit 5a, and the flow rate output unit 6a will be described later.

When the two exciting coils 3a, 3b and the pair of electrodes 2a, 2b are arranged as in this embodiment, the signal component (the vector Vb of the v×B component) can be made larger than those in the first to third embodiments which include the one exciting coil 3 and the pair of electrodes 2a, 2b.

When the signal lines 7a, 7b are arranged in the direction of the first exciting coil 3a with respect to the electrodes 2a, 2b as shown in FIG. 11, the electromotive force of the ∂A/∂t component generated in the signal lines 7a, 7b caused by a change in the magnetic field generated by the first exciting coil 3a is in the same direction as the electromotive force of the ∂A/∂t component generated in the fluid. The electromotive force of the ∂A/∂t component generated in the signal lines 7a, 7b caused by a change in the magnetic field generated by the second exciting coil 3b is in the direction opposite to the electromotive force of the ∂A/∂t component generated in the fluid. As a result, the difference between the electromotive force of the ∂A/∂t component detected at an end portion of the signal line 7a on the side of the signal conversion unit and the electromotive force of the ∂A/∂t component detected at an end portion of the signal line 7b on the side of the signal conversion unit is greatly affected by a change of a magnetic field generated by the first exciting coil 3a.

When the signal lines 7a, 7b are arranged in the direction of the second exciting coil 3b with respect to the electrodes 2a, 2b, the electromotive force of the ∂A/∂t component generated in the signal lines 7a, 7b caused by a change in the magnetic field generated by the second exciting coil 3b is in the same direction as the electromotive force of the ∂A/∂t component generated in the fluid. The electromotive force of the ∂A/∂t component generated in the signal lines 7a, 7b caused by a change in the magnetic field generated by the first exciting coil 3a is in the direction opposite to the electromotive force of the ∂A/∂t component generated in the fluid. As a result, the difference between the electromotive force of the ∂A/∂t component detected at the end portion of the signal line 7a on the side of the signal conversion unit and the electromotive force of the ∂A/∂t component detected at the end portion of the signal line 7b on the side of the signal conversion unit is greatly affected by a change of a magnetic field generated by the second exciting coil 3b. The arrangement of the signal lines 7a, 7b may be determined in view of the above characteristics.

Fifth Embodiment

Figure 12:
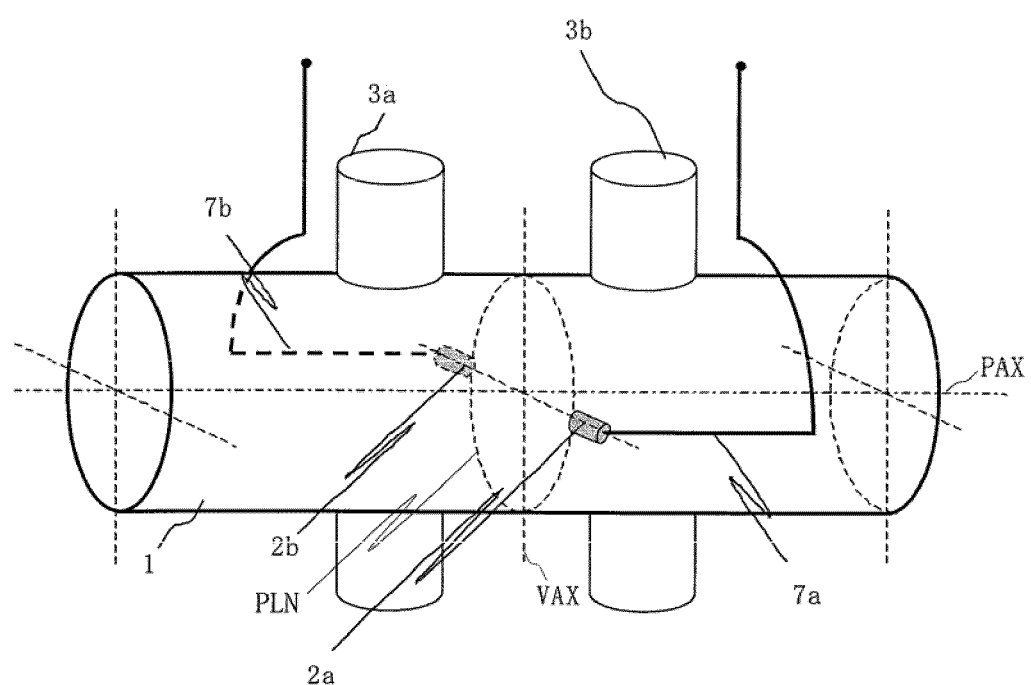
FIG. 12 is a block diagram illustrating a configuration of an electromagnetic flowmeter according to a fifth embodiment of the present invention.

Subsequently, a fifth embodiment of the present invention will be described. FIG. 12 is a block diagram illustrating a configuration of an electromagnetic flowmeter according to the fifth embodiment of the present invention. In this embodiment, another example of arrangement of signal lines 7a, 7b in the electromagnetic flowmeter according to the fourth embodiment is shown. The signal line 7a and the signal line 7b are arranged on the opposite sides with respect to the plane PLN including the electrodes 2a, 2b. The arrangement of the first and second exciting coils 3a, 3b is the same as that of the fourth embodiment.

The lengths of the signal lines 7a, 7b may not be the same. Further, the signal lines 7a, 7b may not be arranged rotationally symmetrical with respect to an axis VAX intersecting with both of the axis PAX of the measuring tube and the axis EAX of the electrodes and passing an intersection of the axis PAX of the measuring tube and the axis EAX of the electrodes. The power supply 4a, the signal conversion unit 5a, and the flow rate output unit 6a are the same as those of the fourth embodiment. Therefore, in FIG. 12, descriptions of the power supply 4a, the signal conversion unit 5a, and the flow rate output unit 6a will not be given.

In this embodiment, the electromotive force of the $\partial A/\partial t$ component generated in one of the signal lines is in the same direction as the electromotive force of the $\partial A/\partial t$ component generated in the fluid, and the electromotive force of the $\partial A/\partial t$ component generated in the other of the signal lines is in the direction opposite to the electromotive force of the $\partial A/\partial t$ component generated in the fluid. Further, the electromotive force generated in the respective signal lines 7a, 7b change in response to the magnitude and the phase of the magnetic field generated by the first and second exciting coils 3a, 3b.

In this embodiment, the magnitude of the electromotive force (vector Va) of the $\partial A/\partial t$ component obtained from the signal lines 7a, 7b can be freely adjusted by the length and the arrangement position of the signal lines 7a, 7b. Therefore, compared with the fourth embodiment, the magnitude of the electromotive force of the $\partial A/\partial t$ component obtained from the signal lines 7a, 7b can be set more precisely. For example, when the first exciting coil 3a and the second exciting coil 3b are excited in the opposite phases, the electromotive force of the $\partial A/\partial t$ component generated in the signal lines 7a, 7b by a variation of the magnetic field generated by the first exciting coil 3a and the second exciting coil 3b tends to decrease, whereas the electromotive force of the $\partial A/\partial t$ component generated in the fluid tends to increase.

Sixth Embodiment

Figure 13:
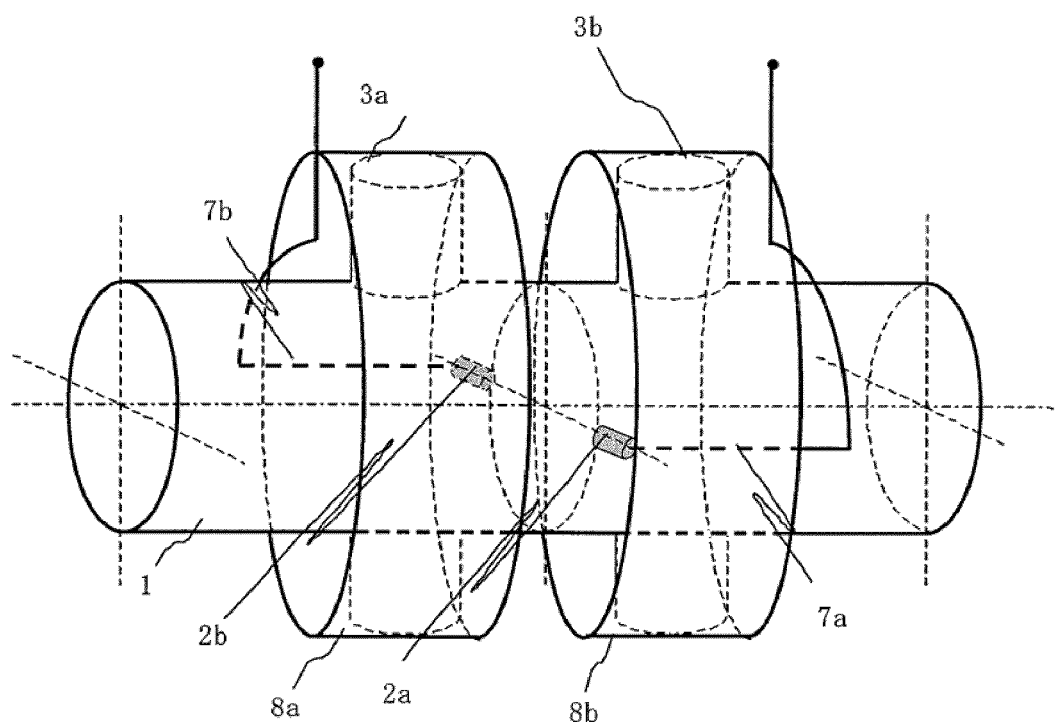
FIG. 13 is a block diagram illustrating a configuration of an electromagnetic flowmeter according to a sixth embodiment of the present invention.

Subsequently, a sixth embodiment of the present invention will be described. FIG. 13 is a block diagram illustrating a configuration of an electromagnetic flowmeter according to the sixth embodiment of the present invention. In this embodiment, the signal line 7b of the fourth and fifth embodiments is arranged inside the first outer core 8a, and the signal line 7a is arranged inside the second outer core 8b.

The power supply 4a, the signal conversion unit 5a, and the flow rate output unit 6a are the same as those of the fourth embodiment. Therefore, in FIG. 13, descriptions of the power supply 4a, the signal conversion unit 5a, and the flow rate output unit 6a will not be given. When there are first and second outer cores 8a, 8b as in this embodiment, a magnetic field is concentrated on the inner side of the first and second outer cores 8a, 8b. Therefore, by arranging the signal lines 7a, 7b on the inner side of the first and second outer cores 8a, 8b, the configurable range of the electromotive force (vector Va) of the $\partial A/\partial t$ component obtained from the signal lines 7a, 7b can be expanded compared with the fourth and fifth embodiments.

Seventh Embodiment

Figure 14:
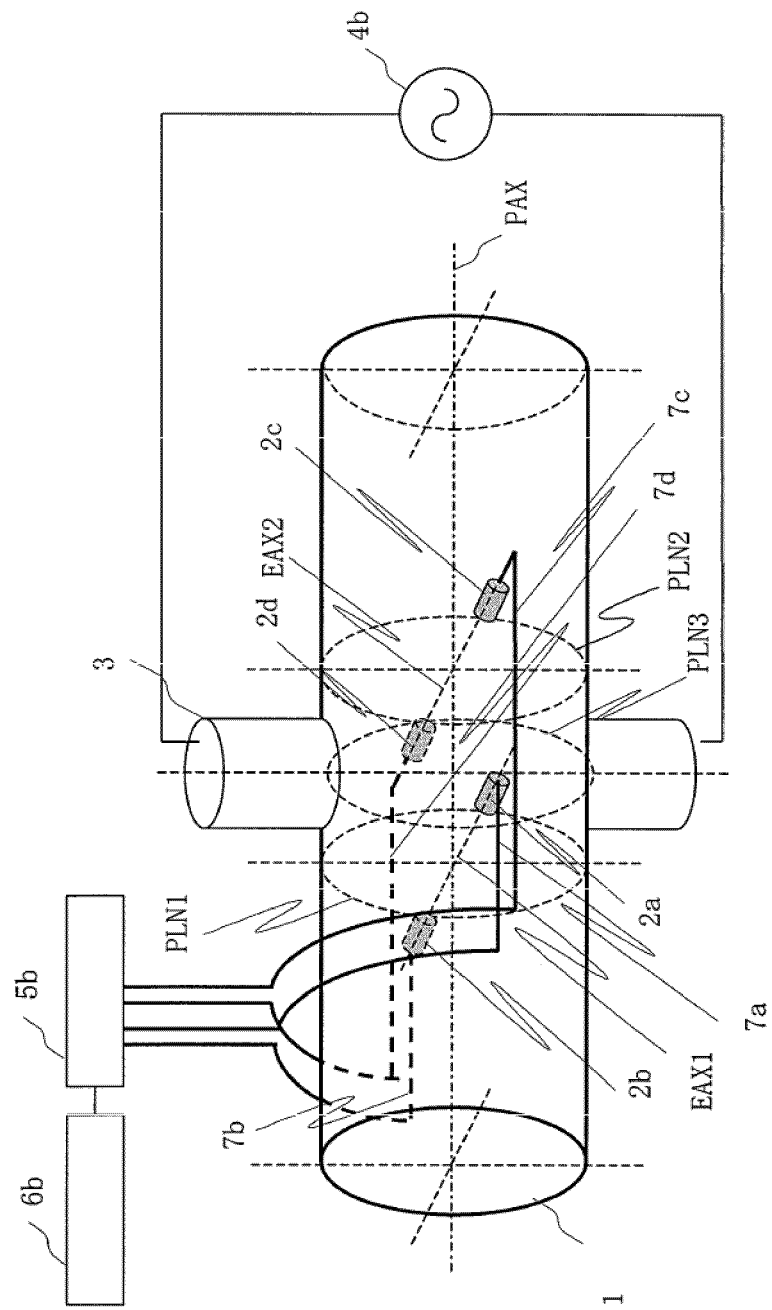
FIG. 14 is a block diagram illustrating a configuration of an electromagnetic flowmeter according to a seventh embodiment of the present invention.

Subsequently, a seventh embodiment of the present invention will be described. FIG. 14 is a block diagram illustrating a configuration of an electromagnetic flowmeter according to the seventh embodiment of the present invention. The electromagnetic flowmeter according to this embodiment includes a measuring tube 1, first electrodes 2a, 2b and second electrodes 2c, 2d, an exciting coil 3, a power supply 4b for supplying an exciting current to the exciting coil 3 to generate the magnetic field, a signal conversion unit 5b, a flow rate output unit 6b, first signal lines 7a, 7b, and second signal lines 7c, 7d. The first electrodes 2a, 2b and the second electrodes 2c, 2d are placed to face each other in the measuring tube 1 so as to be perpendicular to both a magnetic field to be applied to the fluid to be measured and an axis PAX of the measuring tube 1 and come into contact with the fluid to be measured, and detect an electromotive force generated by the magnetic field and the flow of the fluid to be measured. The exciting coil 3 applies, to the fluid, the time-changing magnetic field asymmetric on the front and rear sides of the measuring tube 1 which are bordered on a plane PLN1, and at the same time, applies, to the fluid to be measured, the time-changing magnetic field asymmetric on the front and rear sides of the measuring tube 1 which are bordered on a plane PLN2, where the plane including the first electrodes 2a, 2b and being perpendicular to the axis PAX of the measuring tube is denoted as PLN1 and the plane including the second electrodes 2c, 2d and being perpendicular to the axis PAX of the measuring tube is denoted as PLN2. The signal conversion unit 5b is connected to the other ends of the later-described signal lines, and extracts the $\partial A/\partial t$ component from an electromotive force obtained from the signal lines. The flow rate output unit 6b removes a variation factor for a span which is a coefficient relating to a magnitude V of a flow velocity of the v×B component in the electromotive force based on the extracted $\partial A/\partial t$ component, and calculates the flow rate of the fluid to be measured from the result obtained by removing the variation factor. The first signal lines 7a, 7b connect between the first electrodes 2a, 2b and the signal conversion unit 5b. The second signal lines 7c, 7d connect between the second electrodes 2c, 2d and the signal conversion unit 5b.

The electromagnetic flowmeter according to this embodiment includes the one exciting coil 3 and the two pairs of electrodes 2a, 2b 2c, 2d. The first electrodes 2a, 2b are arranged at a position away by an offset distance d3 from a plane PLN3 to an upstream side, for example. The plane PLN3 includes the axis of the exciting coil 3 and is perpendicular to the direction of the axis PAX of the measuring tube. The second electrodes 2c, 2d are arranged at a position away by an offset distance d4 from the plane PLN3 to a downstream side, for example. The second electrodes 2c, 2d are arranged to face the first electrodes 2a, 2b with the plane PLN3 therebetween.

The lengths of the signal lines 7a, 7b, 7c, 7d may not be the same. The signal lines 7a, 7b, 7c, 7d may not be arranged symmetrical with respect to a plane including the axis PAX of the measuring tube and being perpendicular to an axis EAX1 of the electrodes connecting between the electrodes 2a, 2b and an axis EAX2 of the electrodes connecting between the electrodes 2c, 2d. Examples of operations of the power supply 4b, the signal conversion unit 5b, and the flow rate output unit 6b will be described later.

When there are the one exciting coil 3 and the two pairs of electrodes 2a, 2b, 2c, 2d as in this embodiment, the signal component (the vector Vb of the v×B component) can be made larger than those in the first to third embodiments which include the one exciting coil 3 and the one pair of electrodes 2a, 2b.

Eighth Embodiment

Figure 15:
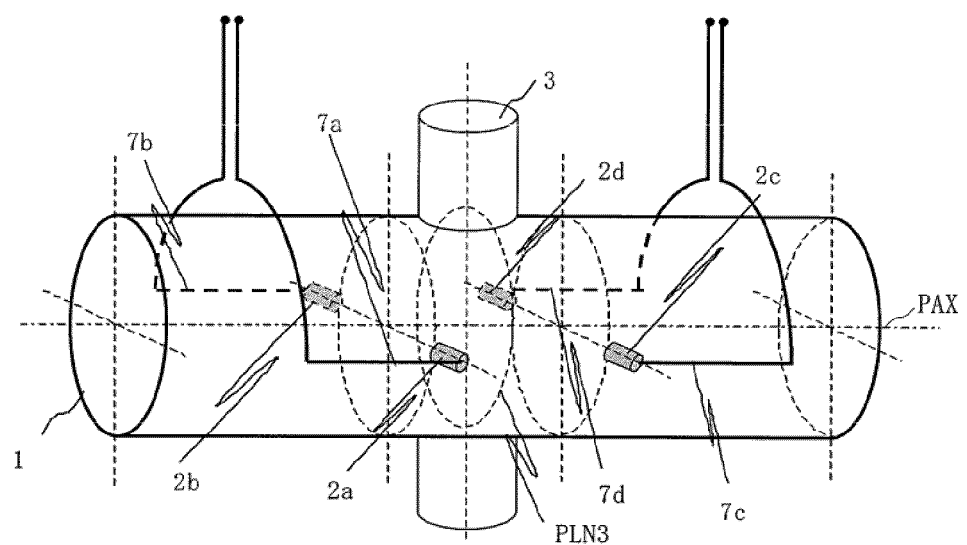
FIG. 15 is a block diagram illustrating a configuration of an electromagnetic flowmeter according to an eighth embodiment of the present invention.

Subsequently, an eighth embodiment of the present invention will be described. FIG. 15 is a block diagram illustrating a configuration of an electromagnetic flowmeter according to the eighth embodiment of the present invention. The electromagnetic flowmeter according to this embodiment includes one exciting coil 3 and two pairs of electrodes 2a, 2b, 2c, 2d. The first signal lines 7a, 7b and the second signal lines 7c, 7d are arranged on the opposite sides with respect to the plane PLN3 including the exciting coil 3. The arrangement of the electrodes 2a, 2b, 2c, 2d is the same as the seventh embodiment.

The lengths of the signal lines 7a, 7b, 7c, 7d may not be the same. The signal lines 7a, 7b, 7c, 7d may not be arranged symmetrical with respect to the plane including the axis PAX of the measuring tube and being perpendicular to an axis EAX of the electrodes connecting between the electrodes 2a, 2b and an axis EAX2 of the electrodes connecting between the electrodes 2c, 2d. Further, the signal lines 7a, 7b, 7c, 7d may not be arranged symmetrical with respect to the plane PLN3. The power supply 4b, the signal conversion unit 5b, and the flow rate output unit 6b are the same as those of the seventh embodiment. Therefore, in FIG. 15, descriptions of the power supply 4b, the signal conversion unit 5b, and the flow rate output unit 6b will not be given.

Figure 16:
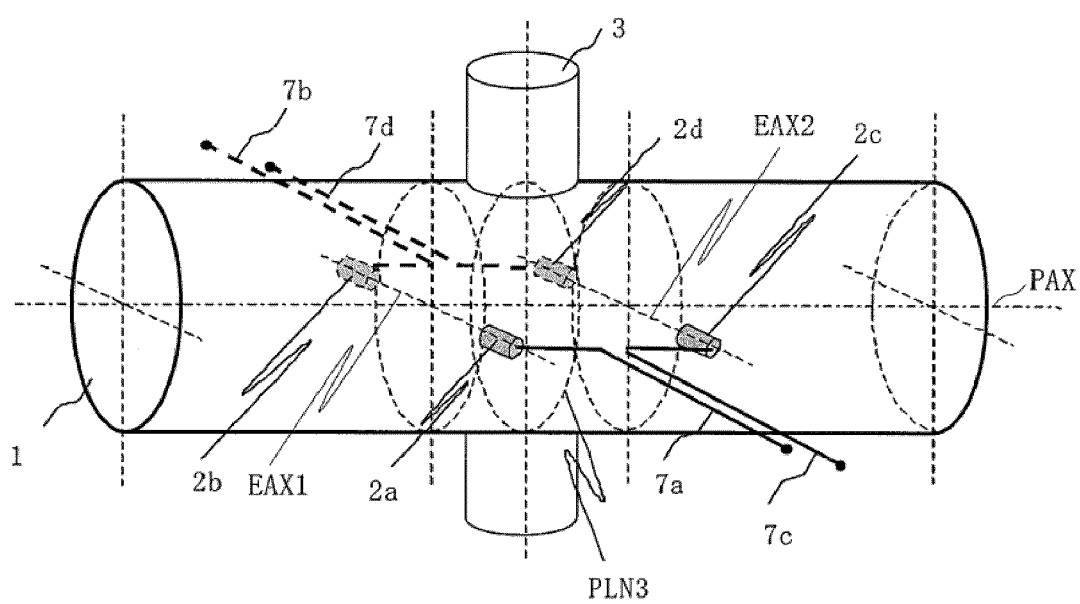
FIG. 16 is a view illustrating another example of arrangement of signal lines in the electromagnetic flowmeter according to the eighth embodiment of the present invention.
Figure 17:
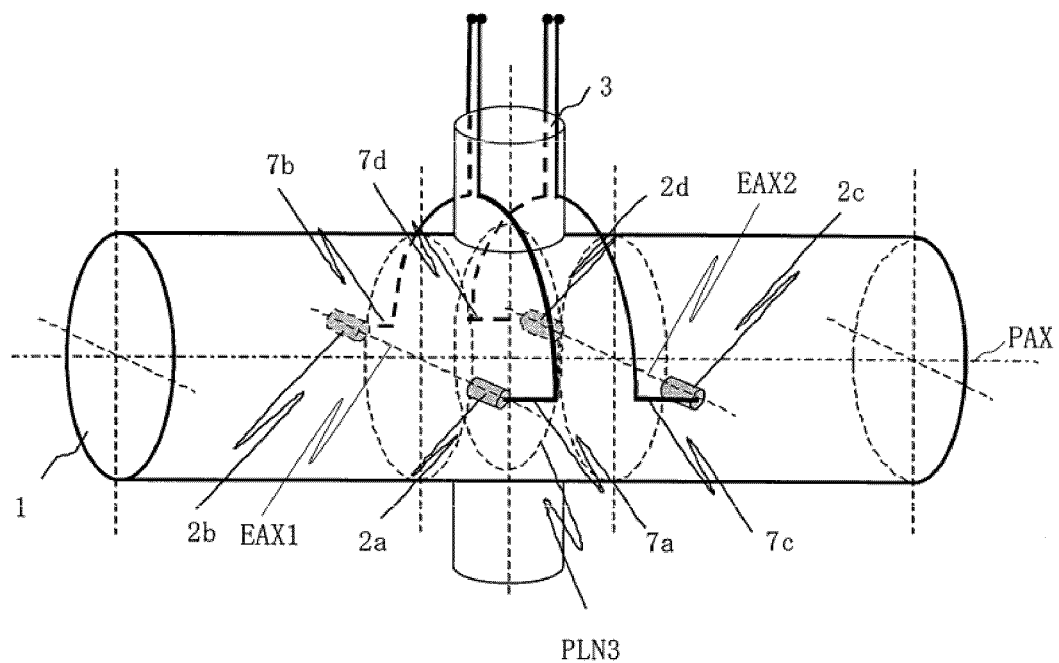
FIG. 17 is a view illustrating another example of arrangement of signal lines in the electromagnetic flowmeter according to the eighth embodiment of the present invention.

In this embodiment, another example of arrangement of the signal lines 7a, 7b, 7c, 7d according to this embodiment is shown in FIGS. 16 and 17. In the example of FIG. 15, the signal lines 7a, 7b, 7c, 7d are arranged in the directions opposite to the exciting coil 3 with respect to the electrodes 2a, 2b, 2c, 2d. In the example of FIGS. 16 and 17, the signal lines 7a, 7b, 7c, 7d are arranged in the direction of the exciting coil 3 with respect to the electrodes 2a, 2b, 2c, 2d.

As shown in the example of FIG. 15, when the signal lines 7a, 7b, 7c, 7d are arranged in the directions opposite to the exciting coil 3 with respect to the electrodes 2a, 2b, 2c, 2d, the electromotive force of the ∂A/∂t component generated in each of the first signal lines 7a, 7b and the second signal lines 7c, 7d is in the directions opposite to the first inter-electrode electromotive force generated in the fluid, i.e., the ∂A/∂t component detected by the first electrodes 2a, 2b and the second inter-electrode electromotive force generated in the fluid, i.e., the ∂A/∂t component detected by the second electrodes 2c, 2d. As a result, a difference between the electromotive force of the ∂A/∂t component detected at an end portion of the signal line 7a at the side of the signal conversion unit and the electromotive force of the ∂A/∂t component detected at an end portion of the signal line 7b at the side of the signal conversion unit and a difference between the electromotive force of the ∂A/∂t component detected at an end portion of the signal line 7c at the side of the signal conversion unit and the electromotive force of the ∂A/∂t component detected at an end portion of the signal line 7d at the side of the signal conversion unit are less than the electromotive force of the ∂A/∂t component generated in the fluid.

As shown in the examples of FIGS. 16 and 17, when the signal lines 7a, 7b, 7c, 7d are arranged in the direction of the exciting coil 3 with respect to the electrodes 2a, 2b, 2c, 2d, the electromotive force of the ∂A/∂t component generated in each of the first signal lines 7a, 7b and the second signal lines 7c, 7d is in the same direction as the first inter-electrode electromotive force and the second inter-electrode electromotive force. As a result, a difference between the electromotive force of the ∂A/∂t component detected at an end portion of the signal line 7a at the side of the signal conversion unit and the electromotive force of the ∂A/∂t component detected at an end portion of the signal line 7b at the side of the signal conversion unit and a difference between the electromotive force of the ∂A/∂t component detected at an end portion of the signal line 7c at the side of the signal conversion unit and the electromotive force of the ∂A/∂t component detected at an end portion of the signal line 7d at the side of the signal conversion unit are more than the electromotive force of the ∂A/∂t component generated in the fluid.

As described above, in this embodiment, the magnitude of the electromotive force (vector Va) of the ∂A/∂t component obtained from the signal lines 7a, 7b, 7c, 7d can be freely adjusted in the direction in which the signal lines 7a, 7b, 7c, 7d are arranged. Therefore, compared with the seventh embodiment, the magnitude of the electromotive force of the ∂A/∂t component obtained from the signal lines 7a, 7b, 7c, 7d can be set more precisely.

Ninth Embodiment

Figure 18:
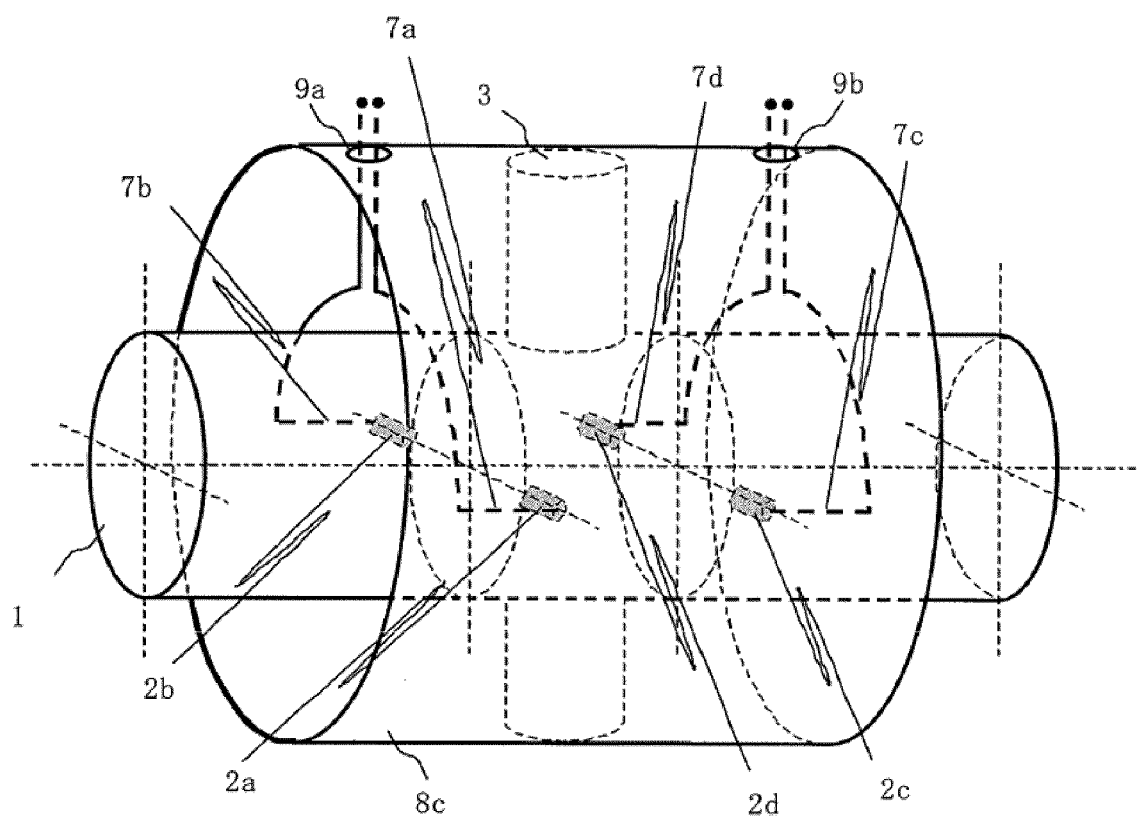
FIG. 18 is a block diagram illustrating a configuration of an electromagnetic flowmeter according to a ninth embodiment of the present invention.

Subsequently, a ninth embodiment of the present invention will be described. FIG. 18 is a block diagram illustrating a configuration of an electromagnetic flowmeter according to the ninth embodiment of the present invention. In this embodiment, the signal lines 7a, 7b, 7c, 7d of the seventh and eighth embodiments are arranged inside of an outer core 8c.

The signal lines 7a, 7b are drawn out of a hole 9a arranged on the outer core 8c to the outside of the outer core 8c. Likewise, the signal lines 7c, 7d are drawn out of a hole 9b arranged on the outer core 8c to the outside of the outer core 8c. The power supply 4b, the signal conversion unit 5b, and the flow rate output unit 6b are the same as those of the seventh embodiment. Therefore, in FIG. 18, descriptions of the power supply 4b, the signal conversion unit 5b, and the flow rate output unit 6b will not be given.

Figure 19:
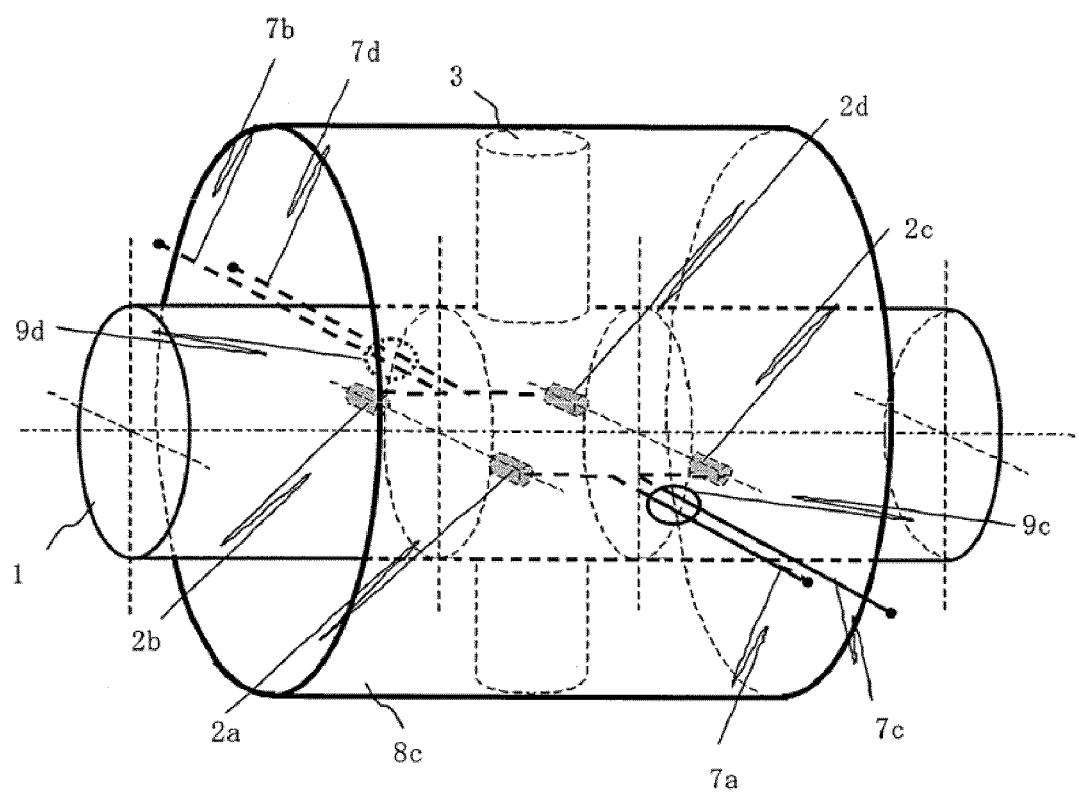
FIG. 19 is a view illustrating another example of arrangement of signal lines in the electromagnetic flowmeter according to the ninth embodiment of the present invention.

In this embodiment, another example of arrangement of the signal lines 7a, 7b, 7c, 7d according to this embodiment is shown in FIG. 19. In the example of FIG. 18, the signal lines 7a, 7b, 7c, 7d are arranged in the directions opposite to the exciting coil 3 with respect to the electrodes 2a, 2b, 2c, 2d. In the example of FIG. 19, the signal lines 7a, 7b, 7c, 7d are arranged in the direction of the exciting coil 3 with respect to the electrodes 2a, 2b, 2c, 2d. The signal lines 7a, 7c are drawn out of a hole 9c arranged on the outer core 8c to the outside of the outer core 8c. Likewise, the signal lines 7b, 7d are drawn out of a hole 9d arranged on the outer core 8c to the outside of the outer core 8c.

When there is an outer core 8c as in this embodiment, a magnetic field is concentrated on the inner side of the outer core 8c. Therefore, by arranging the signal lines 7a, 7b, 7c, 7d on the inner side of the outer core 8c, the configurable range of the electromotive force (vector Va) of the ∂A/∂t component obtained from the signal lines 7a, 7b, 7c, 7d can be expanded compared with the seventh and eighth embodiments.

Tenth Embodiment

Subsequently, a tenth embodiment of the present invention will be described. In this embodiment, the power supply 4, the signal conversion unit 5, and the flow rate output unit 6 used in the first to third embodiments will be described. The power supply 4 provides an exciting current to the exciting coil 3 while switching an excitation frequency. The signal conversion unit 5 obtains an amplitude and a phase of a resultant electromotive force obtained from the signal lines 7a, 7b in each of a first excitation state and a second excitation state, each of which having a different excitation frequency. Then, based on the amplitude and the phase of the resultant electromotive force of each of them, the signal conversion unit 5 extracts, as a ∂A/∂t component, a difference of electromotive force between the resultant electromotive force of the first excitation state and the resultant electromotive force of the second excitation state. The flow rate output unit 6 removes a variation factor for a span included in a v×B component in the resultant electromotive force of the first excitation state based on the extracted ∂A/∂t component, and calculates the flow rate of the fluid to be measured from the result obtained by removing the variation factor.

Hereinafter, operations of the power supply 4, the signal conversion unit 5, and the flow rate output unit 6 will be described in more detail. The power supply unit 4 repeats, in a T-sec cycle, the operation of continuing the first excitation state for T0 seconds in which an exciting current with an angular frequency $\omega 0$ is supplied to the exciting coil 3 and then continuing the second excitation state for T1 seconds in which an exciting current with an angular frequency $\omega 1$ is supplied to the exciting coil 3. That is, T=T0+T1.

Figure 20:
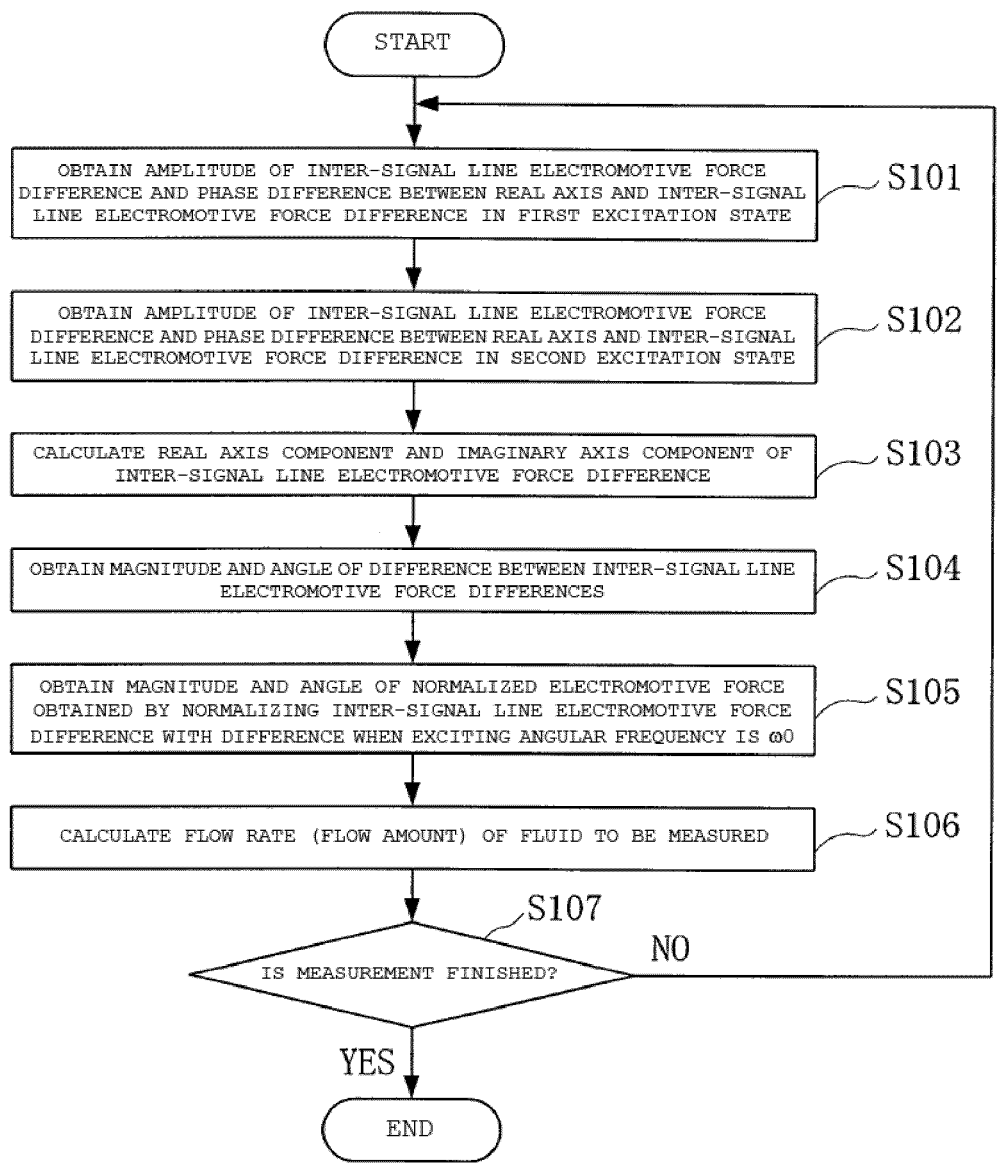
FIG. 20 is a flowchart illustrating operations of a signal conversion unit and a flow rate output unit according to a tenth embodiment of the present invention.

FIG. 20 is a flowchart illustrating the operations of the signal conversion unit 5 and the flow rate output unit 6. In FIGS. 5 to 10, a difference between the electromotive force detected at the end portion of the signal line 7b on the side of the signal conversion unit and the electromotive force detected at the end portion of the signal line 7a on the side of the signal conversion unit is referred to as an inter-signal line electromotive force difference. This inter-signal line electromotive force difference is a resultant electromotive force of an electromotive force of a v×B component caused by a flow velocity of a fluid and an electromotive force of a ∂A/∂t component caused, irrelevant of the flow velocity of the fluid, by a time-change of a magnetic field, which are detected by the electrodes 2a, 2b and the signal lines 7a, 7b, and corresponds to a resultant vector Va+Vb of the vector Va of the ∂A/∂t component and the vector Vb of the v×B component.

The signal conversion unit 5 causes a phase detector (not shown) to obtain an amplitude r10 of an inter-signal line electromotive force difference E10 in the first excitation state with the exciting angular frequency $\phi 0$, and obtain a phase difference $\phi 10$ between the real axis and the inter-signal line electromotive force difference E10 (step S101 in FIG. 20). Subsequently, the signal conversion unit 5 causes the phase detector (not shown) to obtain an amplitude r11 of an inter-signal line electromotive force difference E11 in the second excitation state with the exciting angular frequency $\omega 1$, and obtain a phase difference $\phi 11$ between the real axis and the inter-signal line electromotive force difference E11 (step S102).

The signal conversion unit 5 then calculates a real axis component E10x and an imaginary axis component E10y of the inter-signal line electromotive force difference E10, and a real axis component E11x and an imaginary axis component E11y of the inter-signal line electromotive force difference E11 according to the following equations (step S103).

$$E10x = r10 \cdot \cos(\phi 10) \quad (5)$$

$$E10y = r10 \cdot \sin(\phi 10) \quad (6)$$

$$E11x = r11 \cdot \cos(\phi 11) \quad (7)$$

$$E11y = r11 \cdot \sin(\phi 11) \quad (8)$$

After the calculation of equations (5) to (8), the signal conversion unit 5 obtains the magnitude and the angle of the electromotive force difference EdA1 between the inter-signal line electromotive force differences E10 and E11 (step S104). The signal conversion unit 5 calculates the magnitude |EdA1| of the electromotive force difference EdA1 between the inter-signal line electromotive force differences E10 and E11 according to the following equation.

$$|EdA1| = \{(E10x - E11x)^2 + (E10y - E11y)^2\}^{1/2} \cdot \omega 0 / (\omega 0 - \omega 1) \quad (9)$$

Then, the signal conversion unit 5 calculates the angle ∠EdA1 of the electromotive force difference EdA1 with respect to the real axis according to the following equation.

$$\angle EdA1 = \tan^{-1}\{(E10y - E11y)/(E10x - E11x)\} \quad (10)$$

The processing of step S104 is finished here.

The flow rate output unit 6 then obtains the magnitude and the angle of the normalized electromotive force En1 obtained by normalizing the inter-signal line electromotive force difference E10 with the electromotive force difference EdA1 (step S105). The flow rate output unit 6 calculates a magnitude |En1| of the normalized electromotive force En1 according to the following equation.

$$|En1| = (r10/|EdA1|) \cdot \omega 0 \quad (11)$$

The flow rate output unit 6 also calculates an angle ∠En1 of the normalized electromotive force En1 with respect to the real axis according to the following equation.

$$\angle En1 = \phi 10 - \angle EdA1 \quad (12)$$

The processing of step S105 is finished here.

The flow rate output unit 6 then calculates the magnitude V of the flow velocity of the fluid to be measured (step S106). The flow rate output unit 6 calculates a real axis component En1x of (En1−ω0) and an imaginary axis component En1y of (En1−ω0) according to the following equations.

$$En1x = |En1|\cos(\angle En1) - \omega 0 \quad (13)$$

$$En1y = |En1|\sin(\angle En1) \quad (14)$$

The flow rate output unit 6 then calculates the magnitude V of the flow velocity of the fluid to be measured according to the following equation.

$$V = (En1x^2 + En1y^2)^{1/2}/\gamma \quad (15)$$

The processing of step S106 is finished here.

The signal conversion unit 5 and the flow rate output unit 6 perform the processing in steps S101 to S106 described above in every cycle T until, for example, the end of the measurement is designated by the operator (YES in step S107). It should be noted that the processings in step S102 to S106 are performed in the second excitation state for duration of T1 seconds.

As described above, this embodiment is configured to extract the electromotive force difference EdA1 (the vector Va of the ∂A/∂t component) from the inter-signal line electromotive force differences E10 and E11 in the two excitation states each having a different excitation frequency. A span applied to the magnitude V of the flow velocity of the v×B component in the inter-signal line electromotive force difference E10 (resultant vector Va+Vb) is normalized by using the electromotive force difference EdA1, thereby erasing the span variation element. Therefore, in this embodiment, accurate span correction can be automatically performed, and highly accurate flow rate measurement can be executed.

Eleventh Embodiment

Subsequently, an eleventh embodiment of the present invention will be described. In this embodiment, the power supply 4a, the signal conversion unit 5a, and the flow rate output unit 6a used in the fourth to sixth embodiments will be described. The power supply 4a provides exciting currents to the first exciting coil 3a and the second exciting coil 3b while switching an excitation frequency of and a phase difference between the exciting current provided to the first exciting coil 3a and the exciting current provided to the second exciting coil 3b.

The signal conversion unit 5a obtains the amplitude and the phase of the resultant electromotive force in each of the three excitation states. The three excitation states include a first excitation state in which a phase difference between the first magnetic field generated by the first exciting coil 3a and the second magnetic field generated by the second exciting coil 3b is $\Delta\theta 3$ and the exciting angular frequency is $\omega 0$, a second excitation state in which the phase difference between the first magnetic field and the second magnetic field has changed from $\Delta\theta 3$ to $\Delta\theta 3+\pi$ with respect to the first excitation state, and a third excitation state in which the excitation angular frequency has changed to $\omega 1$ with respect to the second excitation state. The signal conversion unit 5a extracts, as a $\partial A/\partial t$ component, an electromotive force difference between the resultant electromotive force of the second excitation state and the resultant electromotive force of the third excitation state based on the amplitudes and the phases. The flow rate output unit 6a removes a variation factor for a span included in the v×B component in the electromotive force of the first excitation state based on the extracted $\partial A/\partial t$ component, and calculates the flow rate of the fluid to be measured from the result obtained by removing the variation factor.

Hereinafter, operations of the power supply 4a, the signal conversion unit 5a, and the flow rate output unit 6a will be described in more detail. In this embodiment, it is assumed that a distance d1 from the plane PLN to the first exciting coil 3a and a distance d2 from the plane PLN to the second exciting coil 3b are substantially the same in FIGS. 11 to 13.

The power supply unit 4a repeats, in a T-sec cycle, the operation of continuing the first excitation state for T0 seconds in which a first exciting current with an angular frequency $\omega 0$ is supplied to the exciting coil 3a and at the same time the second exciting current with a phase difference $\Delta\theta 3$ with respect to the first exciting current and the angular frequency $\omega 0$ to the second exciting coil 3b, continuing the second excitation state for T1 seconds in which the phase difference between the first and second exciting currents in the first excitation state has been changed to $\Delta\theta 3+\pi$, and continuing the third excitation state for T2 seconds wherein the angular frequency of the first and second exciting currents in the second excitation state has been changed to $\omega 1$. That is, T=T0+T1+T2.

FIG. 12 is a flowchart illustrating the operations of the signal conversion unit 5a and the flow rate output unit 6a. In the same manner as the tenth embodiment, in FIGS. 11 to 13, the difference between the electromotive force detected at the end portion of the signal line 7b on the side of the signal conversion unit and the electromotive force detected at the end portion of the signal line 7a on the side of the signal conversion unit is referred to as the inter-signal line electromotive force difference.

Figure 21:
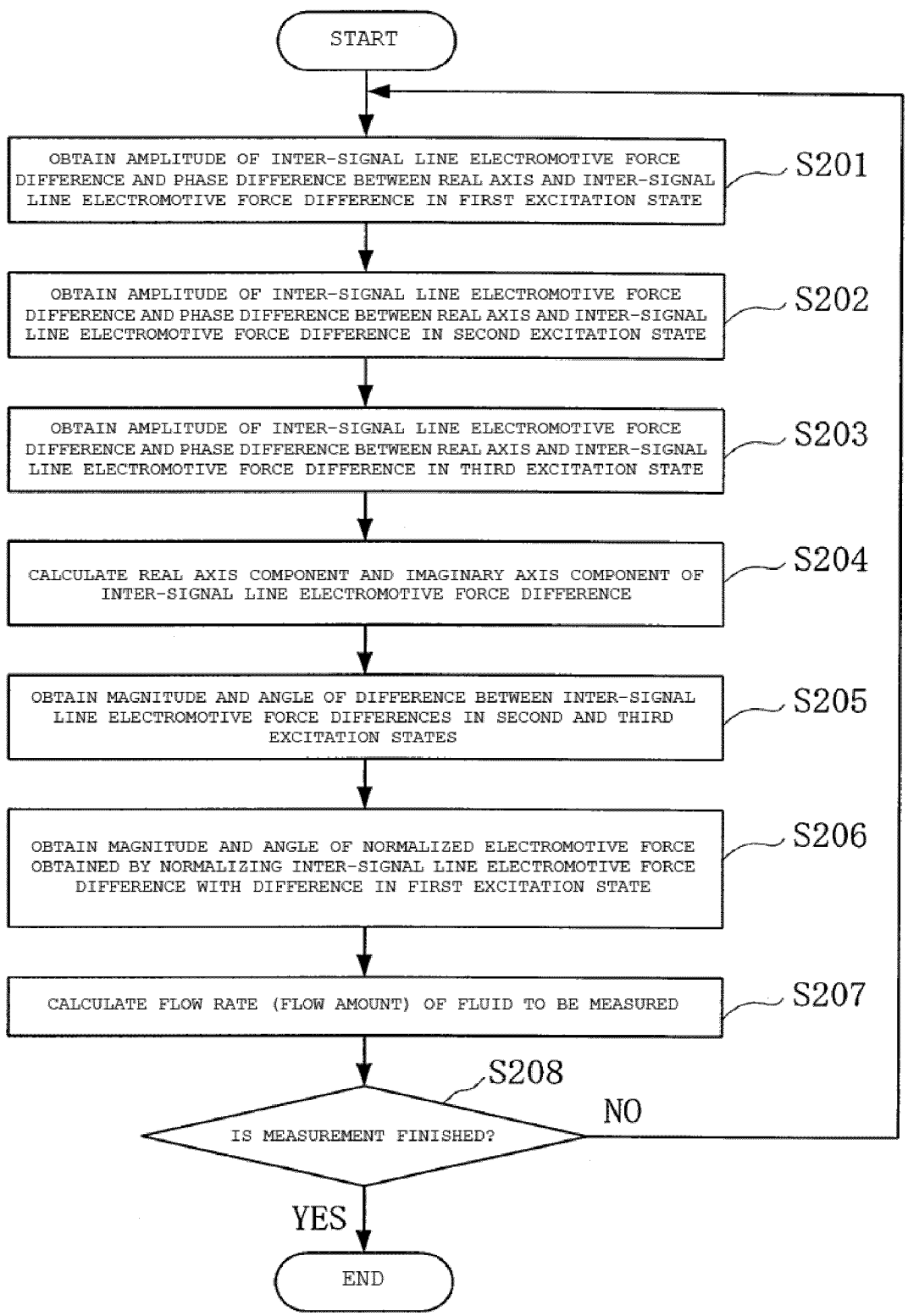
FIG. 21 is a flowchart illustrating operations of a signal conversion unit and a flow rate output unit according to an eleventh embodiment of the present invention.

First of all, the signal conversion unit 5a causes a phase detector (not shown) to obtain an amplitude r20 of the inter-signal line electromotive force difference E20 in the first excitation state wherein the first exciting current with the angular frequency $\omega 0$ is supplied to the first exciting coil 3a, and the second exciting current with the phase difference $\Delta\theta 3$ with respect to the first exciting current and the angular frequency $\omega 0$ is supplied to the second exciting coil 3b, and obtain a phase difference $\phi 20$ between the real axis and the inter-signal line electromotive force difference E20 (step S201 in FIG. 21).

Subsequently, the signal conversion unit 5a causes the phase detector to obtain an amplitude r2π0 of the inter-signal line electromotive force difference E2π0 in the second excitation state wherein the phase difference between the first and second exciting currents in the first excitation state has been changed to $\Delta\theta 3+\pi$, and obtain a phase difference $\phi 2\pi 0$ between the real axis and the inter-signal line electromotive force difference E2π0 (step S202).

In addition, the signal conversion unit 5a causes the phase detector to obtain an amplitude r2π1 of the inter-signal line electromotive force difference E2π1 in the third excitation state wherein the angular frequency of the first and second exciting currents in the second excitation state has been changed $\omega 1$, and obtain a phase difference $\phi 2\pi 1$ between the real axis and the inter-signal line electromotive force E2π1 (step S203).

The signal conversion unit 5a then calculates a real axis component E20x and an imaginary axis component E20y of the inter-signal line electromotive force difference E20, a real axis component E2π0x and an imaginary axis component E2π0y of the inter-signal line electromotive force difference E2π0, and a real axis component E2π1x and an imaginary axis component E2π1y of the inter-signal line electromotive force E2π1 according to the following equations (step S204).

$$E20x = r20 \cdot \cos(\phi 20) \quad (16)$$

$$E20y = r20 \cdot \sin(\phi 20) \quad (17)$$

$$E2\pi 0x = r2\pi 0 \cdot \cos(\phi 2\pi 0) \quad (18)$$

$$E2\pi 0y = r2\pi 0 \cdot \sin(\phi 2\pi 0) \quad (19)$$

$$E2\pi 1x = r2\pi 1 \cdot \cos(\phi 2\pi 1) \quad (20)$$

$$E2\pi 1y = r2\pi 1 \cdot \sin(\phi 2\pi 1) \quad (21)$$

After the calculation of equations (16) to (21), the signal conversion unit 5a obtains the magnitude and angle of the electromotive force difference EdA2 between the inter-signal line electromotive force differences E2π0 and E2π1 (step S205). The signal conversion unit 5a calculates a magnitude |EdA2| of the electromotive force difference EdA2 between the inter-signal line electromotive force differences E2π0 and E2π1 according to the following equation.

$$|EdA2| = \{(E2\pi 0x - E2\pi 1x)^2 + (E2\pi 0y - E2\pi 1y)^2\}^{1/2} \cdot \omega 0/(\omega 0 - \omega 1) \quad (22)$$

The signal conversion unit 5a then calculates an angle $\angle EdA2$ of the electromotive force difference EdA2 with respect to the real axis according to the following equation.

$$\angle EdA2 = \tan^{-1}\{(E2\pi 0y - E2\pi 1y)/(E2\pi 0x - E2\pi 1x)\} \quad (23)$$

The processing of step S205 is finished here.

The flow rate output unit 6a then obtains the magnitude and the angle of the normalized electromotive force En2 obtained by normalizing the inter-signal line electromotive force difference E20 with the electromotive force difference EdA2 (step S206). The flow rate output unit 6a calculates a magnitude |En2| of the normalized electromotive force En2 according to the following equation.

$$|En2| = (r20/|EdA2|) \cdot \omega 0 \quad (24)$$

The flow rate output unit 6a also calculates an angle ∠En2 of the normalized electromotive force En2 with respect to the real axis according to the following equation.

$$\angle En2 = \phi 20 - \angle EdA2 \quad (25)$$

The processing of step S206 is finished here.

The flow rate output unit 6a then calculates the magnitude V of the flow velocity of the fluid to be measured according to following equation (step S207).

$$V = |En2/[\gamma \cdot \exp\{j \cdot (-\pi/2 + \Delta\theta 01)\}]| = |En2|/\gamma \quad (26)$$

The coefficient γ and the angle Δθ01 are constants which can be obtained in advance by calibration and the like.

The signal conversion unit 5a and the flow rate output unit 6a perform the processing in steps S201 to S207 described above in every cycle T until, for example, the end of the measurement is designated by the operator (YES in step S208). Note that the processing in steps S203 to S207 is performed in the third excitation state for duration of T2 seconds.

As described above, this embodiment is configured to extract the electromotive force difference EdA2 (the vector Va of the ∂A/∂t component) from the inter-signal line electromotive force differences E2π0 and E2π1 in the second and third excitation states with different excitation frequencies and normalize a span applied to the magnitude V of the flow velocity of the v×B component in the inter-signal line electromotive force difference E20 (resultant vector Va+Vb) in the first excitation state by using the electromotive force difference EdA2, thereby erasing the span variation element. Therefore, in this embodiment, accurate span correction can be automatically performed, and highly accurate flow rate measurement can be executed.

In this embodiment, adjusting the phase difference between the magnetic field B2 generated from the first exciting coil 3a and the magnetic field B3 generated from the second exciting coil 3b allows the inter-signal line electromotive force difference E20 in the first excitation state to be almost only an electromotive force based on a v×B component, and also allows the inter-signal line electromotive force differences E2π0 and E2π1 in the second and third excitation states to be almost only electromotive forces based on the ∂A/∂t components. With this processing, this embodiment can extract a v×B component and a ∂A/∂t component more effectively, and can reduce computation errors more greatly than the tenth embodiment.

Note that in this embodiment, since the v×B component preferably dominates the inter-signal line electromotive force difference E20 in the first excitation state, and the ∂A/∂t components preferably dominate the inter-signal line electromotive force difference E2π0 and E2π1 in the second and third excitation states, the phase difference Δθ3 between the magnetic fields B2 and B3 in the first excitation state preferably satisfies $0 \leq \Delta\theta 3 < \pi$.

Twelfth Embodiment

Subsequently, a twelfth embodiment of the present invention will be described. In this embodiment, the power supply 4b, the signal conversion unit 5b, and the flow rate output unit 6b used in the seventh to ninth embodiments will be described. The power supply 4b provides an exciting current to the exciting coil 3 while switching an excitation frequency.

The signal conversion unit 5b obtains the amplitudes and the phases of the electromotive force differences between the first resultant electromotive forces obtained from the first signal lines 7a, 7b and the second resultant electromotive forces obtained from the second signal lines 7c, 7d, respectively, in the first and second excitation states with different excitation frequencies, and extracts the difference between the electromotive force difference in the first excitation state and the electromotive force difference in the second excitation state as a ∂A/∂t component based on the amplitudes and the phases of the electromotive force differences. The flow rate output unit 6b removes a variation factor for a span included in the v×B component in the electromotive force sum of the first resultant electromotive force and the second resultant electromotive force in the first excitation state based on the extracted ∂A/∂t component, and calculates the flow rate of the fluid to be measured from the result obtained by removing the variation factor.

Hereinafter, operations of the power supply 4b, the signal conversion unit 5b, and the flow rate output unit 6b will be described in more detail. The power supply unit 4b repeats, in a T-sec cycle, the operation of continuing the first excitation state for T0 seconds in which an exciting current with an angular frequency ω0 is supplied to the exciting coil 3, and the second excitation state for T1 seconds in which an exciting current with the angular frequency ω1 to the exciting coil 3. That is, T=T0+T1.

Figure 22:
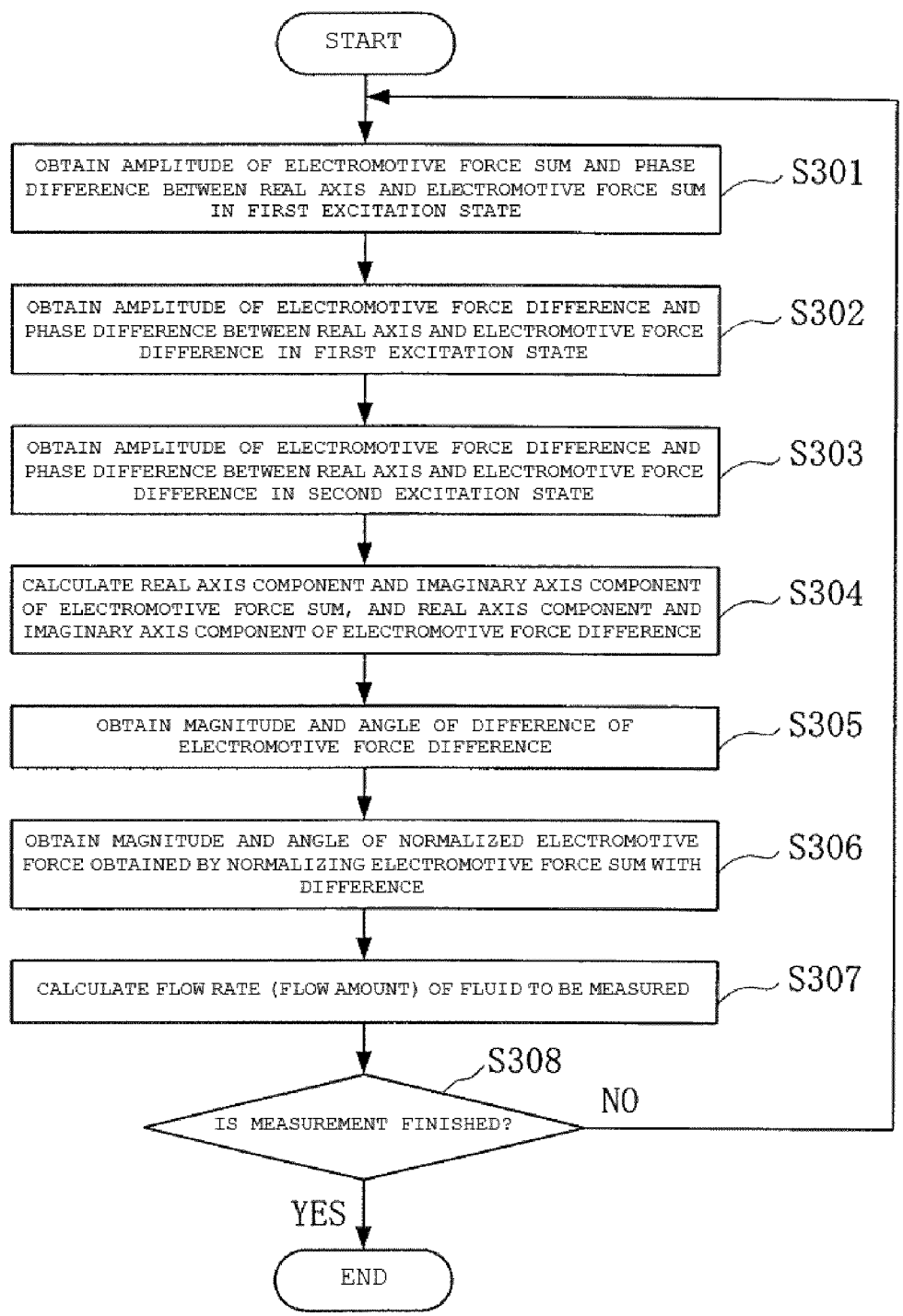
FIG. 22 is a flowchart illustrating operations of a signal conversion unit and a flow rate output unit according to a twelfth embodiment of the present invention.

FIG. 22 is a flowchart showing the operations of the signal conversion unit 5b and the flow rate output unit 6b. In FIGS. 14 to 19, a difference between the electromotive force detected at the end portion of the first signal line 7b on the side of the signal conversion unit and the electromotive force detected at the end portion of the first signal line 7a on the side of the signal conversion unit is referred to as a first inter-signal line electromotive force difference, and a difference between the electromotive force detected at the end portion of the second signal line 7d on the side of the signal conversion unit and the electromotive force detected at the end portion of the second signal line 7c on the side of the signal conversion unit is referred to as a second inter-signal line electromotive force difference.

First of all, the signal conversion unit 5b causes a phase detector (not shown) to obtain an amplitude rs30 of a sum Es30 of the first inter-signal line electromotive force difference E31 and the second inter-signal line electromotive force difference E32 in the first excitation state wherein the exciting angular frequency is ω0, and obtain a phase difference φs30 between the real axis and the electromotive force sum Es30 (step S301 in FIG. 22).

In addition, the signal conversion unit 5b causes the phase detector to obtain an amplitude rd30 of the difference Ed30 between the first inter-signal line electromotive force difference E31 and the second inter-signal line electromotive force difference E32 in the first excitation state, and obtain a phase difference φd30 between the real axis and the electromotive force difference Ed30 (step S302). Subsequently, the signal conversion unit 5b causes the phase detector to obtain an amplitude rd31 of the difference Ed31 between the first inter-signal line electromotive force difference E31 and the second inter-signal line electromotive force difference E32 in the second excitation state wherein the exciting angular frequency is ω1, and also obtain a phase difference φd31 between the real axis and the electromotive force Ed31 (step S303).

The signal conversion unit 5b then calculates a real axis component Es30x and an imaginary axis component Es30y of the electromotive force sum Es30, a real axis component Ed30x and an imaginary axis component Ed30y of the electromotive force difference Ed30, and a real axis component Ed31x and an imaginary axis component Ed31y of the electromotive force difference Ed31 according to the following equations (step S304).

$$Es30x = rs30 \cdot \cos(\phi s30) \quad (27)$$

$$Es30y = rs30 \cdot \sin(\phi s30) \quad (28)$$

$$Ed30x = rd30 \cdot \cos(\phi d30) \quad (29)$$

$$Ed30y = rd30 \cdot \sin(\phi d30) \quad (30)$$

$$Ed31x = rd31 \cdot \cos(\phi d31) \quad (31)$$

$$Ed31y = rd31 \cdot \sin(\phi d31) \quad (32)$$

After the calculation of equations (27) to (32), the signal conversion unit 5b obtains the magnitude and the angle of the difference EdA3 between the electromotive force differences Ed30 and Ed31 (step S305). The signal conversion unit 5b calculates a magnitude |EdA3| of the difference EdA3 between the electromotive force differences Ed30 and Ed31 according to the following equation.

$$|EdA3| = \{(Ed30x - Ed31x)^2 + (Ed30y - Ed31y)^2\}^{1/2} \cdot \omega 0 / (\omega 0 - \omega 1) \quad (33)$$

The signal conversion unit 5b then calculates an angle ∠EdA3 of the difference EdA3 with respect to the real axis according to the following equation.

$$\angle EdA3 = \tan^{-1}\{(Ed30y - Ed31y)/(Ed30x - Ed31x)\} \quad (34)$$

The processing of step S305 is finished here.

Subsequently, the flow rate output unit 6b then obtains the magnitude and the angle of the normalized electromotive force En3 obtained by normalizing the electromotive force sum Es30 with the difference EdA3 (step S306). The flow rate output unit 6b calculates a magnitude |En3| of the normalized electromotive force En3 according to the following equation.

$$|En3| = (rs30/|EdA3|) \cdot \omega 0 \quad (35)$$

The flow rate output unit 6b also calculates an angle ∠En3 of the normalized electromotive force En3 with respect to the real axis according to the following equation.

$$\angle En3 = \phi s30 - \angle EdA3 \quad (36)$$

The processing of step S306 is finished here.

Subsequently, the flow rate output unit 6b then calculates the magnitude V of the flow velocity of the fluid to be measured according to the following equation (step S307).

$$V = |En3/[\gamma \cdot \exp\{j \cdot (-\pi/2 + \Delta\theta 01)\}]| = |En3|/\gamma \quad (37)$$

The coefficient γ and the angle Δθ01 are constants which can be obtained in advance by calibration and the like.

The signal conversion unit 5b and the flow rate output unit 6b perform the processing in steps S301 to S307 described above in every cycle T until, for example, the end of the measurement is designated by the operator (YES in step S308). Note that the processing in steps S303 to S307 is performed in the second excitation state for duration of T1 seconds.

As described above, this embodiment is configured to obtain the electromotive force differences Ed30 and Ed31 between the first inter-signal line electromotive force difference and the second inter-signal line electromotive force difference in the first and second excitation states with different excitation frequencies, extract the difference EdA3 (the vector Va of the ∂A/∂t component) from the electromotive force differences Ed30 and Ed31, and normalize a span applied to the magnitude V of the flow velocity of the v×B component in the electromotive force sum Es30 (resultant vector Va+Vb) of the first inter-signal line electromotive force difference and the second inter-signal line electromotive force difference in the first excitation state by using the difference EdA3, thereby erasing the span variation element. Therefore, in this embodiment, accurate span correction can be automatically performed, and highly accurate flow rate measurement can be executed.

In this embodiment, adjusting the distance d3 from the plane PLN3 including the axis of the exciting coil 3 to the first electrodes 2a, 2b and the distance d4 from the plane PLN3 to the second electrodes 2c, 2d allows the electromotive force sum Es30 to be almost only an electromotive force based on a v×B component, and also allows the electromotive force differences Ed30 and Ed31 to be almost only electromotive forces based on ∂A/∂t components. With this processing, this embodiment can extract a v×B component and a ∂A/∂t component more effectively, and can reduce computation errors more than the tenth embodiment.

Note that this embodiment has exemplified the case of extracting the difference EdA3 from the electromotive force difference between the first inter-signal line electromotive force difference and the second inter-signal line electromotive force difference and normalizing the electromotive force sum of the first inter-signal line electromotive force difference and the second inter-signal line electromotive force difference by using the difference EdA3. However, the present invention is not limited thereto. The electromotive force sums of the first inter-signal line electromotive force difference and the second inter-signal line electromotive force difference in the first and second excitation states with different excitation frequencies may be obtained, and the difference between these electromotive force sums may be extracted as a ∂A/∂t component. The electromotive force difference between the first inter-signal line electromotive force difference and the second inter-signal line electromotive force difference in the first excitation state may be normalized by using this ∂A/∂t component.

Thirteenth Embodiment

Subsequently, a thirteenth embodiment of the present invention will be described. In this embodiment, the power supply 4a, the signal conversion unit 5a, and the flow rate output unit 6a used in the fourth to sixth embodiments will be described. The power supply 4a provides exciting currents of the same frequency to the first exciting coil 3a and the second exciting coil 3b while switching a phase difference between the exciting current provided to the first exciting coil 3a and the exciting current provided to the second exciting coil 3b.

The signal conversion unit 5a obtains the amplitude and the phase of the resultant electromotive force in each of the two excitation states. The two excitation states include a first excitation state in which a phase difference between the first magnetic field generated by the first exciting coil 3a and the second magnetic field generated by the second exciting coil 3b is substantially zero and a second excitation state in which the phase difference between the first magnetic field and the second magnetic field is substantially 7C. The signal conversion unit 5a extracts, as a ∂A/∂t component, the resultant electromotive force of the second excitation state based on the amplitudes and the phases of the resultant electromotive forces. The flow rate output unit 6a removes a variation factor for a span included in the v×B component in the electromotive force of the first excitation state based on the extracted ∂A/∂t component, and calculates the flow rate of the fluid to be measured from the result obtained by removing the variation factor.

Hereinafter, operations of the power supply 4a, the signal conversion unit 5a, and the flow rate output unit 6a will be described in more detail. The power supply unit 4a repeats, in a T-sec cycle, the operation of continuing the first excitation state for T0 seconds in which the first exciting current with an angular frequency $\omega 0$ is supplied to the first exciting coil 3a and at the same time the second exciting current with the angular frequency $\omega 0$ is supplied to the second exciting coil 3b, with a phase difference $\Delta\theta 3$ from the first exciting current being substantially zero, and continuing the second excitation state for T1 seconds in which the phase difference between the first and second exciting currents in the first excitation state has been changed to substantially $\pi$. That is, T=T0+T1.

Figure 23:
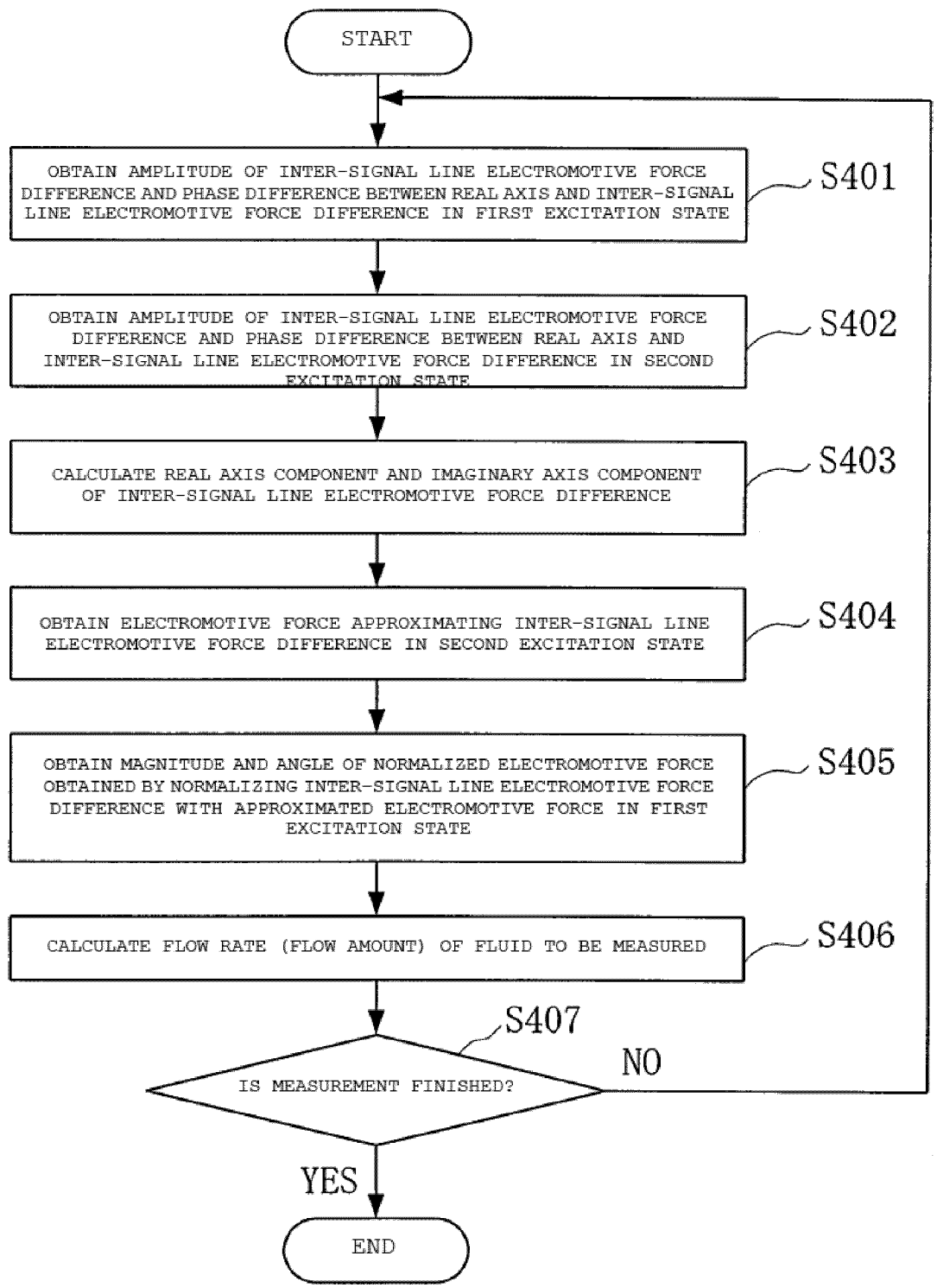
FIG. 23 is a flowchart illustrating operations of a signal conversion unit and a flow rate output unit according to a thirteenth embodiment of the present invention.

FIG. 23 is a flowchart illustrating the operations of the signal conversion unit 5a and the flow rate output unit 6a according to this embodiment. In the same manner as the eleventh embodiment, in FIGS. 11 to 13, a difference between the electromotive force detected at the end portion of the signal line 7b on the side of the signal conversion unit and the electromotive force detected at the end portion of the signal line 7a on the side of the signal conversion unit is referred to as an inter-signal line electromotive force difference.

The signal conversion unit 5a obtains an amplitude r20 of the electromotive force difference E20 in the first excitation state wherein the first exciting current with the angular frequency $\omega 0$ is supplied to the first exciting coil 3a, and the second exciting current with the angular frequency $\omega 0$ is supplied to the second exciting coil 3b, with the phase difference $\Delta\theta 3$ with respect to the first exciting current being substantially zero, and obtains a phase difference $\phi 20$ between the real axis and the inter-signal line electromotive force difference E20 by using a phase detector (not shown) (step S401 in FIG. 23).

Subsequently, the signal conversion unit 5a obtains an amplitude r2$\pi$0 of the inter-signal line electromotive force difference E2$\pi$0 in the second excitation state wherein the phase difference between the first and second exciting currents in the first excitation state has been changed to substantially $\pi$, and obtains a phase difference $\phi 2\pi 0$ between the real axis and the inter-signal line electromotive force difference E2$\pi$0 by using the phase detector (step S402).

The signal conversion unit 5a then calculates a real axis component E20x and an imaginary axis component E20y of the inter-signal line electromotive force difference E20, and a real axis component E2$\pi$0x and an imaginary axis component E2$\pi$0y of the inter-signal line electromotive force difference E2$\pi$0 according to the following equations (step S403).

$$E20x = r20 \cdot \cos(\phi 20) \tag{38}$$

$$E20y = r20 \cdot \sin(\phi 20) \tag{39}$$

$$E2\pi 0x = r2\pi 0 \cdot \cos(\phi 2\pi 0) \tag{40}$$

$$E2\pi 0y = r2\pi 0 \cdot \sin(\phi 2\pi 0) \tag{41}$$

After the calculation of equations (38) to (41), the signal conversion unit 5a obtains the magnitude and the angle of the electromotive force EdA4 which approximates the inter-signal line electromotive force difference E2$\pi$0 (step S404). The signal conversion unit 5a calculates a magnitude |EdA4| of the electromotive force EdA4 which approximates the inter-signal line electromotive force difference E2$\pi$0 according to the following equation.

$$|EdA4| = (E2\pi 0x^2 + E2\pi 0y^2)^{1/2} \tag{42}$$

The signal conversion unit 5a then calculates an angle $\angle$EdA4 of the electromotive force EdA4 with respect to the real axis according to the following equation.

$$\angle EdA4 = \tan^{-1}(E2\pi 0y / E2\pi 0x) \tag{43}$$

The processing of step S404 is finished here.

The flow rate output unit 6a then obtains the magnitude and the angle of the normalized electromotive force En4 obtained by normalizing the inter-signal line electromotive force difference E20 with the electromotive force EdA4 (step S405). The flow rate output unit 6a calculates a magnitude |En4| of the normalized electromotive force En4 according to the following equation.

$$|En4| = (r20/|EdA4|) \cdot \omega 0 \tag{44}$$

The flow rate output unit 6a also calculates an angle $\angle$En4 of the normalized electromotive force En4 with respect to the real axis according to the following equation.

$$\angle En4 = \phi 20 - \angle EdA4 \tag{45}$$

The processing of step S405 is finished here.

The flow rate output unit 6a then calculates the magnitude V of the flow velocity of the fluid to be measured (step S406).

$$V = |En4/[\gamma \cdot \exp\{j \cdot (-\pi/2 + \Delta\theta 01)\}]| = |En4|/\gamma \tag{46}$$

The coefficient $\gamma$ and the angle $\Delta\theta 01$ are constants which can be obtained in advance by calibration and the like.

The signal conversion unit 5a and the flow rate output unit 6a perform the processing in steps S401 to S406 described above in every cycle T until, for example, the end of the measurement is designated by the operator (YES in step S407). Note that the processing in steps S402 to S406 is performed in the second excitation state for duration of T1 seconds.

As described above, in this embodiment, attention is given to the fact that the inter-electrode electromotive force E2$\pi$0 can be approximately extracted as a $\partial A/\partial t$ component in the second excitation state wherein the phase difference between the magnetic field B2 generated from the first exciting coil 3a and the magnetic field B3 generated from the second exciting coil 3b is the predetermined value $\Delta\theta 3 + \pi$ ($\Delta\theta 3$ is substantially zero), and the amplitudes and excitation frequencies of the magnetic fields B2 and B3 are equal to each other, and normalizes a span applied to the magnitude V of the flow velocity of the v×B component in the inter-signal line electromotive force difference E20 (resultant vector Va+Vb) in the first excitation state by using the $\partial A/\partial t$ component, thereby erasing the span variation element. Therefore, in this embodiment, accurate span correction can be automatically performed, and highly accurate flow rate measurement can be executed. In addition, in this embodiment, since a $\partial A/\partial t$ component can be extracted from the inter-signal line electromotive force difference E2$\pi$0 in the second excitation state alone, there is no need to switch excitation frequencies as in the tenth to twelfth embodiments. It should be noted that the tenth to thirteenth embodiments as described above are based on the electromagnetic flowmeter disclosed in Patent Document 2.

Fourteenth Embodiment

Subsequently, a fourteenth embodiment of the present invention will be described. In this embodiment, the power supply 4, the signal conversion unit 5, and the flow rate output unit 6 used in the first to third embodiments will be described. The power supply 4 provides, to the exciting coil 3, an exciting current including two different frequency components, i.e., a first frequency and a second frequency.

The signal conversion unit 5 obtains the amplitudes and the phases of the two frequency components of the first and second frequencies of the resultant electromotive force obtained from the signal lines 7a, 7b, and extracts the electromotive force difference between the two frequency components as the ∂A/∂t component based on the obtained amplitudes and the phases. The flow rate output unit 6 removes a variation factor for a span contained in the v×B component in the first frequency component or the v×B component in the second frequency component of the resultant electromotive force obtained from the signal lines 7a, 7b, based on the extracted ∂A/∂t component, and calculates the flow rate of the fluid to be measured from the result obtained by removing the variation factor.

Hereinafter, operations of the power supply 4, the signal conversion unit 5, and the flow rate output unit 6 will be described in more detail. The power supply unit 4 supplies an exciting current containing the sine wave components of the first angular frequency ω0 and the second angular frequency ω1, to the exciting coil 3. In this case, the amplitudes of the angular frequency ω0 component and the angular frequency ω1 component in the exciting current are the same.

Figure 24:
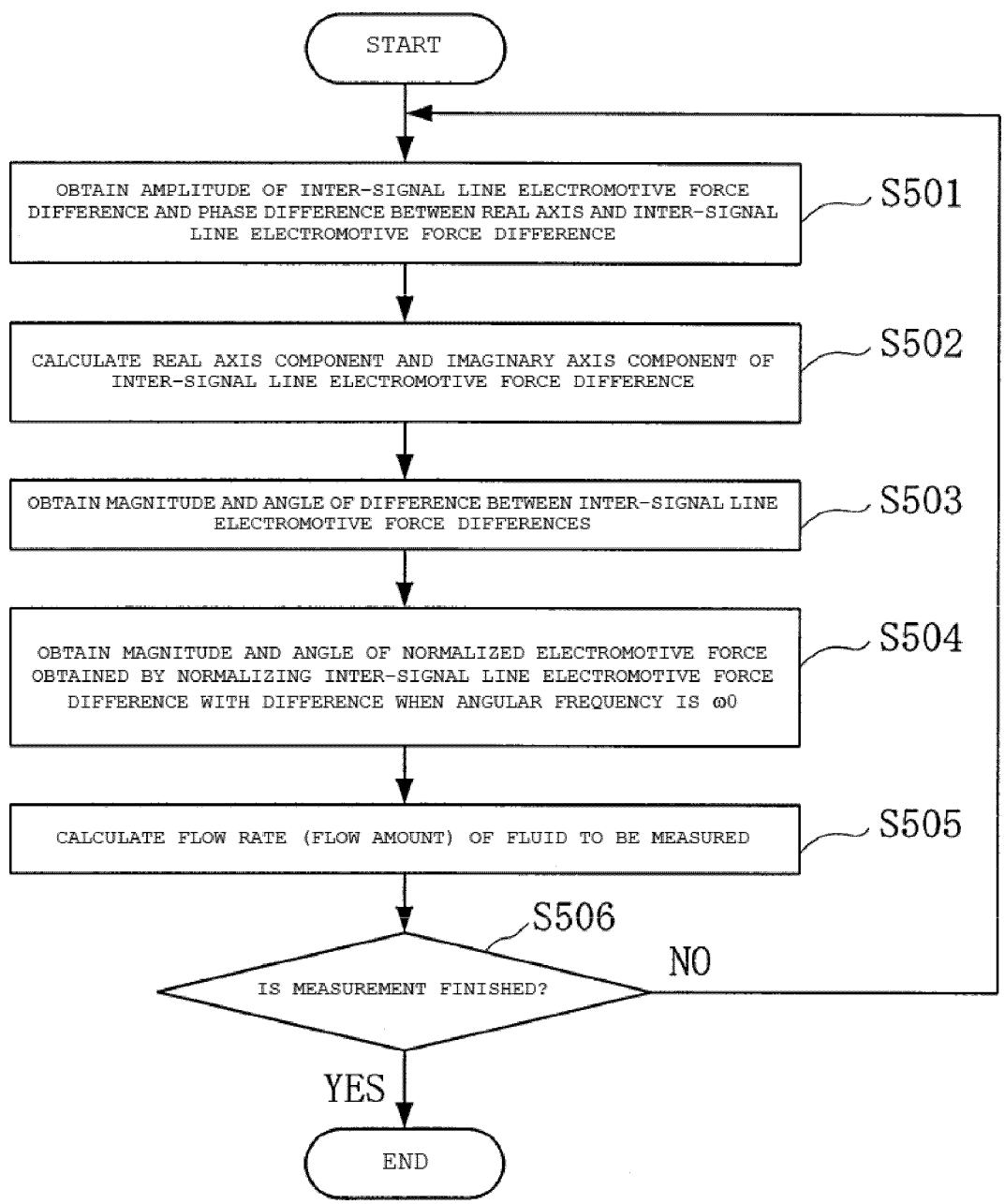
FIG. 24 is a flowchart illustrating operations of a signal conversion unit and a flow rate output unit according to a fourteenth embodiment of the present invention.

FIG. 24 is a flowchart showing the operations of the signal conversion unit 5 and the flow rate output unit 6. In the same manner as the tenth embodiment, in FIGS. 5 to 10, a difference between the electromotive force detected at the end portion of the signal line 7b on the side of the signal conversion unit and the electromotive force detected at the end portion of the signal line 7a on the side of the signal conversion unit is referred to as an inter-signal line electromotive force difference.

The signal conversion unit 5 causes a phase detector (not shown) to obtain an amplitude r50 of the inter-signal line electromotive force difference E50 of the angular frequency ω0 component of the inter-signal line electromotive force differences, and obtain a phase difference φ50 between the real axis and the inter-electrode electromotive force E50. Subsequently, the signal conversion unit 5 causes the phase detector (not shown) to obtain an amplitude r51 of the inter-signal line electromotive force difference E51 of the angular frequency ω1 component of the inter-signal line electromotive force differences, and obtain a phase difference φ51 between the real axis and the inter-electrode electromotive force difference E51 (step S501 in FIG. 24).

The signal conversion unit 5 then calculates a real axis component E50x and an imaginary axis component E50y of the inter-signal line electromotive force difference E50, and a real axis component E51x and an imaginary axis component E51y of the inter-signal line electromotive force difference E51 according to the following equations (step S502).

$$E50x = r50 \cdot \cos(\phi 50) \quad (47)$$

$$E50y = r50 \cdot \sin(\phi 50) \quad (48)$$

$$E51x = r51 \cdot \cos(\phi 51) \quad (49)$$

$$E51y = r51 \cdot \sin(\phi 51) \quad (50)$$

After the calculation of equations (47) to (50), the signal conversion unit 5 obtains the magnitude and the angle of the electromotive force difference EdA5 between the inter-signal line electromotive force differences E50 and E51 (step S503). The signal conversion unit 5 calculates a magnitude |EdA5| of the electromotive force difference EdA5 between the inter-signal line electromotive force differences E50 and E51 according to the following equation.

$$|EdA5| = \{(E50x - E51x)^2 + (E50y - E51y)^2\}^{1/2} \cdot \omega 0/(\omega 0 - \omega 1) \quad (51)$$

The signal conversion unit 5 then calculates an angle ∠EdA5 of the electromotive force difference EdA5 with respect to the real axis according to the following equation.

$$\angle EdA5 = \tan^{-1}\{(E50y - E51y)/(E50x - E51x)\} \quad (52)$$

The processing of step S503 is finished here.

The flow rate output unit 6 then obtains the magnitude and the angle of the normalized electromotive force En5 obtained by normalizing the inter-signal line electromotive force difference E50 with the electromotive force difference EdA5 (step S504). The flow rate output unit 6 calculates a magnitude |En5| of the normalized electromotive force En5 according to the following equation.

$$|En5| = (r50/|EdA5|) \cdot \omega 0 \quad (53)$$

The flow rate output unit 6 also calculates an angle ∠En5 of the normalized electromotive force En5 with respect to the real axis according to the following equation.

$$\angle En5 = \phi 50 - \angle EdA5 \quad (54)$$

The processing of step S504 is finished here.

The flow rate output unit 6 then calculates the magnitude V of the flow velocity of the fluid to be measured (step S505). The flow rate output unit 6 calculates a real axis component En5x of (En5−ω0) and an imaginary axis component En5y of (En5−ω0) according to the following equations.

$$En5x = |En5|\cos(\angle En5) - \omega 0 \quad (55)$$

$$En5y = |En5|\sin(\angle En5) \quad (56)$$

The flow rate output unit 6 then calculates the magnitude V of the flow velocity of the fluid to be measured according to the following equation.

$$V = (En5x^2 + En5y^2)^{1/2}/\gamma \quad (57)$$

The processing of step S505 is finished here.

The signal conversion unit 5 and the flow rate output unit 6 perform the processing in steps S501 to S505 described above in every predetermined cycle until, for example, the end of the measurement is designated by the operator (YES in step S506).

As described above, this embodiment is configured to apply the magnetic field with two components having the same magnitude and different frequencies from the exciting coil 3 to the fluid to be measured, and extract the electromotive force difference EdA5 (the vector Va of the ∂A/∂t component) from the inter-signal line electromotive force differences E50 and E51 of the angular frequencies ω0 and ω1 components of the inter-signal line electromotive force differences. A span applied to the magnitude V of the flow velocity of the v×B component in the inter-signal line electromotive force difference E50 (resultant vector Va+Vb) is normalized by using the electromotive force difference EdA5, thereby erasing the span variation element. Therefore, in this embodiment, accurate span correction can be automatically performed, and highly accurate flow rate measurement can be executed.

Note that this embodiment has exemplified the case of normalizing the component E50 of the angular frequency ω0 component of the inter-signal line electromotive force differences. However, the present invention is not limited thereto. The component E51 of the angular frequency ω1 component may be normalized.

Fifteenth Embodiment

Subsequently, a fifteenth embodiment of the present invention will be described. In this embodiment, the power supply 4a, the signal conversion unit 5a, and the flow rate output unit 6a used in the fourth to sixth embodiments will be described. The power supply 4a provides an exciting current of a first frequency to the first exciting coil 3a, and at the same time, provides an exciting current of a second frequency different from the first frequency to the second exciting coil 3b.

The signal conversion unit 5a obtains the amplitudes and the phases of the two frequency components of the first and second frequencies of the resultant electromotive force obtained from the signal lines 7a, 7b, and extracts the electromotive force difference between these two frequency components as the ∂A/∂t component based on the amplitudes and the phases of the resultant electromotive forces. Based on the extracted ∂A/∂t component, the flow rate output unit 6a removes a variation factor for a span contained in the v×B component in the electromotive force sum of the two frequency components of the resultant electromotive force obtained from the signal lines 7a, 7b, and calculates the flow rate of the fluid to be measured from the result obtained by removing the variation factor.

Hereinafter, operations of the power supply 4a, the signal conversion unit 5a, and the flow rate output unit 6a will be described in more detail. In this embodiment, it is assumed that a distance d1 from the plane PLN to the first exciting coil 3a and a distance d2 from the plane PLN to the second exciting coil 3b are substantially the same in FIGS. 11 to 13.

The power supply unit 4a supplies the first sine wave exciting current with the first angular frequency $\omega1=\omega0-\Delta\omega$ to the first exciting coil 3a, and, at the same time, the second sine wave exciting current with the second angular frequency $\omega2=\omega0+\Delta w$ to the second exciting coil 3b. In this case, the amplitudes of the first and second sine wave exciting currents are the same.

Figure 25:
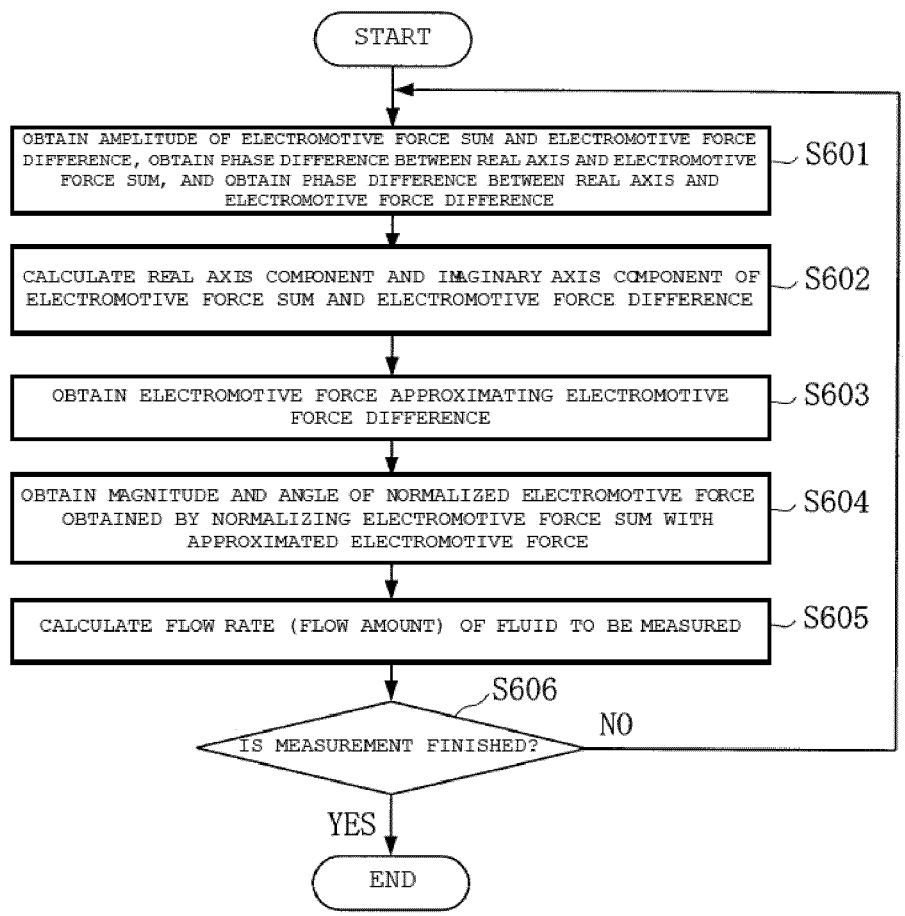
FIG. 25 is a flowchart illustrating operations of a signal conversion unit and a flow rate output unit according to a fifteenth embodiment of the present invention.

FIG. 25 is a flowchart showing the operations of the signal conversion unit 5a and the flow rate output unit 6a. In the same manner as the tenth embodiment, in FIGS. 11 to 13, the difference between the electromotive force detected at the end portion of the signal line 7b on the side of the signal conversion unit and the electromotive force detected at the end portion of the signal line 7a on the side of the signal conversion unit is referred to as the inter-signal line electromotive force difference.

The signal conversion unit 5a causes a phase detector (not shown) to obtain an amplitude rs6 of the electromotive force sum Es6 between the inter-signal line electromotive force differences E61 and E62 of the angular frequency ω1 and ω2 components of the inter-signal line electromotive force differences, and a phase difference φs6 between the real axis and the electromotive force sum Es6. Additionally, the signal conversion unit 5a causes the phase detector to obtain an amplitude rd6 of the electromotive force difference Ed6 between the inter-signal line electromotive force differences E61 and E62, and a phase difference φ6 between the real axis and the electromotive force difference Ed6 (step S601 in FIG. 25).

The signal conversion unit 5a then calculates a real axis component Es6x and an imaginary axis component Es6y of the electromotive force sum Es6, and a real axis component Ed6x and an imaginary axis component Ed6y of the electromotive force difference Ed6 according to the following equations (step S602).

$$Es6x = rs6 \cdot \cos(\phi s6) \quad (58)$$

$$Es6y = rs6 \cdot \sin(\phi s6) \quad (59)$$

$$Ed6x = rd6 \cdot \cos(\phi d6) \quad (60)$$

$$Ed6y = rd6 \cdot \sin(\phi d6) \quad (61)$$

After the calculation of equations (58) to (61), the signal conversion unit 5a obtains the magnitude and the angle of the electromotive force EdA6 which approximates the electromotive force difference Ed6 (step S603). The signal conversion unit 5a calculates a magnitude |EdA6| of the electromotive force EdA6 which approximates the electromotive force difference Ed6 according to the following equation.

$$|EdA6| = (Ed6x^2 + Ed6y^2)^{1/2} \quad (62)$$

The signal conversion unit 5a then calculates an angle ∠EdA6 of the electromotive force EdA6 with respect to the real axis according to the following equation.

$$\angle EdA6 = \tan^{-1}(Ed6y/Ed6x) \quad (63)$$

The processing of step S603 is finished here.

The flow rate output unit 6a then obtains the magnitude and the angle of the normalized electromotive force En6 obtained by normalizing the electromotive force sum Es6 with the electromotive force EdA6 (step S604). The flow rate output unit 6a calculates a magnitude |En6| of the normalized electromotive force En6 according to the following equation.

$$|En6| = (rs6/|EdA6|) \cdot \omega0 \quad (64)$$

The flow rate output unit 6a also calculates an angle ∠En6 of the normalized electromotive force En6 with respect to the real axis according to the following equation.

$$\angle En6 = \phi s6 - \angle EdA6 \quad (65)$$

The processing of step S604 is finished here.

The flow rate output unit 6a then calculates the magnitude V of the flow velocity of the fluid to be measured (step S605). The flow rate output unit 6a calculates a real axis component En6x of (En6+Δω) and an imaginary axis component En6y of (En6+Δω) according to the following equations.

$$En6x = |En6|\cos(\angle En6) + \Delta\omega \quad (66)$$

$$En6y = |En6|\sin(\angle En6) \quad (67)$$

The flow rate output unit 6a then calculates the magnitude V of the flow velocity of the fluid to be measured according to the following equation.

$$V = (En6x^2 + En6y^2)^{1/2}/\gamma \quad (68)$$

The coefficient γ is a constant which can be obtained in advance by calibration and the like. The processing of step S605 is finished here.

The signal conversion unit 5a and the flow rate output unit 6a perform the processing in steps S601 to S605 described above in every predetermined cycle until, for example, the end of the measurement is designated by the operator (YES in step S606).

As described above, in this embodiment, attention is given to the fact that when the magnetic fields having the same magnitude and different frequencies are applied from the first and second exciting coils 3a, 3b to the fluid to be measured, the electromotive force difference Ed6 between the inter-signal line electromotive force E61 of the angular frequency ω1 component and the inter-signal line electromotive force E62 of the angular frequency ω2 component of the inter-signal line electromotive forces can be approximately extracted as the ∂A/∂t component. Accordingly, this embodiment is configured to normalize a span applied to the magnitude V of the flow velocity of the v×B component in the electromotive force sum Es6 (resultant vector Va+Vb) by using the ∂A/∂t component, thereby erasing the span variation element. Therefore, in this embodiment, accurate span correction can be automatically performed, and highly accurate flow rate measurement can be executed.

Note that this embodiment has exemplified the case of extracting the electromotive force difference Ed6 between the inter-signal line electromotive force differences E61 and E62, and normalizing the electromotive force sum Es6 by using the electromotive force difference Ed6. However, the present invention is not limited thereto. The electromotive force sum Es6 can be approximately extracted as the ∂A/∂t component, and the electromotive force difference Ed6 can be normalized by using this ∂A/∂t component.

Sixteenth Embodiment

Subsequently, a sixteenth embodiment of the present invention will be described. In this embodiment, the power supply 4b, the signal conversion unit 5b, and the flow rate output unit 6b used in the seventh to ninth embodiments will be described. The power supply 4b provides an exciting current to the exciting coil 3.

The signal conversion unit 5b which obtains the amplitudes and the phases of the first resultant electromotive forces obtained from the first signal lines 7a, 7b and the second resultant electromotive forces obtained from the second signal lines 7c, 7d, respectively, and extracts the electromotive force difference between the first and second resultant electromotive forces as a ∂A/∂t component based on the amplitudes and the phases. The flow rate output unit 6b removes a variation factor for a span contained in the v×B component in the electromotive force sum of the first resultant electromotive force and the second resultant electromotive force based on the extracted ∂A/∂t component, and calculates the flow rate of the fluid to be measured from the result obtained by removing the variation factor.

Hereinafter, operations of the power supply 4b, the signal conversion unit 5b, and the flow rate output unit 6b will be described in more detail. In this embodiment, it is assumed that the distance d3 from the plane PLN3 including the axis of the exciting coil 3 to the axis EAX1 of the electrodes connecting the electrodes 2a, 2b is substantially the same as the distance d4 from the plane PLN3 to the axis EAX2 of the electrodes connecting the electrodes 2c, 2d in FIGS. 14 to 19. The power supply 4b provides a sine wave exciting current with an angular frequency ω0 to the exciting coil 3.

The processing of the signal conversion unit 5b and the flow rate output unit 6b of this embodiment is the same as that of the fifteenth embodiment, and hence the operations of the signal conversion unit 5b and the flow rate output unit 6b will be described by using the reference numerals in FIG. 25. In the same manner as the twelfth embodiment, in FIGS. 14 to 19, a difference between the electromotive force detected at the end portion of the first signal line 4b on the side of the signal conversion unit and the electromotive force detected at the end portion of the first signal line 4a on the side of the signal conversion unit is referred to as a first inter-signal line electromotive force difference, and a difference between the electromotive force detected at the end portion of the second signal line 4d on the side of the signal conversion unit and the electromotive force detected at the end portion of the second signal line 4c on the side of the signal conversion unit is referred to as a second inter-signal line electromotive force difference.

The signal conversion unit 5b causes a phase detector (not shown) to obtain an amplitude rs7 of the electromotive force sum Es7 of the first inter-signal line electromotive force difference E71 and the second inter-signal line electromotive force difference E72, and obtain a phase difference φs7 between the real axis and the electromotive force sum Es7. Additionally, the signal conversion unit 5b causes a phase detector to obtain an amplitude rd7 of the electromotive force difference Ed7 of the first inter-signal line electromotive force difference E71 and the second inter-signal line electromotive force difference E72, and obtain a phase difference φd7 between the real axis and the electromotive force difference Ed7 (step S601 in FIG. 25).

The signal conversion unit 5b then calculates a real axis component Es7x and an imaginary axis component Es7y of the electromotive force sum Es7, and a real axis component Ed7x and an imaginary axis component Ed7y of the electromotive force difference Ed7 according to the following equations (step S602).

$$Es7x = rs7 \cdot \cos(\phi s7) \tag{69}$$

$$Es7y = rs7 \cdot \sin(\phi s7) \tag{70}$$

$$Ed7x = rd7 \cdot \cos(\phi d7) \tag{71}$$

$$Ed7y = rd7 \cdot \sin(\phi d7) \tag{72}$$

After the calculation of equations (69) to (72), the signal conversion unit 5b obtains the magnitude and the angle of the electromotive force EdA7 which approximates the electromotive force difference Ed7 (step S603). The signal conversion unit 5b calculates a magnitude |EdA7| of the electromotive force EdA7 which approximates the electromotive force difference Ed7 according to the following equation.

$$|EdA7| = (Ed7x^2 + Ed7y^2)^{1/2} \tag{73}$$

The signal conversion unit 5b then calculates an angle ∠EdA7 of the electromotive force EdA7 with respect to the real axis according to the following equation.

$$\angle EdA7 = \tan^{-1}(Ed7y/Ed7x) \tag{74}$$

The processing of step S603 is finished here.

The flow rate output unit 6b then obtains the magnitude and the angle of the normalized electromotive force En7 obtained by normalizing the electromotive force sum Es7 with the electromotive force EdA7 (step S604). The flow rate output unit 6b calculates a magnitude |En7| of the normalized electromotive force En7 according to the following equation.

$$|En7| = (rs7/|EdA7|) \cdot \omega 0 \tag{75}$$

The flow rate output unit 6b also calculates an angle ∠En7 of the normalized electromotive force En7 with respect to the real axis according to the following equation.

$$\angle En7 = \phi s7 - \angle EdA7 \tag{76}$$

The processing of step S604 is finished here.

The flow rate output unit 6b then calculates the magnitude V of the flow velocity of the fluid to be measured according to following equation (step S605).

$$V = |En7/[\gamma \cdot \exp\{j \cdot (-\pi/2 + \Delta\theta 01)\}]| = |En7|/\gamma \tag{77}$$

The coefficient γ and the angle Δθ01 are constants which can be obtained in advance by calibration and the like.

The signal conversion unit 5b and the flow rate output unit 6b perform the processing in steps S601 to S605 described above in every predetermined cycle until, for example, the end of the measurement is designated by the operator (YES in step S606).

As described above, in this embodiment, attention is given to the fact that when the magnitude of the magnetic field on the axis EAX1 of the electrodes connecting between the electrodes 2a, 2b is the same as the magnitude of the magnetic field on the axis EAX2 of the electrodes connecting between the electrodes 2c, 2d, the electromotive force difference Ed 7 between the first inter-signal line electromotive force difference E71 and the second inter-signal line electromotive force difference E72 can be approximately extracted as a ∂A/∂t component. A span applied to the magnitude V of the flow velocity of the v×B component in the electromotive force sum Es7 (resultant vector Va+Vb) is normalized by using this ∂A/∂t component, thereby erasing the span variation element. Therefore, in this embodiment, accurate span correction can be automatically performed, and highly accurate flow rate measurement can be executed. In this embodiment, only ω0 may be used as the exciting angular frequency, and there is no need to use two excitation frequencies as in the fourteenth and fifteenth embodiments.

Note that this embodiment has exemplified the case of extracting the electromotive force difference Ed7 between the first and second inter-signal line electromotive force differences E71 and E72 and normalizing the electromotive force sum Es7 by using the electromotive force difference Ed7. However, the present invention is not limited thereto. The electromotive force sum Es7 may be approximately extracted as a ∂A/∂t component, and the electromotive force difference Ed7 may be normalized by using this ∂A/∂t component. It should be noted that the fourteenth to sixteenth embodiments as described above are based on the electromagnetic flowmeter disclosed in Patent Document 3.

In the first to sixteenth embodiments, the sine wave excitation scheme using sine waves for exciting currents is employed. Alternatively, a rectangular waveform excitation scheme using rectangular waves for exciting currents may be employed. However, in the rectangular waveform excitation scheme, it is difficult to perform to perform high-frequency excitation. Therefore, the rectangular waveform excitation scheme is less advantageous than the sine wave excitation scheme in terms of 1/f noise and responsiveness with respect to a change in flow rate.

In the first to third embodiments and the seventh to ninth embodiments, the axis of the exciting coil 3 and the axis PAX of the measuring tube intersect each other at a right angle at one point. However, the present invention is not limited thereto. The axis of the exciting coil 3 may be deviated to either the electrode 2a or the electrode 2b. On the other hand, in the fourth to sixth embodiments, each of the axes of the first and second exciting coils 3a, 3b intersect the axis PAX of the measuring tube at one point. However, the present invention is not limited thereto. The axes of the first and second exciting coils 3a, 3b may be deviated to either the electrode 2a or the electrode 2b.

Figure 26:
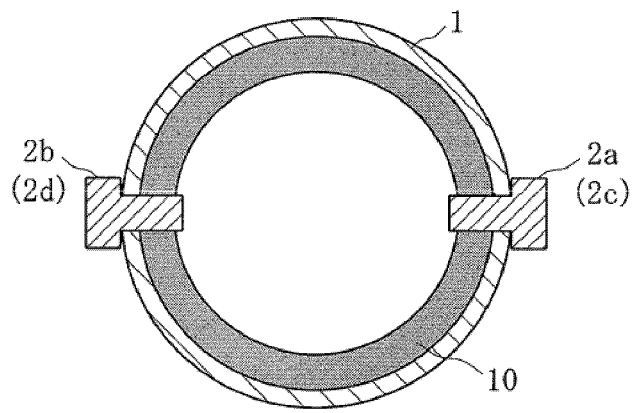
FIG. 26 is a cross sectional view illustrating an example of electrodes used in the electromagnetic flowmeter according to the first to sixteenth embodiments of the present invention.
Figure 27:
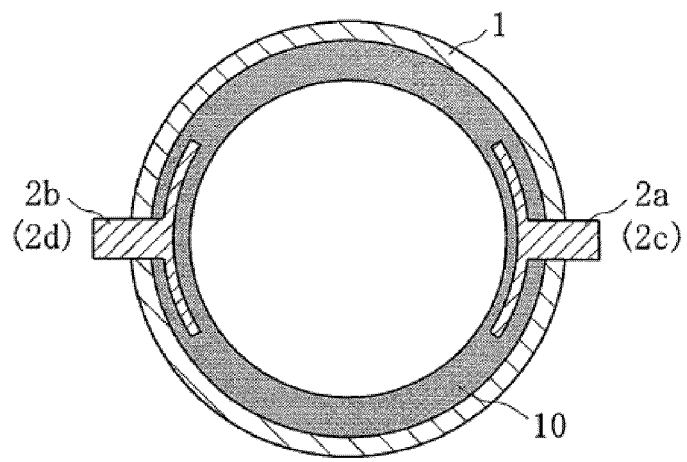
FIG. 27 is a cross sectional view illustrating another example of electrodes used in the electromagnetic flowmeter according to the first to sixteenth embodiments of the present invention.

The electrodes 2a, 2b, 2c, 2d used in the first to sixteenth embodiments may be electrodes which are shaped to be exposed from the inner wall of the measuring tube 1 and come into contact with a fluid to be measured as shown in FIG. 26, or capacitive coupling type electrodes which do not come into contact with a fluid to be measured as shown in FIG. 27. When the electrodes 2a, 2b, 2c, 2d are of a capacitive coupling type, they are coated with a lining 10 made of ceramic, Teflon (registered trademark), or the like formed on the inner wall of the measuring tube 1.

In the first to sixteenth embodiments, the first electrode includes a pair of electrodes 2a, 2b, and the second electrode includes a pair of electrodes 2c, 2d. However, the present invention is not limited thereto. In the first, third, fourth, seventh, eighth, and ninth embodiments, each of the first electrode and the second electrode may include only one electrode. If only one electrode is to be used, a ground ring or ground electrode for grounding the potential of a fluid to be measured is provided on the measuring tube 1. In the first, third, and fourth embodiments, when only the electrode 2a is arranged, the signal conversion unit 5, 5a may detect the electromotive force generated in the electrode 2a and the signal line 7a instead of detecting the inter-signal line electromotive force difference. In the seventh to ninth embodiments, when only the electrodes 2a, 2C are arranged, the signal conversion unit 5b may detect the electromotive force generated in the electrode 2a and the signal line 7a instead of detecting the first inter-signal line electromotive force difference, and may detect the electromotive force generated in the electrode 2C and the signal line 7C instead of the second inter-signal line electromotive force difference.

When only one pair of electrodes is used, the electrode axis is a straight line connecting between the pair of electrodes. On the other hand, when there is only one electrode, an electrode axis is a straight line connecting the real electrode to a virtual electrode, assuming that the virtual electrode is placed at a position to face the real electrode through the axis PAX of the measuring tube on the planes PLN, PLN1, PLN2 including the one real electrode.

Figure 28:
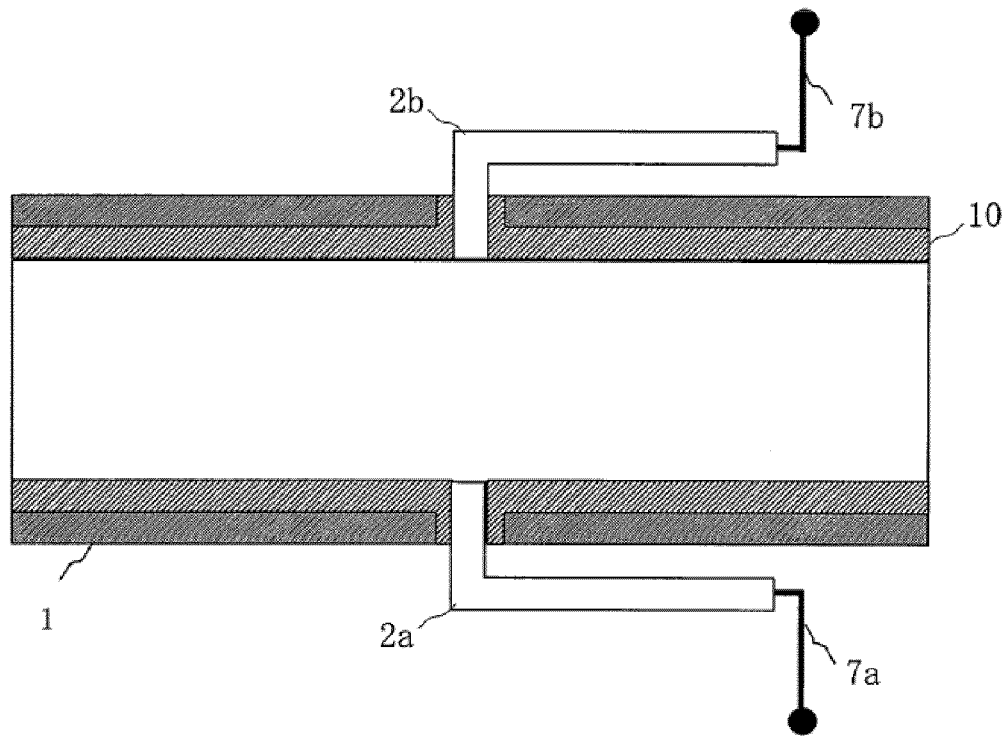
FIG. 28 is a cross sectional view illustrating still another example of electrodes used in the electromagnetic flowmeter according to the first to sixteenth embodiments of the present invention.

It is to be understood that, when the electrodes 2a, 2b, 2c, 2d used in the first to sixteenth embodiments have shapes having components in the axial direction of the tube as shown in FIG. 28, the same effects as the signal lines 7a, 7b, 7c, 7d can be obtained.

Figure 29:
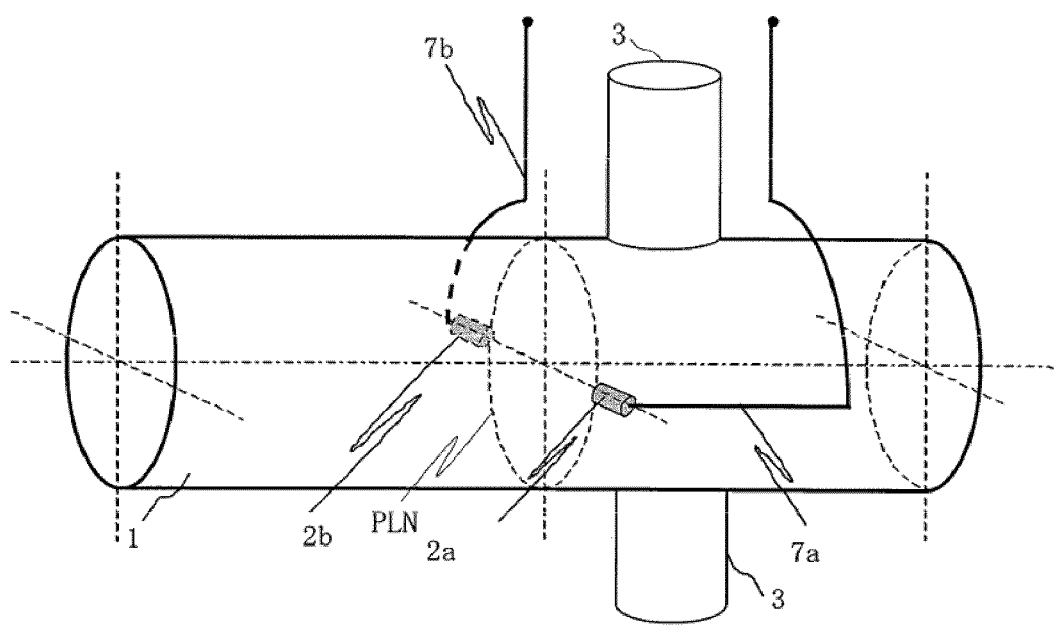
FIG. 29 is a view illustrating another example of arrangement of signal lines according to the first and third embodiments of the present invention.
Figure 30:
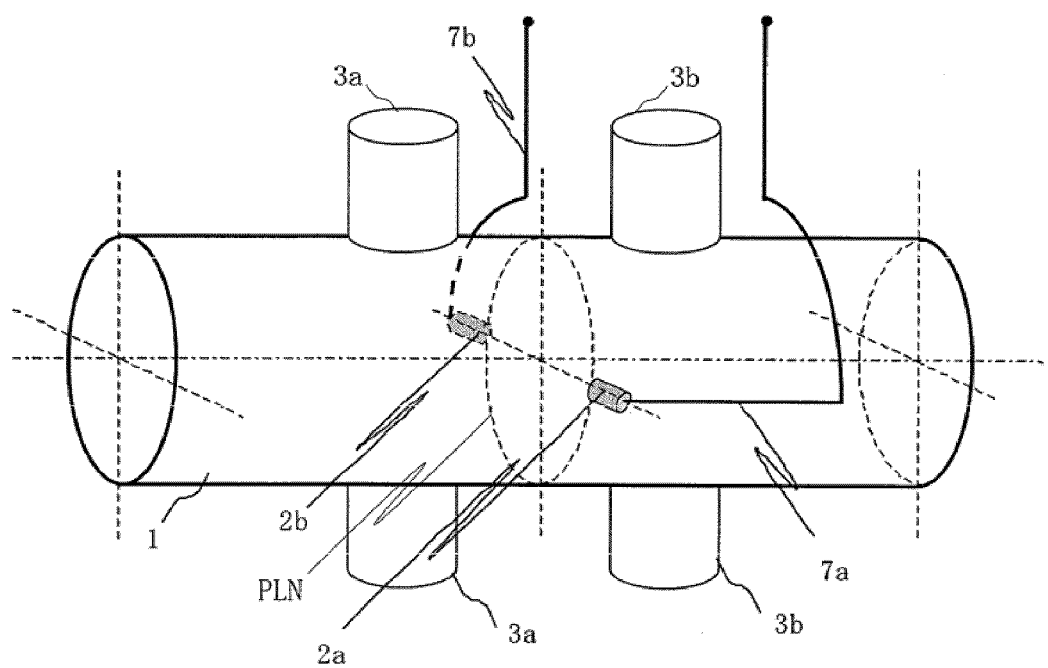
FIG. 30 is a view illustrating another example of arrangement of signal lines according to the fourth embodiment of the present invention.

In the first and third embodiments, as shown in FIG. 29, the signal line 7a of the signal lines 7a, 7b connecting to the electrodes 2a, 2b may be inclined with respect to the direction of the magnetic field in parallel with the plane PLN so that the electromotive force is generated according to a time-change of the magnetic field, and the other signal line 7b of the signal lines 7a, 7b may be arranged so that the area in which the signal line 7b interlinks with the magnetic flux generated by the exciting coil 3 is the smallest in the same manner as a generally-available electromagnetic flowmeter, thus reducing the electromotive force according to the time-change of the magnetic field as much as possible. Likewise, in the fourth embodiment, as shown in FIG. 30, the signal line 7a may be inclined with respect to the direction of the magnetic field in parallel with the plane PLN so that the electromotive force is generated according to a time-change of the magnetic field, and the other signal line 7b may be arranged so that the area in which the other signal line 7b interlinks with the magnetic flux generated by the exciting coil 3 is the smallest, thus reducing the electromotive force according to the time-change of the magnetic field as much as possible.

Figure 31:
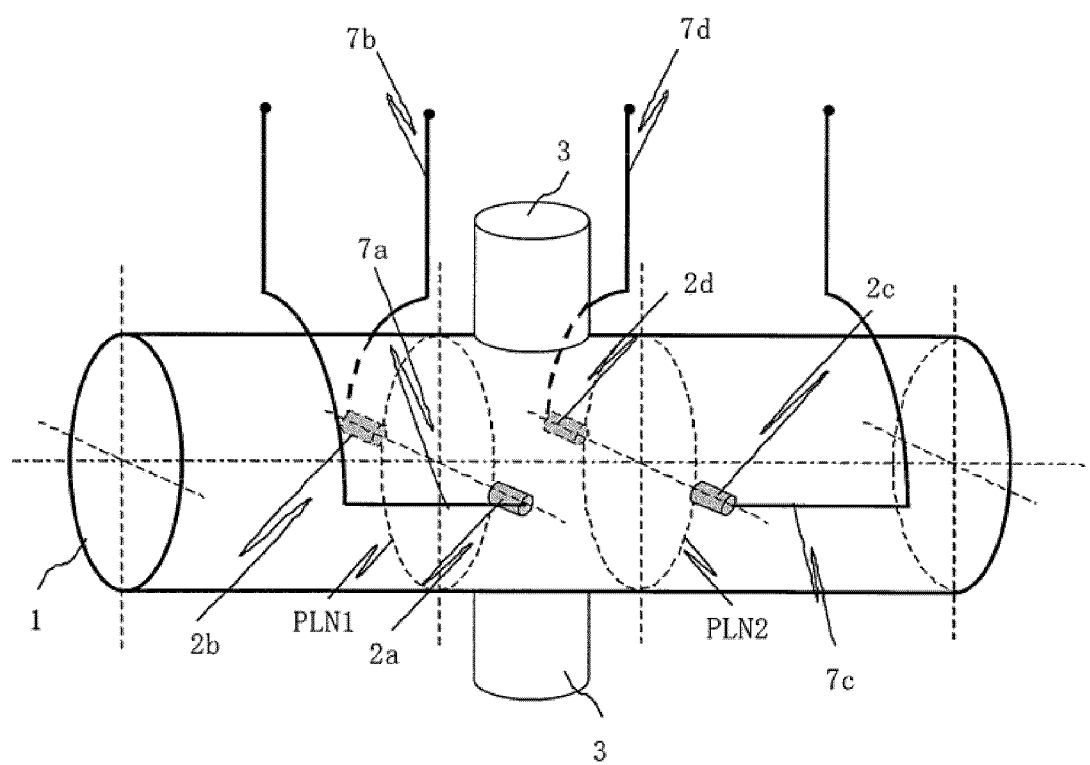
FIG. 31 is a view illustrating another example of arrangement of signal lines according to the seventh, eighth, and ninth embodiments of the present invention.

In the seventh to ninth embodiments, as shown in FIG. 31, the signal line 7a of the signal lines 7a, 7b connecting to the first electrodes 2a, 2b may be inclined with respect to the direction of the magnetic field in parallel with the plane PLN1 so that the electromotive force is generated according to a time-change of the magnetic field, and the signal line 7c of the signal lines 7c, 7d connecting to the second electrodes 2c, 2d may be inclined with respect to the direction of the magnetic field in parallel with the plane PLN2 so that the electromotive force is generated according to a time-change of the magnetic field. Further, the remaining signal lines 7b, 7d may be arranged so that the area in which the signal lines 7b, 7d interlink with the magnetic flux generated by the exciting coil 3 is the smallest in the same manner as a generally-available electromagnetic flowmeter, thus reducing the electromotive force according to the time-change of the magnetic field as much as possible.

Furthermore, in the first to sixteenth embodiments, of the signal conversion units 5, 5a, 5b and the flow rate output units 6, 6a, and 6b, components except for those used for the detection of electromotive forces can be implemented by a computer including a CPU, storage device, and interface, and programs which control these hardware resources. The CPU executes the above processings according to the programs stored in the storage device.

The present invention can be applied to measurement of a flow rate of a fluid to be measured flowing in a measuring tube.

The preceding description has been presented only to illustrate and describe exemplary embodiments of the present electromagnetic flowmeter. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. An electromagnetic flowmeter comprising:
    a measuring tube through which a fluid to be measured flows;
    an electrode which is arranged in the measuring tube so as to detect an electromotive force generated by a magnetic field applied to the fluid and a flow of the fluid;
    an exciting unit which applies, to the fluid, a time-changing magnetic field asymmetrical to a first plane including the electrode, the first plane being perpendicular to an axial direction of the measuring tube; and
    a signal line, one end of the signal line being connected to the electrode, the signal line being inclined with respect to a direction of the magnetic field in parallel with the first plane, the signal line being arranged so as to generate the electromotive force according to the time-change of the magnetic field.

2. The electromagnetic flowmeter according to claim 1, wherein the signal line has a portion extending in the same direction as an axial direction of the measuring tube.

3. The electromagnetic flowmeter according to claim 1 or 2, wherein the exciting unit includes an exciting coil arranged at a position away from the first plane by an offset distance and a power supply for supplying an exciting current to the exciting coil.

4. The electromagnetic flowmeter according to claim 3, wherein the electrode comprises a pair of electrodes arranged on an axis perpendicular to the axis of the measuring tube so as to face each other with the axis of the measuring tube therebetween, and the signal line comprises two signal lines respectively connected the electrodes, and the two signal lines are arranged in directions opposite to each other with respect to the first plane.

5. The electromagnetic flowmeter according to claim 3 further comprising an outer core for covering an outside of the exciting coil, wherein the signal lines are inclined, on an inner side of the outer core, with respect to the direction of the magnetic field in parallel with the first plane, and the signal lines are arranged so as to generate the electromotive force according to the time-change of the magnetic field.

6. The electromagnetic flowmeter according to claim 1 or 2, wherein the exciting unit includes a first exciting coil arranged at a position away from the first plane by a first offset distance, a second exciting coil arranged at a position away from the first plane by a second offset distance so as to face the first exciting coil with the first plane therebetween, and a power supply for supplying an exciting current to the first exciting coil and the second exciting coil.

7. The electromagnetic flowmeter according to claim 3, wherein the electrode comprises a pair of electrodes arranged on an axis perpendicular to the axis of the measuring tube so as to face each other with the axis of the measuring tube therebetween, and the signal line comprises two signal lines respectively connected the electrodes, and at least one of the two signal lines is inclined with respect to the direction of the magnetic field in parallel with the first plane, and is arranged so as to generate the electromotive force according to the time-change of the magnetic field.

8. The electromagnetic flowmeter according to claim 6, wherein the electrode comprises a pair of electrodes arranged on an axis perpendicular to the axis of the measuring tube so as to face each other with the axis of the measuring tube therebetween, and the signal line comprises two signal lines respectively connected the electrodes, and the two signal lines are arranged in directions opposite to each other with respect to the first plane.

9. The electromagnetic flowmeter according to claim 6 further comprising:
    a first outer core covering an outer side of the first exciting coil; and
    a second outer core covering an outer side of the second exciting coil, wherein
    the signal lines are arranged on inner sides of the first and second outer cores so that the signal lines are inclined with respect to the direction of the magnetic field in parallel with the first plane so as to generate the electromotive force according to the time-change of the magnetic field.

10. The electromagnetic flowmeter according to claim 1 or 2, wherein the exciting unit includes an exciting coil for applying the magnetic field to the fluid and a power supply for supplying an exciting current to the exciting coil, and the electrode comprises a first electrode and a second electrode, the first electrode being arranged at a position away by a first offset distance from a second plane, including the exciting coil, perpendicular to the axial direction of the measuring tube, the second electrode being arranged at a position away by a second offset distance from the second plane, the second electrode being arranged to face the first electrode with the second plane arranged therebetween.

11. The electromagnetic flowmeter according to claim 10, wherein the signal line comprises a first signal line connected to the first electrode and a second signal line connected to the second electrode, and the first and second signal lines are arranged to face each other with the second plane arranged therebetween.

12. The electromagnetic flowmeter according to claim 10 further comprising an outer core covering an outer side of the exciting coil; wherein the signal line is arranged on an inner side of the outer core so that the signal line is inclined with respect to the direction of the magnetic field in parallel with the first plane so as to generate the electromotive force according to the time-change of the magnetic field.

13. The electromagnetic flowmeter according to claim 10, wherein each of the first and second electrodes comprises a pair of electrodes facing each other, on an axis perpendicular to the axis of the measuring tube, with the axis of the measuring tube therebetween, and the signal lines include two first signal lines respectively connected to the pair of first electrodes and two second signal lines respectively connected to the pair of second electrodes, at least one of the two first signal lines is inclined with respect to the direction of the magnetic field in parallel with the first plane so as to generate an electromotive force according to a time-change of the magnetic field, at least one of the two second signal lines is inclined with respect to the direction of the magnetic field in parallel with the first plane so as to generate an electromotive force according to a time-change of the magnetic field.

14. The electromagnetic flowmeter according to claim 1 or 2, further comprising: a signal conversion unit connected to the other end of the signal lines, wherein the signal conversion unit extracts a $\partial A/\partial t$ component, irrelevant to a flow velocity of the fluid detected in the electrode and the signal line, from a resultant electromotive force of an electromotive force based on the $\partial A/\partial t$ component originating from a time-change of the magnetic field and an electromotive force based on a v×B component originating from the flow velocity of the fluid; and a flow rate output unit which removes a variation factor for a span as a coefficient applied to a magnitude V of a flow velocity of the v×B component in the resultant electromotive force, based on the extracted $\partial A/\partial t$ component, and calculates a flow rate of the fluid from a result obtained by removing the variation factor.

* * * * *